US005847729A

United States Patent [19]

[11] Patent Number: 5,847,729

[45] Date of Patent: Dec. 8, 1998

Takahashi et al.

[54] INK-JET PRINTING APPARATUS AND METHOD, AND PRINTED MATTER OBTAINED THEREBY AND PROCESSED ARTICLE OBTAINED FROM PRINTED MATTER

[75] Inventors: Kazuyoshi Takahashi, Kawasaki; Takashi Watanabe, Yokohama; Hiroshi Endo, Sagamihara; Toshiyuki Yanaka, Tokyo; Toshiaki Mabuchi, Tama; Eiichi Takagi, Yokohama, all of Japan

[73] Assignee: Canon Kabushiki Kaisha, Tokyo, Japan

[21] Appl. No.: 258,455

[22] Filed: Jun. 10, 1994

[30] Foreign Application Priority Data

| | | | |
|---|---|---|---|
| Jun. 14, 1993 | [JP] | Japan | 5-142000 |
| Jun. 14, 1993 | [JP] | Japan | 5-142401 |
| Jun. 14, 1993 | [JP] | Japan | 5-142402 |

[51] Int. Cl.$^6$ .............................. B41J 2/21; G01D 15/16; G01D 15/18

[52] U.S. Cl. .......................................... 347/43; 346/139 A

[58] Field of Search .............................. 347/43, 116, 119, 347/104; 358/510, 501; 355/327; 346/139 A

[56] References Cited

U.S. PATENT DOCUMENTS

| | | | |
|---|---|---|---|
| 4,313,124 | 1/1982 | Hara | 347/59 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/55 |
| 4,558,333 | 12/1985 | Sugitani et al. | 347/65 |
| 4,608,577 | 8/1986 | Hori | 347/66 |
| 4,660,077 | 4/1987 | Kawamura et al. | 358/515 |
| 4,723,129 | 2/1988 | Endo et al. | 347/56 |
| 4,725,849 | 2/1988 | Koike et al. | 347/106 |
| 4,740,796 | 4/1988 | Endo et al. | 347/56 |
| 5,050,101 | 9/1991 | Kiuchi et al. | 395/117 |
| 5,270,738 | 12/1993 | Takahashi et al. | 347/24 |
| 5,291,245 | 3/1994 | Charnitski et al. | 399/51 |
| 5,430,469 | 7/1995 | Shioya et al. | 347/15 |

FOREIGN PATENT DOCUMENTS

| | | |
|---|---|---|
| 0 036 296 | 9/1981 | European Pat. Off. . |
| 0116699 | 8/1984 | European Pat. Off. . |
| 0358174 | 3/1990 | European Pat. Off. . |
| 0 526 205 | 2/1993 | European Pat. Off. . |
| 0 526 233 | 2/1993 | European Pat. Off. . |
| 0 558 236 | 9/1993 | European Pat. Off. . |
| 54-056847 | 5/1979 | Japan . |
| 55-28862 | 2/1980 | Japan . |
| 59-123670 | 7/1984 | Japan . |
| 59-138461 | 8/1984 | Japan . |
| 60-049953 | 3/1985 | Japan . |
| 60-071260 | 4/1985 | Japan . |
| 61-228974 | 10/1986 | Japan . |
| 63-98455 | 4/1988 | Japan . |
| 1267048 | 10/1989 | Japan . |
| 2187343 | 7/1990 | Japan . |
| 3046589 | 7/1991 | Japan . |
| 4018358 | 1/1992 | Japan . |
| 5-212851 | 8/1993 | Japan . |
| 8701300 | 1/1989 | Netherlands . |
| 2219114 | 11/1989 | United Kingdom . |

OTHER PUBLICATIONS

Ondori, No. 442, Jun. 10, 1987 (Ondori–sha).

*IBM Technical Disclosure Bulletin*, "Algorithm for Nested Overlay Management", vol. 31, No. 9, Feb. 1989, pp. 428–430.

*Primary Examiner*—N. Le
*Assistant Examiner*—Thinh Nguyen
*Attorney, Agent, or Firm*—Fitzpatrick, Cella, Harper & Scinto

[57] ABSTRACT

An ink-jet printing apparatus, having a first printing head at an upper position with respect to a cloth-conveying direction and a second printing head at a lower position with respect to the cloth-conveying direction, scans the printing heads in a direction orthogonal to the cloth-conveying direction. An image printed by the first printing head is complemented by the second printing head. If a stop of printing is instructed during the printing by the first printing head, the printing by the first printing head is stopped, and printing by the second printing head is continued until the position of the image printed by the first printing head is printed by the second printing head. In this manner, a printed image completed to the end of the image can be obtained.

22 Claims, 69 Drawing Sheets

FIG. 5

CASE WHERE ONLY C M Y ARE USED

| PALETTE DATA | CYAN (C) | MAGENTA (M) | YELLOW (Y) | BLACK (BK) | S1 | S2 | S3 | S4 |
|---|---|---|---|---|---|---|---|---|
| 0 | 0 | 0 | 0 | 0 | 0 | 0 | 0 | 0 |
| 1 | 255 | 0 | 0 | 0 | 0 | 0 | 0 | 0 |
| 2 | 0 | 255 | 0 | 0 | 0 | 0 | 0 | 0 |
| ---- | ---- | ---- | ---- | ---- | ---- | ---- | ---- | ---- |
| 255 | 0 | 255 | 255 | 0 | 0 | 0 | 0 | 0 |

FIG. 6

CASE WHERE C M Y K ARE USED

| PALETTE DATA | CYAN (C) | YELLOW (Y) | MAGENTA (M) | BLACK (BK) | S1 | S2 | S3 | S4 |
|---|---|---|---|---|---|---|---|---|
| 0 | 0 | 0 | 0 | 0 | 0 | 0 | 0 | 0 |
| 1 | 0 | 0 | 0 | 255 | 0 | 0 | 0 | 0 |
| ---- | ---- | ---- | ---- | ---- | ---- | ---- | ---- | ---- |
| 255 | 0 | 255 | 0 | 0 | 0 | 0 | 0 | 0 |

FIG. 7

CASE WHERE C M Y S1 S2 ARE USED

| PALETTE DATA | CYAN (C) | MAGENTA (M) | YELLOW (Y) | BLACK (BK) | S1 | S2 | S3 | S4 |
|---|---|---|---|---|---|---|---|---|
| 0 | 0 | 0 | 0 | 0 | 255 | 0 | 0 | 0 |
| 1 | 0 | 0 | 0 | 0 | 0 | 255 | 0 | 0 |
| 2 | 0 | 0 | 0 | 0 | 0 | 0 | 0 | 0 |
| ---- | ---- | ---- | ---- | ---- | ---- | ---- | ---- | ---- |
| | | | | | | | | |
| 255 | 0 | 0 | 255 | 0 | 0 | 255 | 0 | 0 |

FIG. 8

CASE WHERE C M Y S1 S2 S3 S4 ARE USED

| PALETTE DATA | CYAN (C) | MAGENTA (M) | YELLOW (Y) | BLACK (BK) | S1 | S2 | S3 | S4 |
|---|---|---|---|---|---|---|---|---|
| 0 | 0 | 0 | 0 | 0 | 0 | 0 | 255 | 0 |
| 1 | 0 | 0 | 0 | 0 | 0 | 0 | 0 | 255 |
| 2 | 0 | 0 | 255 | 0 | 255 | 0 | 0 | 0 |
| ---- | ---- | ---- | ---- | ---- | ---- | ---- | ---- | ---- |
| 254 | 0 | 0 | 0 | 255 | 0 | 0 | 255 | 0 |
| 255 | 0 | 0 | 0 | 0 | 0 | 255 | 0 | 255 |

FIG. 22

| PALETTE DATA | CYAN | MAGENTA | YELLOW | BLACK | S1 | -- | S4 |
|---|---|---|---|---|---|---|---|
| 0 | 0 | 0 | 0 | 0 | 0 | -- | 0 |
| 1 | 0 | 0 | 0 | 0 | 0 | -- | 0 |
| 2 | 0 | 0 | 0 | 0 | 0 | -- | 0 |
| 3 | 0 | 0 | 0 | 0 | 0 | -- | 0 |
| 4 | 0 | 0 | 0 | 0 | 0 | -- | 0 |
| 5 | 0 | 0 | 0 | 0 | 0 | -- | 0 |
| 6 | 0 | 0 | 0 | 0 | 0 | -- | 0 |
| ⋮ | ⋮ | ⋮ | ⋮ | ⋮ | ⋮ | ⋮ | ⋮ |
| 254 | 0 | 0 | 0 | 0 | 0 | -- | 0 |
| 255 | 0 | 0 | 0 | 0 | 0 | -- | 0 |

FIG. 45

| | INK | 25°C VISCOSITY (cp) | SURFACE TENSION (dyn / cm) | CLOTH | PRINTING APPARATUS a. | | | | PRINTING APPARATUS b. | | | |
|---|---|---|---|---|---|---|---|---|---|---|---|---|
| | | | | | NUMBER OF DISCHARGE FAILURES | *1 AVERAGE LENGTH OF DISCHARGE FAILURE (cm) | *2 BLUR | *3 HEAD ORIFICE SURFACE | NUMBER OF DISCHARGE FAILURES | *1 AVERAGE LENGTH OF DISCHARGE FAILURE (cm) | *2 BLUR | *3 HEAD ORIFICE SURFACE |
| EXAMPLE 1 | A | 3.3 | 43 | a. | 6 | 6.0 | △ | △ | 1 | 1.5 | △ | ○ |
| EXAMPLE 2 | B | 3.7 | 50 | a. | 10 | 6.0 | ○ | △ | 0 | 0 | ○ | ○ |
| EXAMPLE 3 | C | 3.3 | 38 | a. | 6 | 7.0 | △ | △ | 1 | 1.0 | △ | ○ |
| EXAMPLE 4 | D | 3.7 | 52 | a. | 9 | 5.0 | ○ | △ | 0 | 0 | ○ | ○ |
| COMPARISON 1 | E | 4.2 | 38 | a. | 20 | 15.0 | △ | × | 1 | 2.0 | △ | ○ |
| COMPARISON 2 | F | 1.4 | 58 | a. | 30 OR MORE | 18.0 | △ | × | 1 | 1.0 | △ | ○ |
| COMPARISON 3 | G | 3.7 | 33 | a. | 30 OR MORE | 20.0 | × | × | 2 | 1.5 | × | △ |
| COMPARISON 4 | H | 1.8 | 66 | a. | 30 OR MORE | 15.0 | △ | △ | 1 | 1.0 | △ | ○ |
| EXAMPLE 5 | I | 2.8 | 59 | b. | 3 | 4.0 | ○ | ○ | 0 | 0 | ○ | ○ |
| EXAMPLE 6 | J | 3.3 | 58 | b. | 5 | 4.5 | ○ | ○ | 0 | 0 | ○ | ○ |

CLOTH CONVEYER SIDE

INK-JET PRINTER SIDE

INK-JET PRINTING APPARATUS AND METHOD, AND PRINTED MATTER OBTAINED THEREBY AND PROCESSED ARTICLE OBTAINED FROM PRINTED MATTER

BACKGROUND OF THE INVENTION

1. Field of the Invention

The resent invention relates to an ink-jet printing apparatus and method for printing a color image on a recording medium based on received image data and, printed matter obtained by the ink-jet printing apparatus and a processed article obtained from the printed matter.

2. Description of Related Art

Conventionally, ink-jet printing apparatuses have been developed for printing color images on a large-sized recording medium such as a cloth. Desired images are printed on, e.g., wall paper and textiles, using these apparatuses.

In printing, to convey such large-sized recording medium, the printing apparatus has a printing-medium conveying mechanism and a printing mechanism, constructed separately, including, upper and lower ink-jet heads. The lower ink-jet head performs printing based on thinned image data, and the upper ink-jet head performs printing based on residual image data to complete the image. This reduces the amount of ink to be discharged on a predetermined area on a cloth as the recording medium, thus raising ink-absorbing rate and drying efficiency.

In the above-mentioned conventional apparatus, synchronization between the printing mechanism and the cloth-feeding mechanism is important. When the printing apparatus has upper and lower printing heads, and cloth is fed from a lower position to an upper position, when the printing operation is terminated at one point, a portion printed by only the lower printing head remains incomplete. The printing operation must be continued to complete the printed image of this portion.

Further, if the apparatus uses only one controller for controlling the cloth-feeding mechanism for conveying a large-sized recording medium and the printing mechanism, a long time period is required for conveying the recording medium, and printing efficiency is lowered. For example, upon printing, the printing head carriage on which the printing head is mounted must precisely move at a high speed while the cloth is conveyed precisely by rotating a motor. To control these operations simultaneously, a high-speed CPU is necessary, and the control becomes complicated.

Furthermore, a large-sized cloth has seams, normally raised above other portions. Since the space between the end portion of the ink-jet head and the recording medium is very small, if the image is printed on the seam, the end portion of the ink-jet head contacts the risen portion, and the seam gets soaked with ink from the head nozzles by capillary action and the recording medium is soiled.

SUMMARY OF THE INVENTION

The present invention has been made in consideration of the above situation, and has as its object to provide an ink-jet printing apparatus and method which separately comprises a printing mechanism and a recording medium conveying mechanism, synchronized with each other, for efficient printing processing.

Another object of the present invention is to provide an ink-jet printing apparatus and method for, even if printing operation is stopped, completing printed image at the point.

Another object of the present invention is to provide an ink-jet printing apparatus and method for preventing soiling of a recording medium.

A further object of the present invention is to provide printed matter obtained by an ink-jet printing apparatus of the present invention and a processed article obtained from the printed matter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates an example of a palette conversion table (CMY) generated in accordance with the procedure in FIG. 4;

FIG. 6 illustrates an example of the palette conversion table (CMYK);

FIG. 7 illustrates an example of the palette conversion table (CMY S1 S2);

FIG. 8 illustrates an example of the palette conversion table (CMY S1 S2 S3 S4);

FIG. 22 illustrates data which is set to prevent abnormal output before inputting of conversion parameters;

FIG. 45 illustrates an example of the comparison between printing results by the printing system of the embodiment;

DETAILED DESCRIPTION OF THE PREFERRED EMBODIMENT(S)

Preferred embodiments of the present invention will be described in detail in accordance with the following order referring to accompanying drawings.

Figure 1:
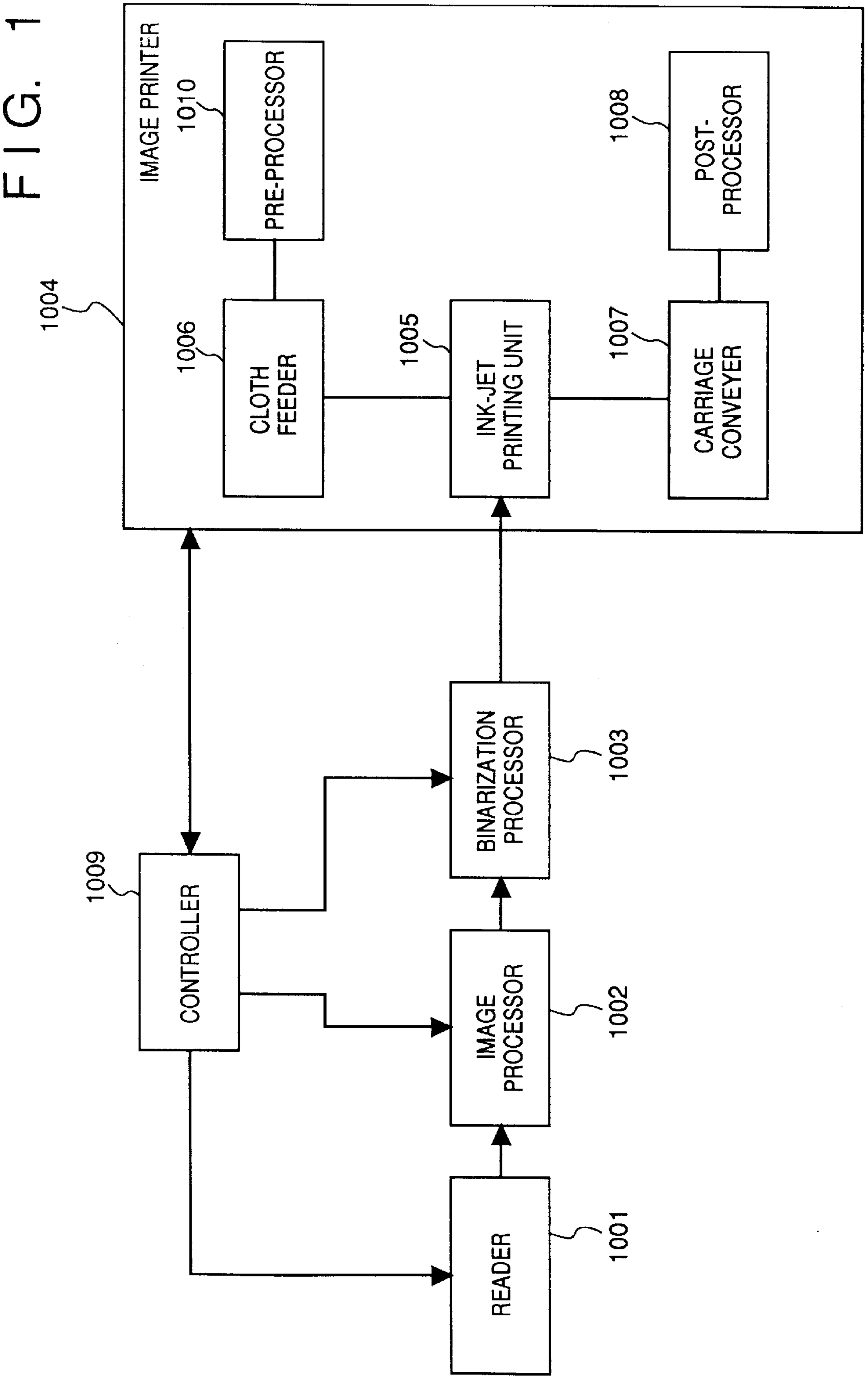
FIG. 1 is a block diagram showing the configuration of a printing system according to an embodiment of the present invention.
Figure 2:
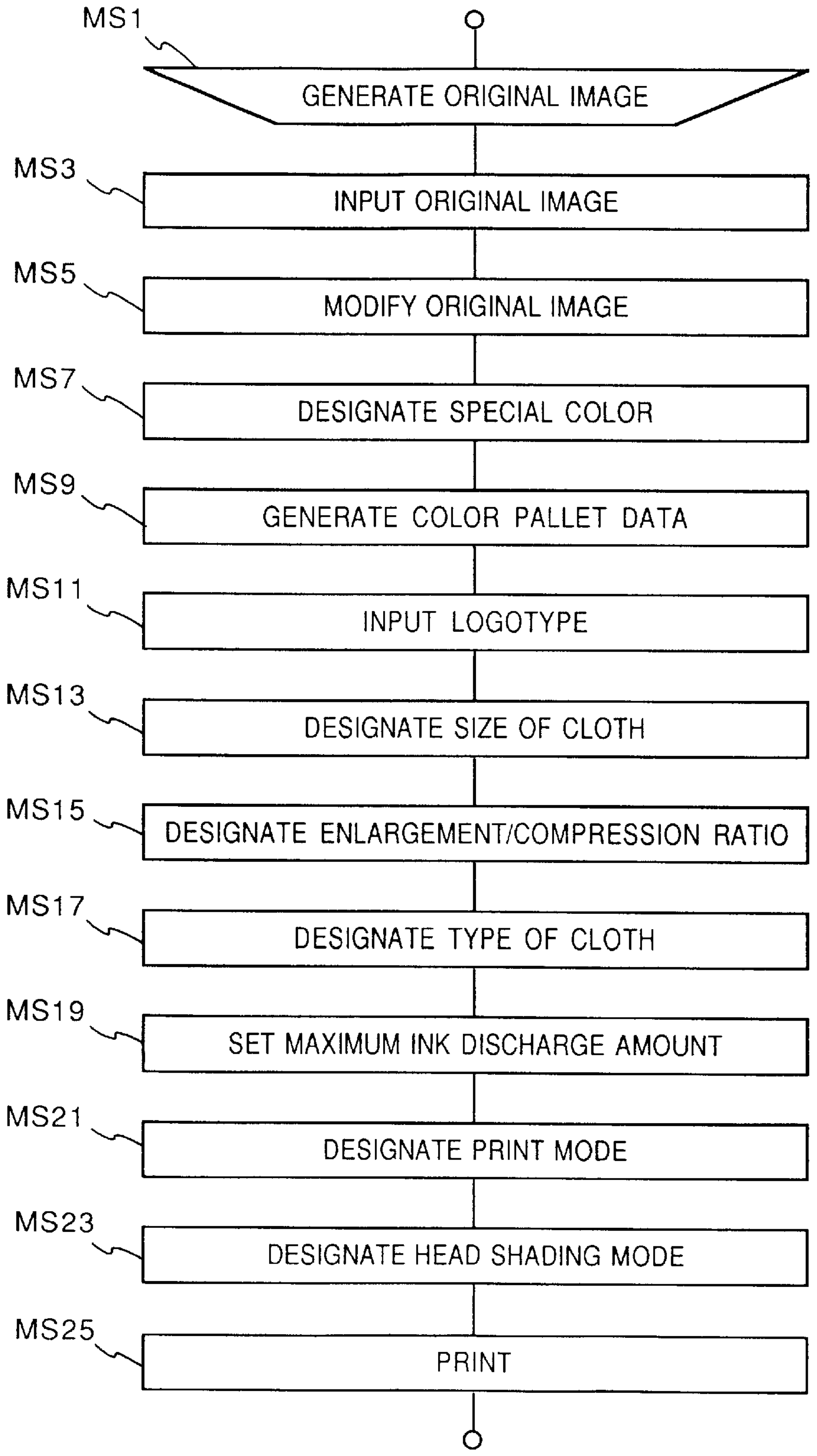
FIG. 2 is a flowchart showing the outline of a printing procedure in the printing system.

(1) System Configuration (FIGS. 1 and 2)

(2) Controller (FIGS. 3 to 12)

(2-1) Construction (2-2) Operation (3) Ink-jet Recorder (FIGS. 13 to 45)

(3-1) Printing Mechanism (3-2) Construction (3-3) Basic Image Print Pattern (3-4) Downloading of Conversion Data and Parameters (4) Other Constructions (FIGS. 46 to 60)

(5) Operation of Overall Apparatus (FIGS. 61 to 68)

(1) System Configuration

FIG. 1 shows the configuration of the printing system according to the embodiment of the present invention. The system comprises a reader 1001 for reading an original image by a designer, an image processor 1002 for processing original data read by the reader 1001, a binarization processor 1003 for binarizing the image data processed by the image processor 1002, and an image printer 1004 for printing an image on cloth based on the binarized image data.

In the reader 1001, a CCD image sensor reads an original image and outputs read image data as an electric signal to the image processor 1002. The image processor 1002 generates recording data, based on the input original data, for driving an ink-jet printing unit 1005, to be described later, which discharges magenta, cyan, yellow and black inks. Upon generating the recording data, image processing for ink-dot representation, color arrangement for determining color tones, changing of layout, selection of the size of a pattern for enlargement/reduction are performed. A controller 1009 controls the reader 1001, the image processor 1002 and the binarization processor 1003.

The image printer 1004 includes a pre-processor 1010 for pre-processing the cloth to be printed, an ink-jet printing unit 1005 for discharging inks in accordance with the printing data, a cloth feeder 1006 for feeding the cloth to the ink-jet printing unit 1005, a carriage conveyer 1007, opposing to the ink-jet printing unit 1005, for precisely conveying the cloth, and a post-processor 1008 for post-processing the printed cloth and accommodating the cloth. The construction of the image printer 1004 will be described in detail later.

FIG. 2 is a flowchart showing an example of textile-printing procedure using the printing system.

Original Image Generating Step MS1

In this step, an original image, i.e., a basic image as a basic unit of an image to be repeatedly printed on a cloth which is the recording medium, is generated by a designer. Upon generating an original image, respective portions of data source which supplies image data to the system, e.g., an input unit and a display unit may be used.

Original Image Input Step MS3

In this step, the original image generated in original image generating step MS1, or original data stored in an external storage device (FIG. 3) is read by the reader 1001, or original data from a LAN 1016 is received.

Original Image Modification Step MS5

The printing system enables selection of a repeated pattern from a variety of patterns with respect to the basic image. Some selected patterns may cause undesirable positional deviation of the image and color tone discontinuity at the boundary portion. In this step, repeated pattern is selected and modification of discontinuity at the boundary portion is made in accordance with the selected pattern. More specifically, the designer or operator may perform modification using a mouse or other input device while making reference to the image on a display (not shown) connected to the controller 1009. Otherwise, the image processor 1002 may perform automatic modification.

Special Color Designation Step MS7

The image printer 1004 of the present embodiment basically uses yellow (Y), magenta (M) and cyan (C) or black (BK) inks for printing. In actual printing, however, use of additional colors ,e.g., metallic colors such as gold and silver, vivid colors such as red (R), green (G) and blue (B) may be required. A printer P of this embodiment enables printing using these special color inks. In this step, special colors are designated.

Color Pallet Data Generating Step MS9

The designer draws the original image while selecting colors from a standard color patch. The reproducibility of the selected color at the time of the printing operation considerably affects the productivity of the printing system. Accordingly, in this step, data to determine the mixture ratio of Y, M, C or a special color is generated in order to satisfactorily reproduce the selected standard color.

Logotype Input Step MS11

Dry goods usually have a logotype of a designer or a brand of the manufacturer. In this step, a logotype, the color, the size, and the position are designated.

Cloth Size Designation step MS13

In this step, the width and the length of the cloth to be printed are set. This determines the length of scanning by a printing head of the printer P in the main-scanning direction and the subscanning direction, and the number of repetitions of the original image.

Original Image Enlargement/Reduction Ratio Setting Step MS15

In this step, enlargement/reduction ratio to the original image (e.g., 100%, 200% and 400%) at the printing operation is set.

Cloth Type Desianation Step MS17

Cloths are categorized by natural fiber such as cotton, silk and wool, and synthetic fiber such as nylon, polyester and acrylic fiber having different characteristics relating the printing process. Further, generation of lines in the boundary portion becomes different at each printing in main scanning direction even if the amount of feed of a cloth is the same in each printing, which may depend on the difference in the elongation and contraction of the cloth. Accordingly, in this step, the type of cloth to be printed is inputted for setting of appropriate feeding amount in the image printer 1004.

Maximum Ink Discharge Amount Setting Step MS19

Even if the same amount of ink is emitted to the cloth, the density of the image reproduced on the cloth becomes different depending upon the type of the cloth. Further, the structure of the fixing system in the image printer 1004 may cause difference in ink discharge amount. In this step, the maximum ink discharge amount is set in accordance with the fixing system of the image printer 1004.

Printina Mode Designating Step MS21

Whether the image printer 1004 performs high-speed printing or normal printing, or whether ink discharging is made once or plural times per one-dot printing is designated. Further, upon interruption of printing, whether control must be performed so that the pattern will continue or printing will be restarted regardless of the continuity of the pattern is designated.

Head Shading Mode Designation Step MS23

In a case where the image printer 1004 uses a printing head having a plurality of ink discharge ports, ink discharge amount or discharge direction may be varied for each outlet port of the printing head depending upon the dispersion due to the manufacturing process and/or the way of use. To correct such variation, a process (head shading) is effected for correcting the driving signal for each discharge port to make the ink discharge amount be constant. In this step, the timing of the head shading can be designated.

Printing Step MS25

In accordance with the above designations, the image printer 1004 performs printing.

If any of these designation steps is unnecessary, it can be omitted. Contrary, other designation steps can be added in accordance with necessity.

(2) Reader 1001, Image Processor 1002, Binarization Processor 1003 and Controller 1009

(2-1) Construction

Figure 3:
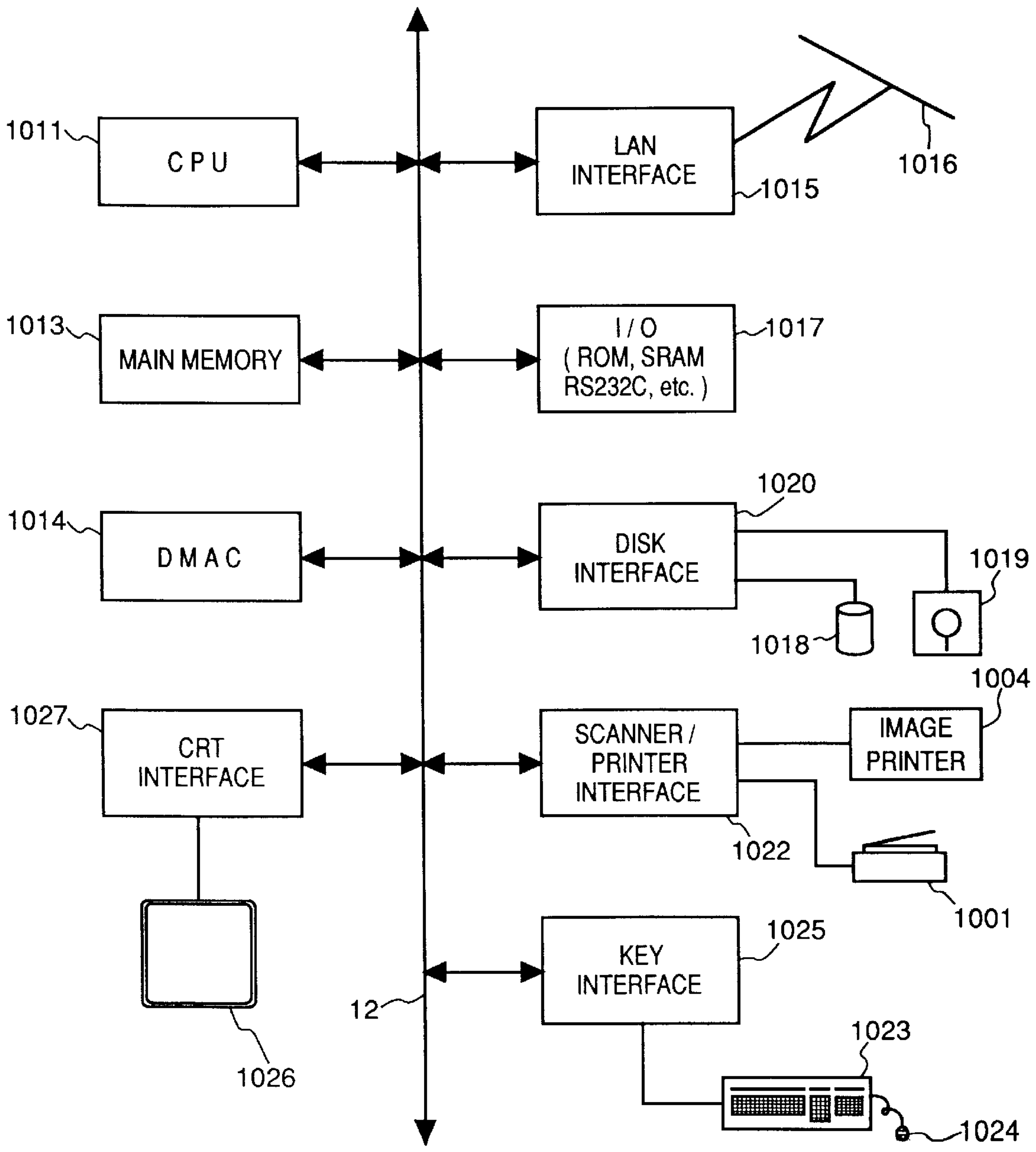
FIG. 3 is a block diagram showing construction of a controller of the system according to the embodiment.

FIG. 3 is a block diagram showing the construction of a controller of the printing system. In FIG. 3, reference numeral 1011 denotes a CPU for controlling the overall system; 1013, a main memory in which programs executed by the CPU 1011 are stored and which is used as a work area while the programs are executed; 1014, a DMA controller (DMAC) for data transmission between the main memory 1013 and various devices constructing the system without the control of the CPU 1011; 1015, a LAN interface between the LAN 1016 and the system; 1017, an input-output unit (I/O) having a ROM, a SRAM and RS232C interface, connectable to various external devices; 1018 and 1019, a hard disk device and a floppy disk device as the external devices; 1020, a disk interface for signal connection between the hard disk device 1018 and/or the floppy disk device 1019 and the system; 1022, a scanner/printer interface, which can be a GPIB interface, for signal connection between the image printer 1004 and the reader 1001; 1023, a keyboard for inputting various character information, control information and the like; 1024, a mouse as a pointing device; 1025, a key interface for signal connection among the keyboard 1023, the mouse 1024 and the system; 1026, a display device such as a CRT, controlled by an interface 1027; and 1012, a system bus comprising a data bus, a control bus and an address bus for the signal connections among the respective devices.

(2-2) Operation

In the system connected to various devices as described above, the designer or operator performs operations while corresponding to various information items displayed on the CRT 1026. That is, character and/or image information supplied from the LAN 1016, the external device connected to the I/O 1017, the hard disk device 1018, the floppy disk device 1019, the reader 1001, the keyboard 1023 and the mouse 1024, further, operation information stored in the main memory 1013 are displayed on the CRT 1026. The designer or operator issues a designation of the variety of information items and issues an instruction to the system while observing the display.

Some of the processes among the steps in FIG. 2 relating to the essential portion of this embodiment performed by using the system shown in FIG. 3 will be described in detail below.

Figure 4:
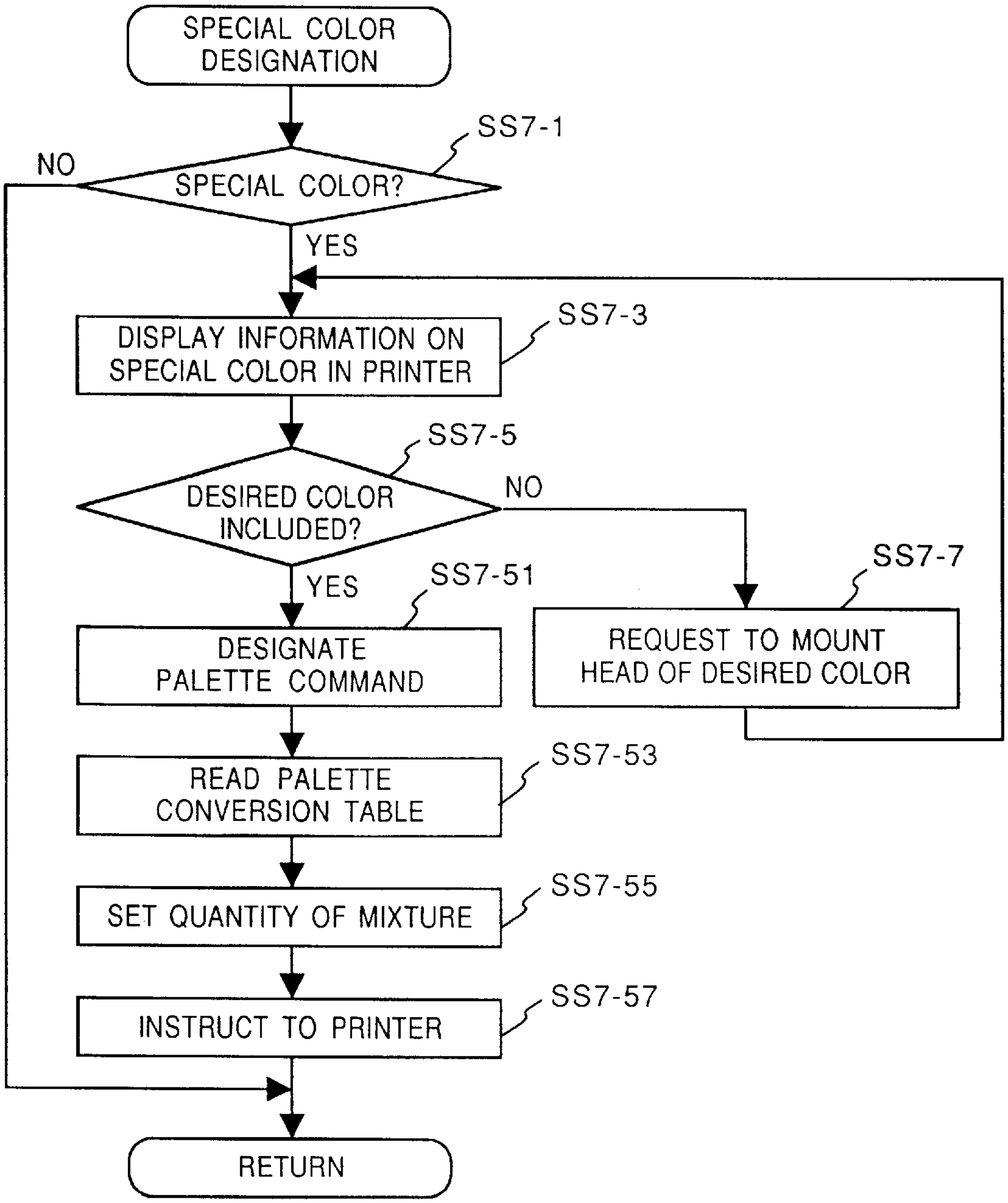
FIG. 4 is a flowchart showing an example of a special color designating procedure in FIG. 2.

FIG. 4 shows an example of the special color designation procedure. In this procedure, the controller 1009 outputs a palette conversion table, indicating the mixture ratio of Y, M, C, BK and special colors, to the image printer 1004. In step SS7-1, whether or not use of special colors has been designated is determined. If NO, the procedure ends at once, while if YES, the process proceeds to step SS7-3, in which information on the current special colors in the image printer 1004 are displayed on the CRT 1026. This processing can be made by using the invention disclosed in Japanese Patent Application Laid-Open No. 2-187343 by the present applicant, in which a printing head has a means (pattern cutting) for presenting information on the head itself and the printing main body side can recognize the information by the means. This printing-head information presenting means may comprise an EPROM or a DIP switch. In this system, the means may present information on ink colors to be used by the printing head. The image printer 1004 may read the information and notify the information to the CPU 1011 of the controller 1009. The operator may observe the information displayed on the CRT 1026 and know used/non-used status of special-color printing head and a currently-used special color, to perform key operation such as whether or not a desired special color is included (i.e., whether or not the present status is allowed) in step SS7-5. If NO, the process proceeds to step SS7-7, a request for mounting a printing head of the desired special color is displayed. In response to the mounting of the special color printing head, the process returns to step SS7-3.

If YES in step SS7-5, i.e., the present printing head is allowed, the process proceeds to step SS7-51 in which a palette command to define color combination is designated. For example, a case where C, M and Y colors are used, a case where special colors S1 and S2 are used in addition to the C, M and Y colors, or a case where special colors S3 and S4 are used in addition to the C, M, Y, S1 and S2 colors, can be designated by using one of numerals "3", "4", "6" and "8".

In correspondence with this designation, a palette conversion table pre-stored in a storage (e.g., the main memory 1013, the external storage 1018 or 1019) is read in step SS7-53. The operator modifies the table data if necessary, and sets the mixture amounts of the respective colors in step SS7-55. The table data is transmitted together with the palette command to the image printer 1004 in step SS7-57. FIGS. 5 to 8 show examples of the palette conversion table.

The processing circuit employed in the image printer 1004 may be a circuit to be described later with reference to FIGS. 15 to 19.

Figure 9:
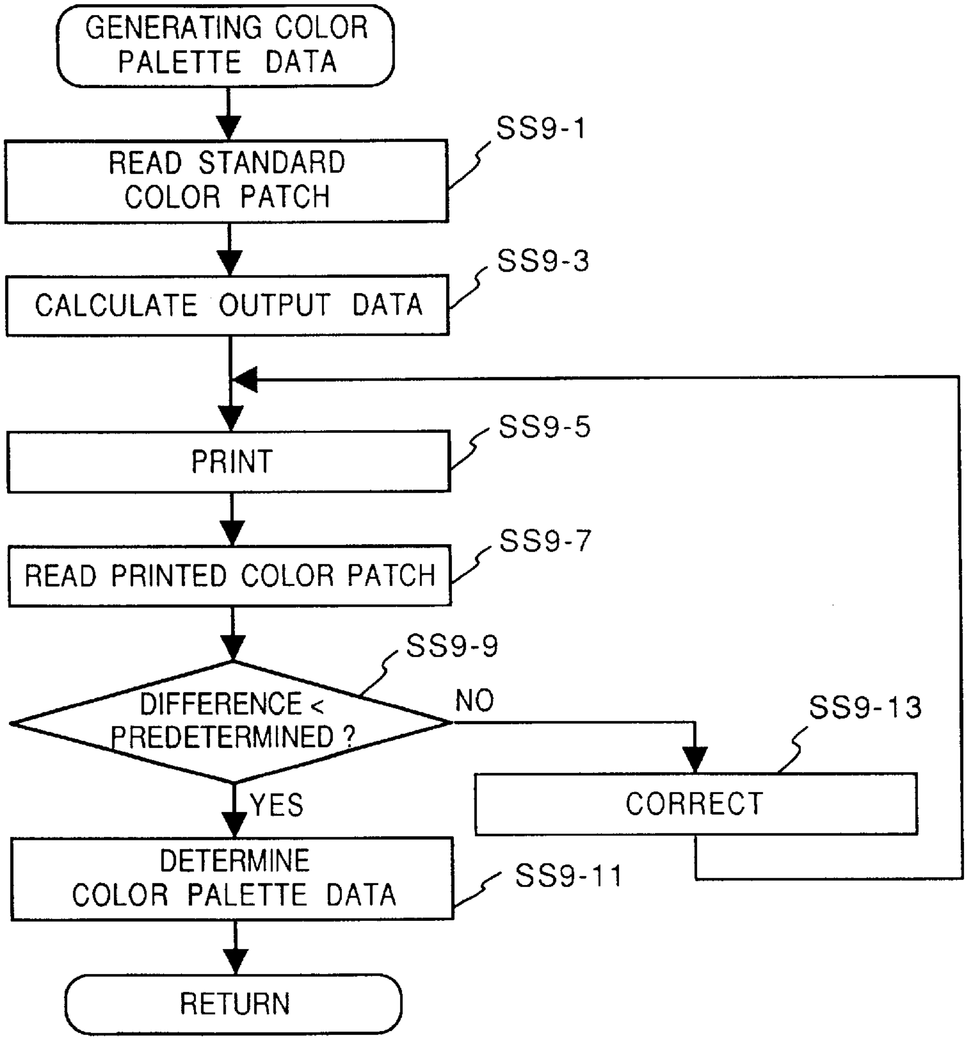
FIG. 9 is a flowchart showing an example of a color palette data generating procedure in FIG. 2.

FIG. 9 shows an example of procedure of the color palette data generation step MS9 in FIG. 2.

In step SS9-1, a standard color patch of the color selected by the designer is read. In order to read the color patch, the reader 1001 or a reading unit to be described later provided in the image printer 1004 may be used. In step SS9-3, palette conversion data including the special color is calculated from the palette conversion table previously set in accordance with codes corresponding to the standard color patch to match the image printer 1004. An image is formed in accordance with the calculated data including the special color. In step SS9-5, the formed image is printed in the form of a color patch.

Next, in step SS9-7, the color patch printed by the image printer 1004 is read, and in step SS9-9, the color data is compared with the color data obtained in step SS9-1. If the difference between these data is less than a predetermined value, the color palette conversion data is adopted and set in the image printer 1004, on the other hand, if the difference is equal to or greater than the predetermined value, the palette data is corrected based on the difference in step SS9-9, then the process returns to step SS9-5. Thus, the processing is repeated until the determination becomes affirmative in step SS9-9. It should be noted that the special color designation as shown in FIG. 4 has been described using the special colors S1 to S4, however, in each case using each of the special colors S1 to S4, the operator can correct the palette conversion table based on the data obtained in this procedure. The present embodiment enables appropriate selection of ink-color combinations including special colors corresponding to codes of the color selected by the designer in the form of a color patch.

Figure 10:
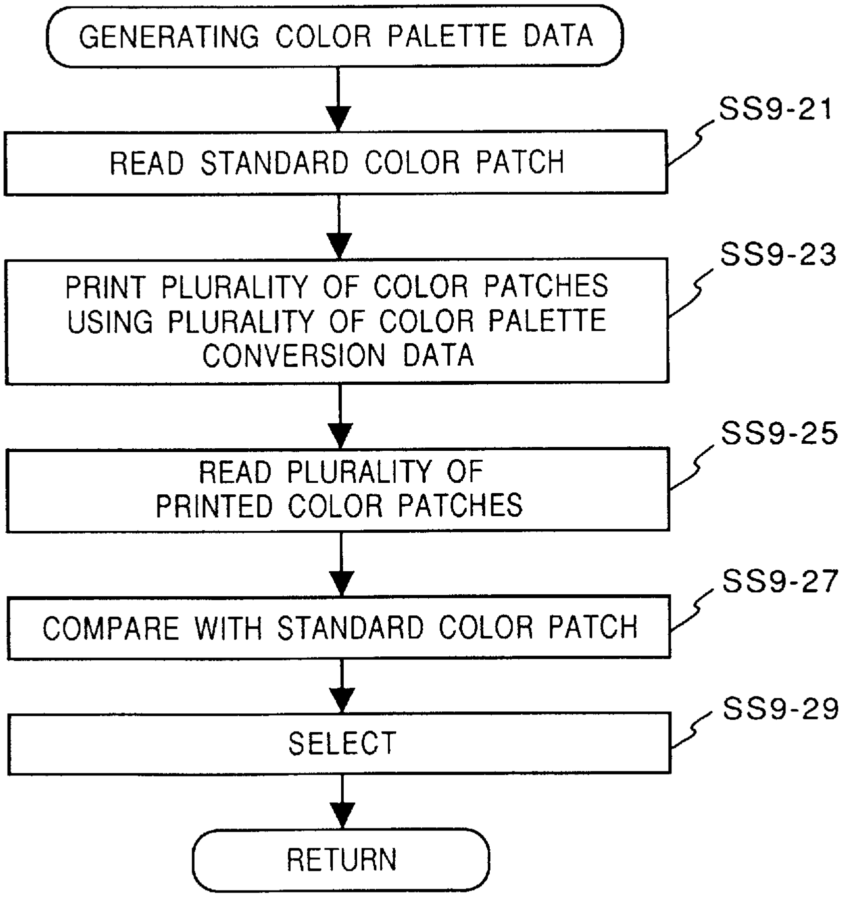
FIG. 10 is a flowchart showing another example of the color palette data generating procedure.

FIG. 10 shows the procedure of the color palette data generating step in FIG. 2.

In step SS9-21 similar to step SS9-1, the standard color patch is read. In step SS9-23, a plurality of color palette conversion data are prepared, and a plurality of color patches are printed based on those data. In step SS9-25, the plurality of printed color patches are read, then in step SS9-27, color data obtained from the color patches are compared with the color data obtained in step SS9-21. In step SS9-29, data closest to the color data obtained in step SS9-21, i.e., data having the highest color-reproducibility is selected, and the color palette conversion data is adopted and set in the image printer 1004.

The plurality of color palette conversion data may have variation in the ink-mixture amount by a predetermined amount for all color printing heads. Otherwise, a predetermined range is selected with the data obtained in step SS9-21 or the data set by the operator in the procedure in FIG. 4 as the standard data, and the ink-mixture amount varies by a small amount within the range. In this procedure, the correction and re-printing as shown in FIG. 9 can be omitted, thus the color palette conversion data can be generated at high-speed.

Figure 11:
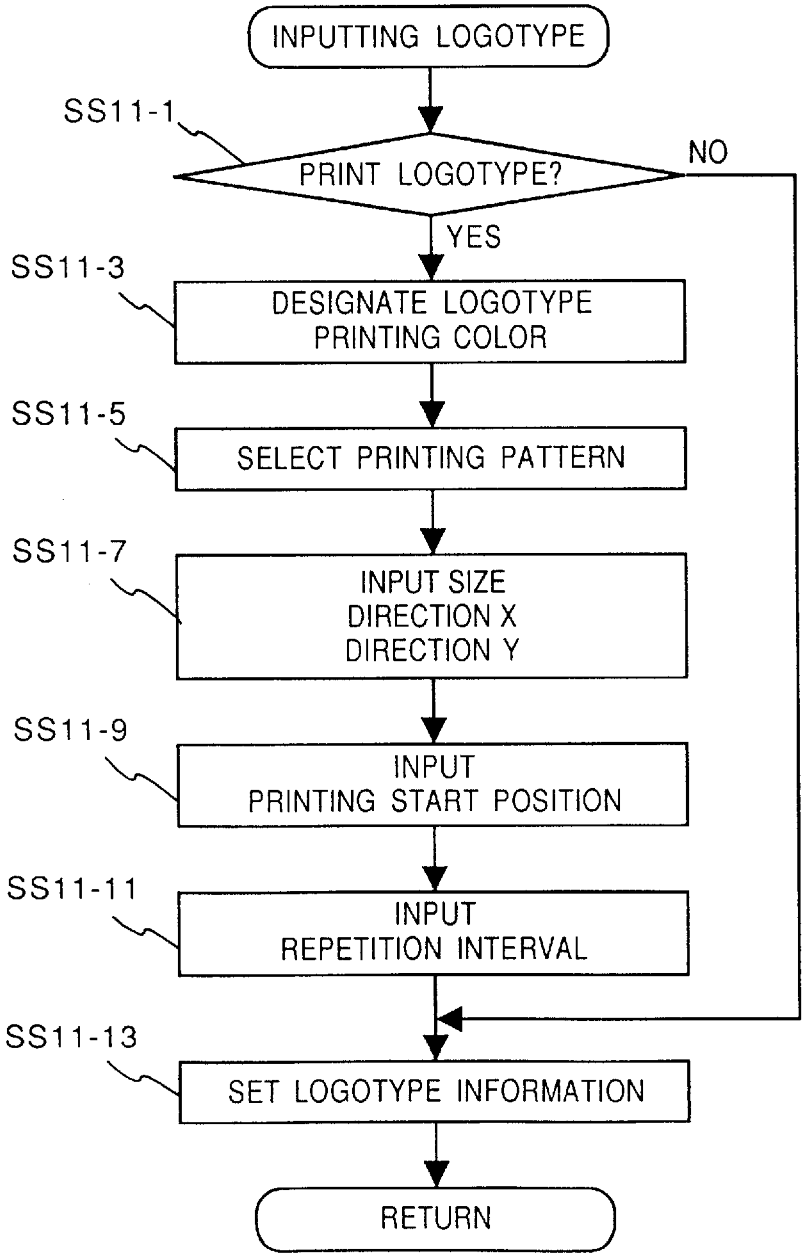
FIG. 11 is a flowchart showing an example of a logotype inputting procedure in FIG. 2.

FIG. 11 shows an example of the procedure of the logotype input step in FIG. 2.

In step SS11-1, an inquiry whether or not a logotype is inputted is made to the operator in step SS11-1. If YES, the process proceeds to step SS11-3 in which the color of the logotype to be printed is designated. The color may be selected from the primary colors C, M, Y, BK and the special colors S1 to S4.

In step SS11-5, a logotype is selected from a plurality of logotypes, (e.g., four) to be described later prepared in the image printer 1004.

In step SS11-7, the size of the logotype to be printed in the main-scanning direction (a Direction X) and the subscanning direction (a direction Y) in the printing process is designated. The maximum size is 512 pixels, with one pixel as a unit in the X direction and 8 recording bands, with one recording band, i.e., recording width of one scanning by the recording head as a unit in the Y direction.

In step SS11-9, a logotype printing start position in the Direction X is designated. As mentioned above, up to 512 pixels can be designated with one pixel as a unit.

In step S11-11, a logotype printing start position in the direction Y is designated. As mentioned above, up to 256 bands with one band as a unit can be designated. Note that information may be presented to the operator in order to notify that the designated value should not be less than the Y-directional is designated in step SS11-7.

Figure 12:
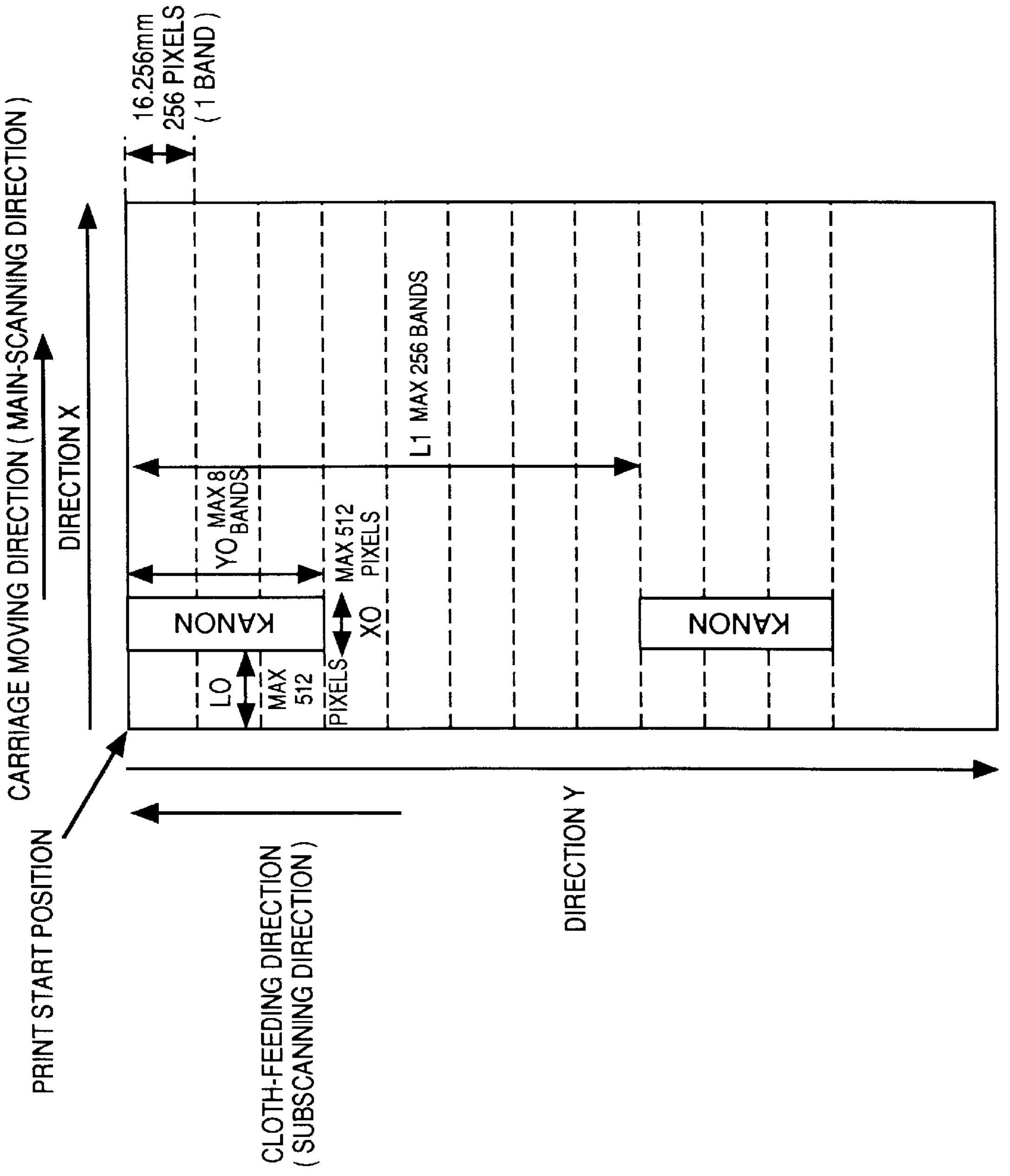
FIG. 12 illustrates a logo-print format corresponding to data designated in FIG. 11.

In step SS11-13, the controller 1009 sets logotype information in the image printer 1004 in accordance with the above designations. Data format for this setting is, e.g., "<WLOGO>, <color>, <pattern>, <X0>, <Y0>, <L0>, <L1>". In this example, <WLOGO> is an identification code for the image printer 1004 to recognize the following data is logotype information. <color>, data for color setting, may be a 1-byte signal capable of allocating 1 bit to each of the 8 colors and outputting/masking the subject color by turning on/off the 1 bit. <pattern>, data for setting the logotype pattern, may be a 2-bit signal for selecting one of four types. <X0>, <Y0>, <L0> and <L1> are respectively data for setting the X-directional size of the logotype, the Y-directional size, the X-directional printing start position, and the Y-directional repetition interval of printing the logotype. FIG. 12 shows the relation between these data and the output format.

(3) Ink-Jet Printing Unit (3-1) Printing Mechanism

The operation of a serial type ink-jet printing apparatus according to the present embodiment will be described with reference to FIG. 13.

Figure 13:
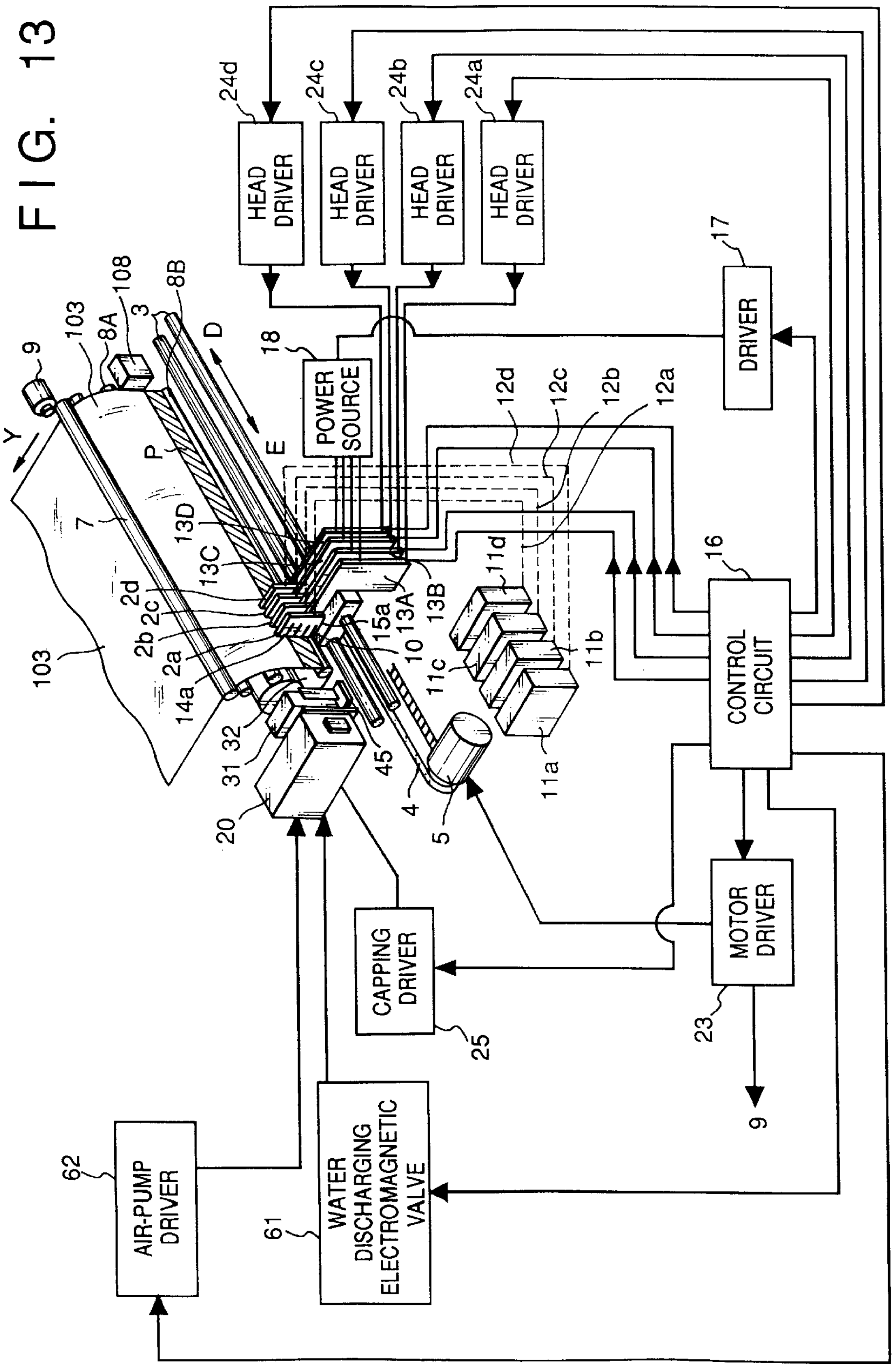
FIG. 13 is a perspective view showing the mechanical construction of an ink-jet printing unit applied to the embodiment.

In FIG. 13, a carriage 1 has color printing heads 2*a* to 2*d* respectively corresponding to cyan (C), magenta (M), yellow (Y) and black (BK). A guide shaft 3 supports the movement of the carriage 1 by guiding it. Though omitted from the illustration for the purpose of simplification, up to four heads for special colors can be mounted on the carriage 1, and the related mechanisms can be provided for the structure. Each head may be attached/detached from the carriage 1 individually or in several heads units.

An endless belt 4 is fixed to the carriage 1 at its one portion and arranged on a gear attached to a driving shaft of a carriage driving motor 5 (driven by a motor driver 23). Driving the carriage driving motor 5 moves the belt 4 fastened to the drive shaft, as a result, the carriage 1 scans the printing surface of a recording medium 103 (recording sheet or a cloth) along the guide shaft 3. Further, the recording apparatus comprises a conveying roller 7, guide rollers 8A and 8B for guiding the recording medium 103 and a recording medium conveying motor 9.

The printing heads 2*a* to 2*d* and the special color printing heads respectively have 256 outlet ports for discharging ink droplets to the recording medium 103 at 400 dpi (dot per inch) density. Ink tanks 11*a* to 11*d* corresponding to the printing heads 2*a* to 2*d* (and special color ink tanks) supply inks via supply tubes 12*a* to 12*d* (and special color ink supply tubes) to the printing heads. Head drivers 24*a* to 24*b* corresponding to the printing heads 2*a* to 2*d* (and special color printing head drivers) selectively supply an ink discharge signal via corresponding flexible cables 13*a* to 13*d* (and special color flexible cables) to an energy generating unit (not shown) provided in the liquid passages led to each outlet port.

The printing heads 2*a* to 2*d* have head heaters 14*a* to 14*d* (14*b* to 14*d* are not shown) and temperature detection units 15*a* to 15*d* (15*b* to 15*d* are not shown). A control circuit 16 having a CPU inputs detection signals from the temperature detection units 15*a* to 15*d*. The control circuit 16 controls heating of the head heaters 14*a* to 14*d* via a driver 17 and a power source 18 based on the input signals.

A capping unit 20 is in contact with the outlet port surface of the printing heads 2*a* to 2*d* to prevent drying of the outlet ports and intrusion of foreign matters into the outlet ports or to remove the foreign matters. More specifically, when printing is not performed, the printing heads 2*a* to 2*d* move to positions opposing to the capping unit 20. The capping unit 20, driven by a capping driver 25, presses an elastic member to contact with the outlet port surface, thus performing capping. It should be noted that a capping unit for a special color printing head omitted in FIG. 13 is also provided.

A clog prevention unit 31 receives inks discharged in idle discharge operation by the printing heads 2*a* to 2*d*. The clog prevention unit 31 has a liquid receiving member 32, opposing to the printing heads 2*a* to 2*d*, for receiving discharged inks, and the clog prevention unit 31 is disposed between the capping unit 20 and the recording start position. As a preferable material for the liquid receiving member 32 and a liquid holding member 45, sponge porous material or a plastic sintered member can be used.

The capping unit 20 is connected to a water discharging electromagnetic valve 61 and an air-pump driver 62 respectively for actuating discharging water for washing and driving an air-jetting nozzle provided within the capping unit 20, under the control of the control circuit 16.

Figure 14:
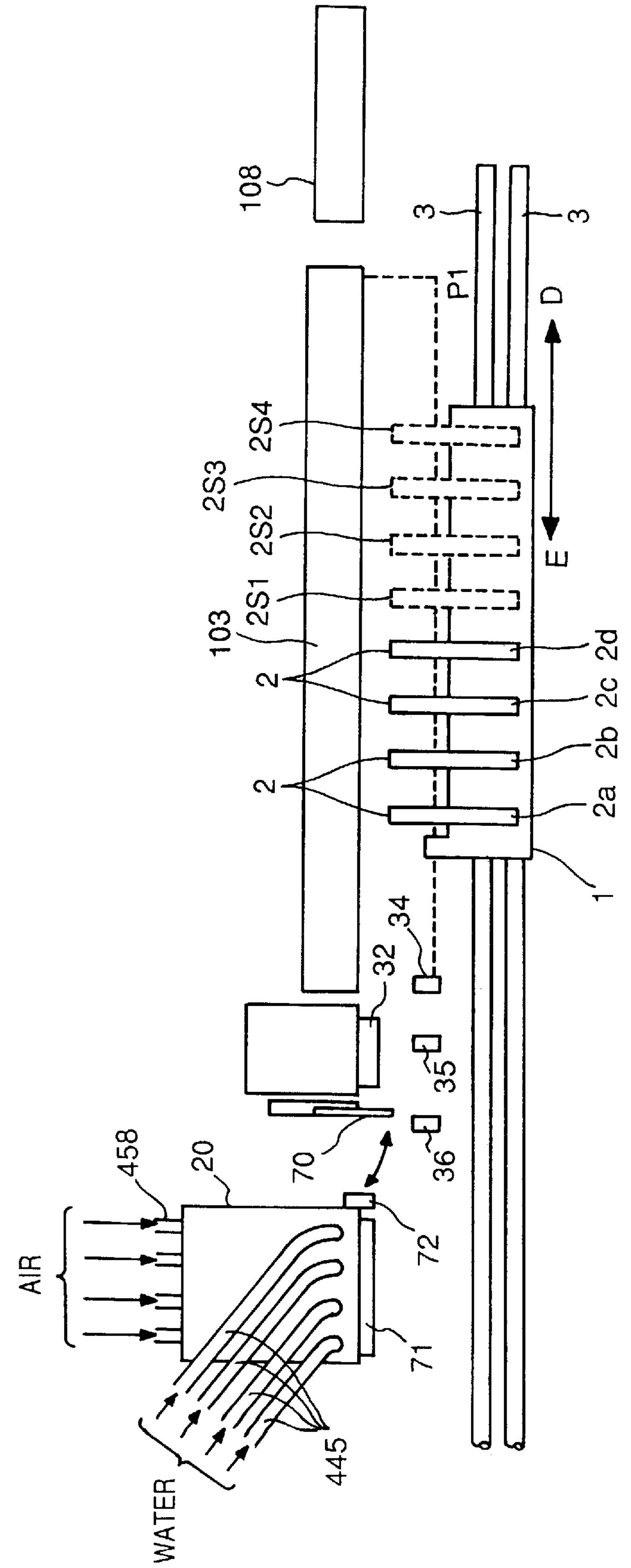
FIG. 14 is a plan view of the ink-jet printing unit.

FIG. 14 is a plan view for explaining the operation of the printing head of the embodiment. In FIG. 14, the same elements as those in FIG. 13 have the same reference numerals and the explanations of the elements will be omitted. Also in FIG. 14, the structures relating to special color printing heads 2S1 to 2S4 are omitted.

In FIG. 14, a recording start position detection sensor 34 and a capping unit detection sensor 36 respectively detect the positions of the printing heads 2*a* to 2*d*. An idle discharge position detection sensor 35 detects a standard position of the idle discharge operation of the printing heads while the heads are moving in the main-scanning direction. A head characteristic measuring unit 108 can be used for the head shading process (step MS23 in FIG. 2) and for the color palette data generating. The head characteristic measuring unit 108 has a conveying unit for conveying a recording medium on which a head-shading test pattern or a color patch has been printed, and a reading unit for reading information on the test pattern and the color palette. The head characteristic measuring unit may be a unit disclosed in FIG. 31 of Japanese Patent Application Laid-Open No. 4-18358 by the present applicant.

Next, the ink-jet printing operation will be described below.

While the printing apparatus is in stand-by status, the printing heads 2*a* to 2*d* are capped by the capping unit 20. When a print signal enters the control circuit 16, the motor driver 23 drives the motor 5 to move the carriage 1. In response to this movement, the idle discharge position detection sensor 35 detects the printing heads, then idle discharge operation is made for a predetermined period, and the clog prevention unit 31 receives inks discharged by the idle discharge operation. Thereafter, the carriage 1 moves in arrow D direction, and as the recording start position detecting sensor 34 detects the recording start position, the outlet ports of the printing heads 2*a* to 2*d* are selectively actuated. Ink droplets are discharged to print an image in a dot matrix pattern on the recording medium 103 for a printing width p. In this manner, as a predetermined-width (determined by nozzle intervals in a vertical direction and the number of the nozzles) printing is continued, the carriage 1 arrives to a position at the right end in FIG. 14 (this is detected by counting the number of pulses given to the motor 5). After the carriage 1 has been detected, pulses for the width of the printing heads are supplied to cause to the printing head 2*a*, at the rear end of the carriage 1, to cross the recording medium 103. Thereafter, the carriage 1 reverses in arrow E direction to the idle discharge position. At the same time, the recording medium 103 is conveyed by the printing width p or larger amount in arrow F direction, then the above operation is repeated.

(3-2) Construction of Apparatus

Figure 15:
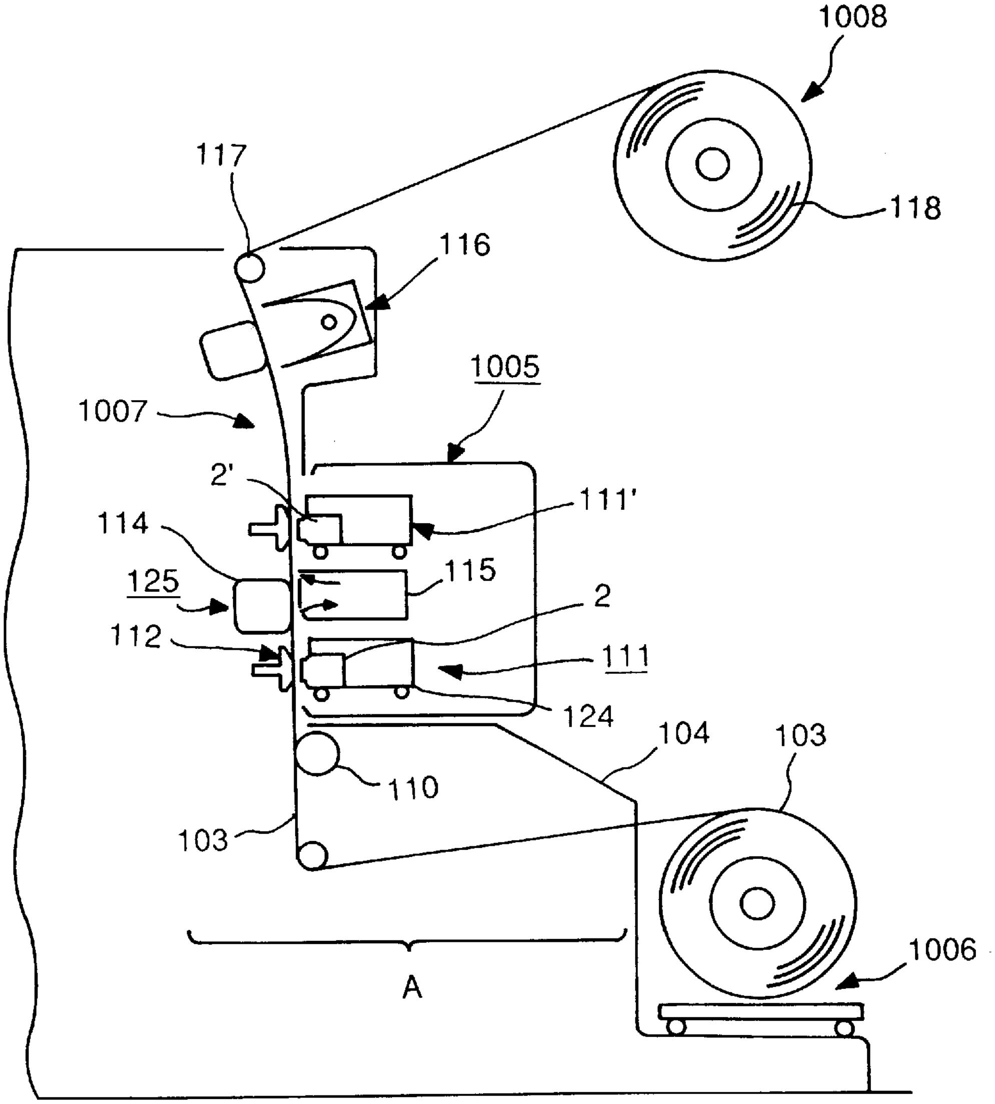
FIG. 15 is a cross-sectional view of the mechanical construction of the ink-jet printing unit and a cloth conveyer of the embodiment.
Figure 16:
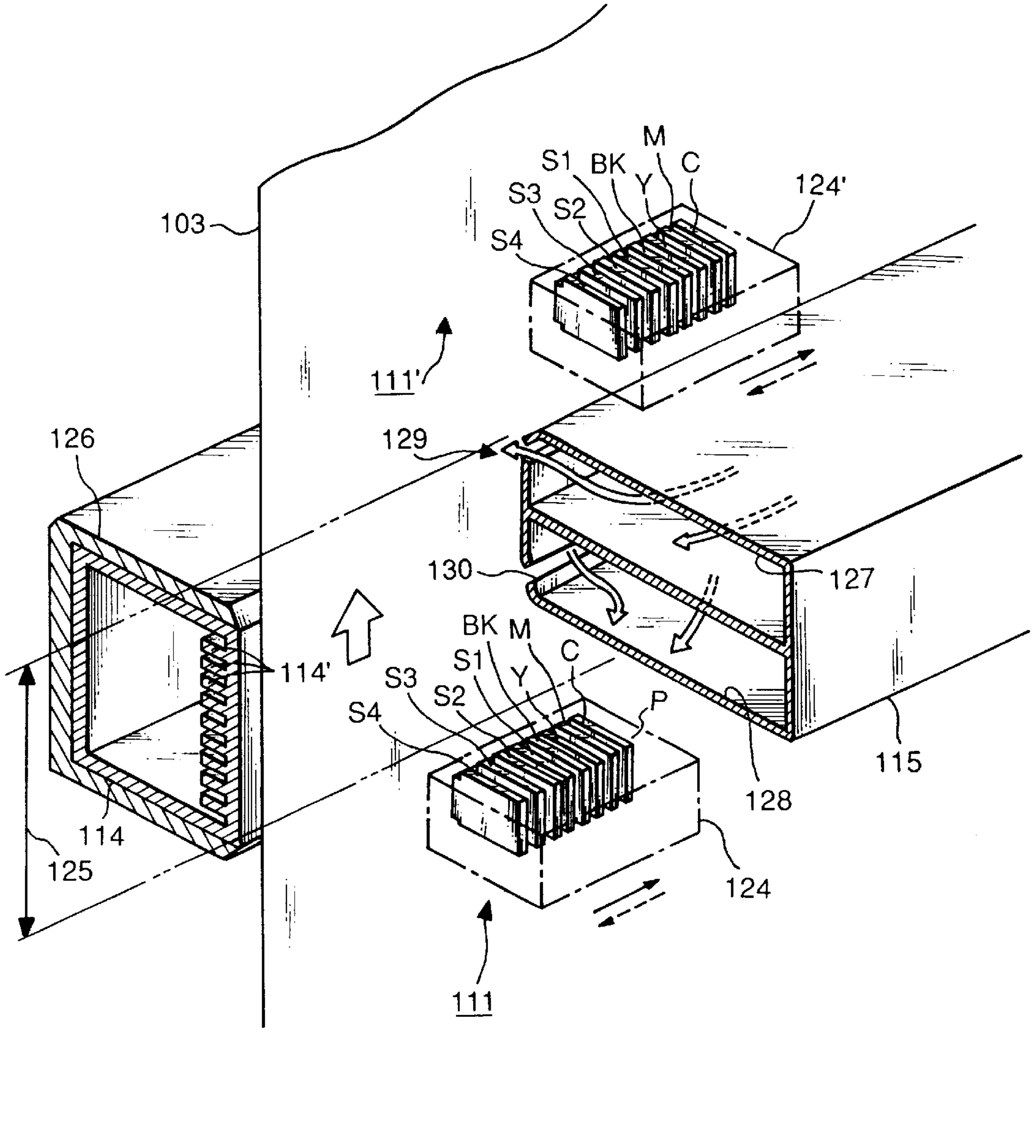
FIG. 16 is a perspective view of an example of the construction of peripheral devices of a printing head of the ink-jet printing unit.

FIG. 15 shows an example of the construction of the ink-jet printer as the image printer 1004 of the present embodiment. FIG. 16 shows example of the essential portion of the printer. The image printer 1004 mainly comprises the cloth feeder 1006 for feeding a rolled cloth pre-processed for textile-printing, a main body A for precisely conveying the cloth and performing printing by the ink-jet heads, and the post-processor 1008 for drying the printed cloth and rolling the cloth. The main body A includes the printing conveyer 1007 for performing the precise conveyance and the ink-jet printing unit 1005.

The pre-processed rolled cloth 103 is conveyed to the cloth feeder 1006 that stepwisely feeds the cloth to the main body A. In a first printer 111, the ink-jet head 2 performs printing on the front surface of the cloth 103, flattened on a platen 112 as a printing surface. Each time one printing is completed, the cloth is stepwisely fed by a predetermined amount, then heated by a heating plate 114 and hot air from hot-air duct 115 dries the printed cloth. Next, in a second printer 111', printing is superimposed over the same portion in a similar manner to that in the first printer 111.

The printed cloth 103 is again dried by a post-drying unit 116 comprising a heating plate and heater (or hot air blower), and guided by a guide roller 117 to be rolled by a take-up roller 118. The rolled cloth 103 is removed from the apparatus, and forwarded to a batch processing in which coloring, washing and drying are performed to finish the cloth as a product.

In FIG. 16, the recording medium 103 is stepwisely fed in the upper direction in the drawing. The first printer 111 at the lower portion in the drawing has a first carriage 124 on which eight ink-jet heads for the Y, M, C, BK inks and the special color inks S1 to S4 can be mounted (in FIG. 16, Y, M, C, BK color heads and S1 to S4 color heads are mounted). The ink-jet (printing) head 2 of the embodiment has thermal-energy generating elements for causing film-boiling in inks, and has 256 outlet ports arranged at 400 dpi.

A drying unit 125 comprises the heating plate 114 for heating a recording medium from the rear side and the hot-air duct 115 for drying the recording medium from the front side. The heat-conducting surface of the heating plate 114 powerfully heats the cloth from the rear side by vapor of high-temperature and high-pressure in a hollow portion inside of the plate. A fin 114', for concentrating the heat on the rear surface of the cloth 103, is provided inside of the heating plate surface. The cloth 103 and the side opposing to the heating surface of the plate 114 are covered with a insulating member 126 to prevent damages due to heat radiation.

On the cloth front surface side, a lower supply duct 127 supplies hot-dry air to raise drying effect by the air of lower-humidity. An upper suction duct 128 sucks the air flow in a direction perpendicular to the cloth conveying direction. “Lower” and “Upper” are defined on the conveying direction of the cloth 103. As the amount of air sucked is much more than that of the air supplied, dew condensation of evaporated water at peripheral devices can be prevented. A hot-dry supply source is provided inside of duct 115, and the suction is made from the side facing the cloth 103. This makes the pressure difference between an exhaust hole 129 and suction hole 130 uniform along the lengthwise direction of the hot-air duct 115. An air blowing/suction unit is offset downward from the center of the heating plate, so that air is blown to a fully heated portion. The first printer 111 dries a large amount of water contained in the inks and thinning liquid discharged on the cloth 103 by the above construction.

The second printer 111' is provided at an upper portion of the first printer 111, comprising a second carriage 124' similar to the first carriage 124. Note that the first carriage 124 and the second carriage 124' may be one unit or integrated via an appropriate connecting member, and may be driven by a common driving source and common transmission mechanism.

Although not shown in FIG. 16, an ink supplying device for reserving ink and supplying the necessary amount of ink to the head, having an ink tank and ink pump and so on is provided. The ink-tank main body and the heads 2 and 2' are connected with an ink-supplying tube, which automatically supplies the ink of discharge amount due to capillary action. Upon head-recovery operation, the ink is forcibly supplied by the ink pump. The head and the ink-supplying device are mounted on different carriages so as to reciprocate in a direction represented by the arrow in FIG. 16.

Although not shown in FIG. 16, a head recovery device is provided at a position opposite of the home position (stand-by position) of the head, in order to maintain constant ink discharging of the head. When the head does not operate, the head recovery device performs capping of the head at the head home position to prevent evaporation of ink within the head nozzles. Further, before printing is started, the head recovery device pressurizes ink channels in the head using the ink pump and forces ink discharging from the nozzles (pressure-recovery operation) or forces suction-discharging of ink from the nozzles (suction-recovery operation), in order to remove bubbles and dust from the nozzles. The head recovery device further has a function for collecting the discharged ink from these recovery operations.

Figure 17:
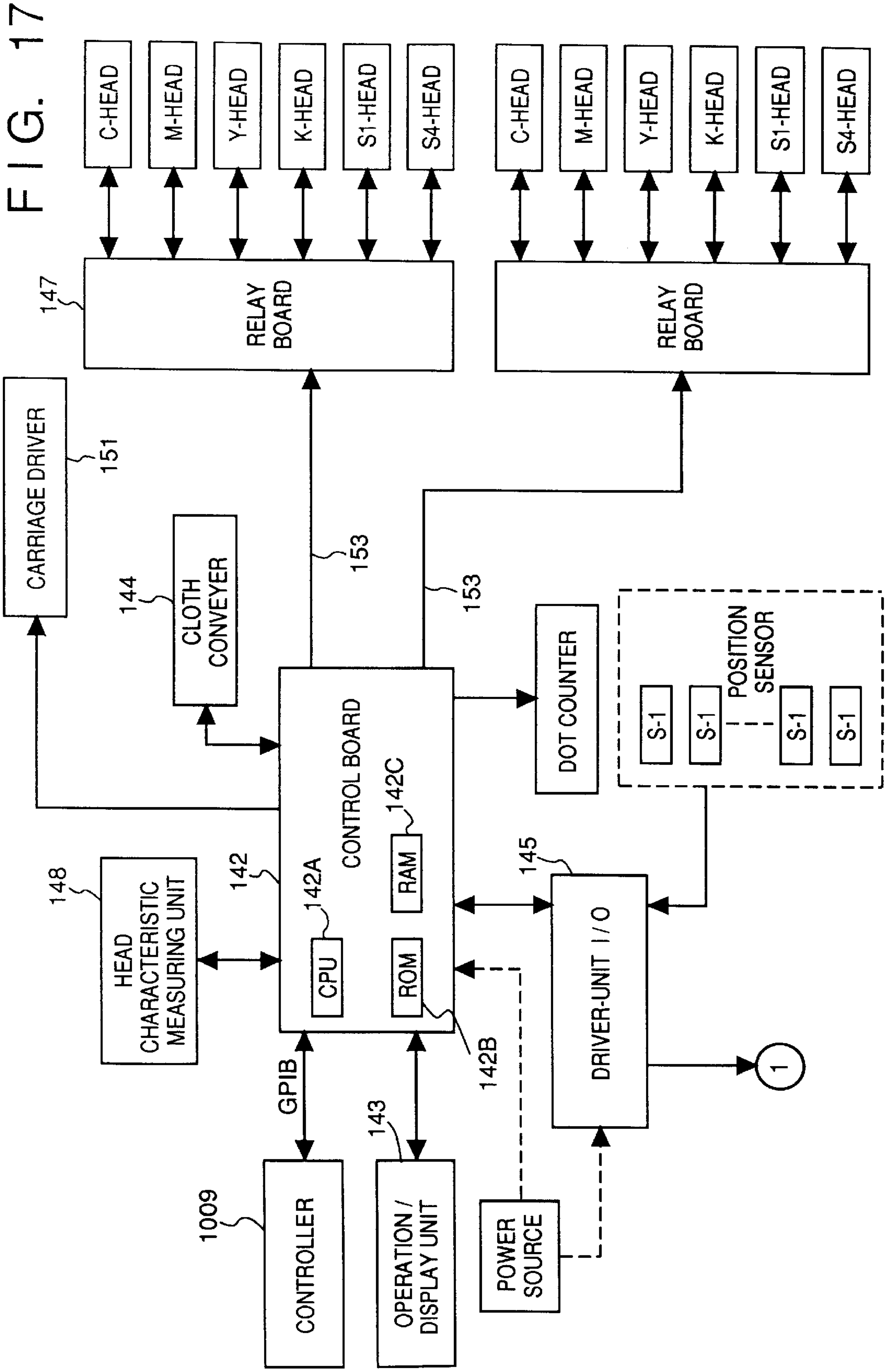
FIGS. 17 and 18 are block diagrams showing the electric construction of the ink-jet printing unit in FIG. 15.
Figure 18:
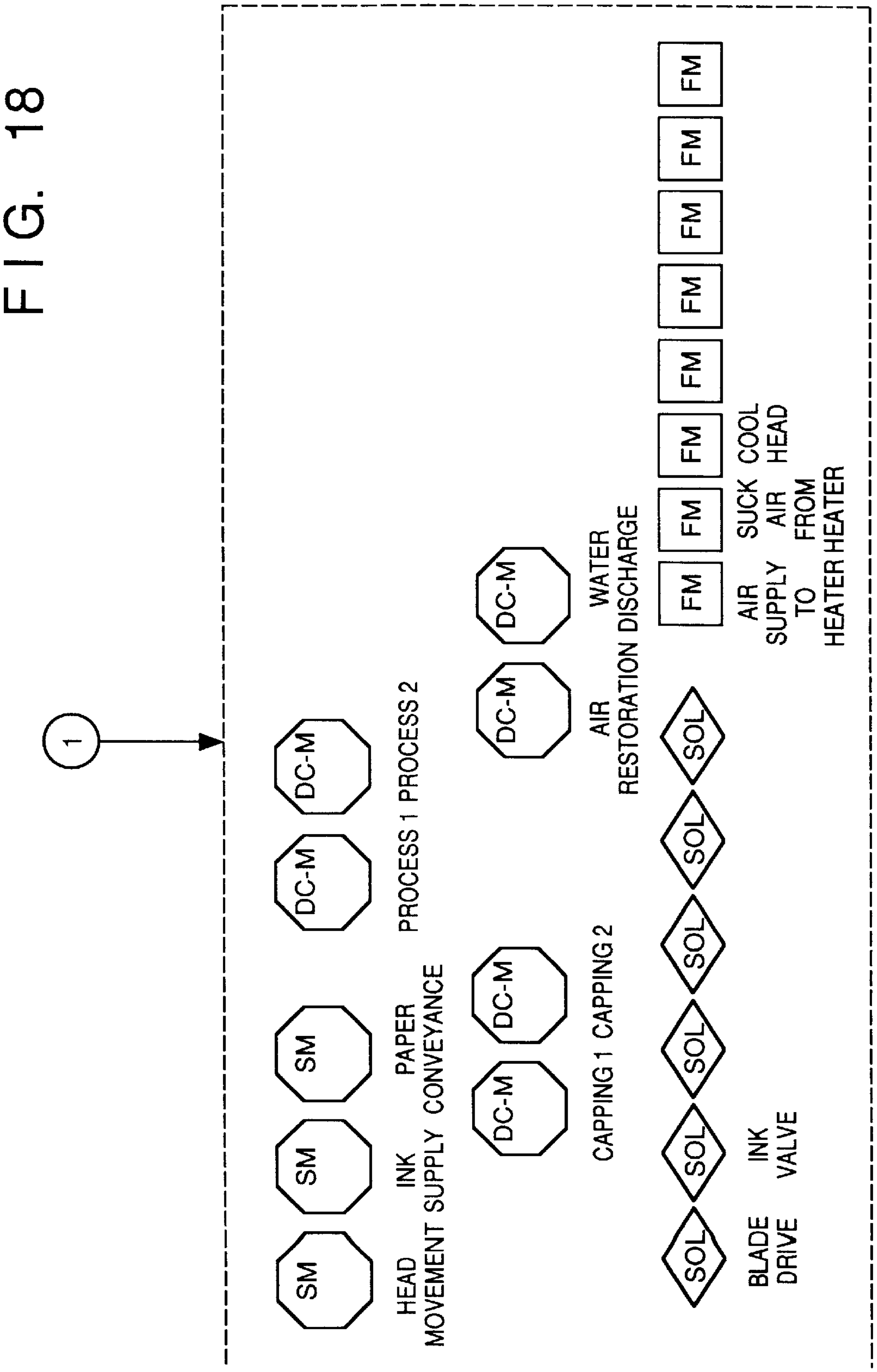
Figure 19:
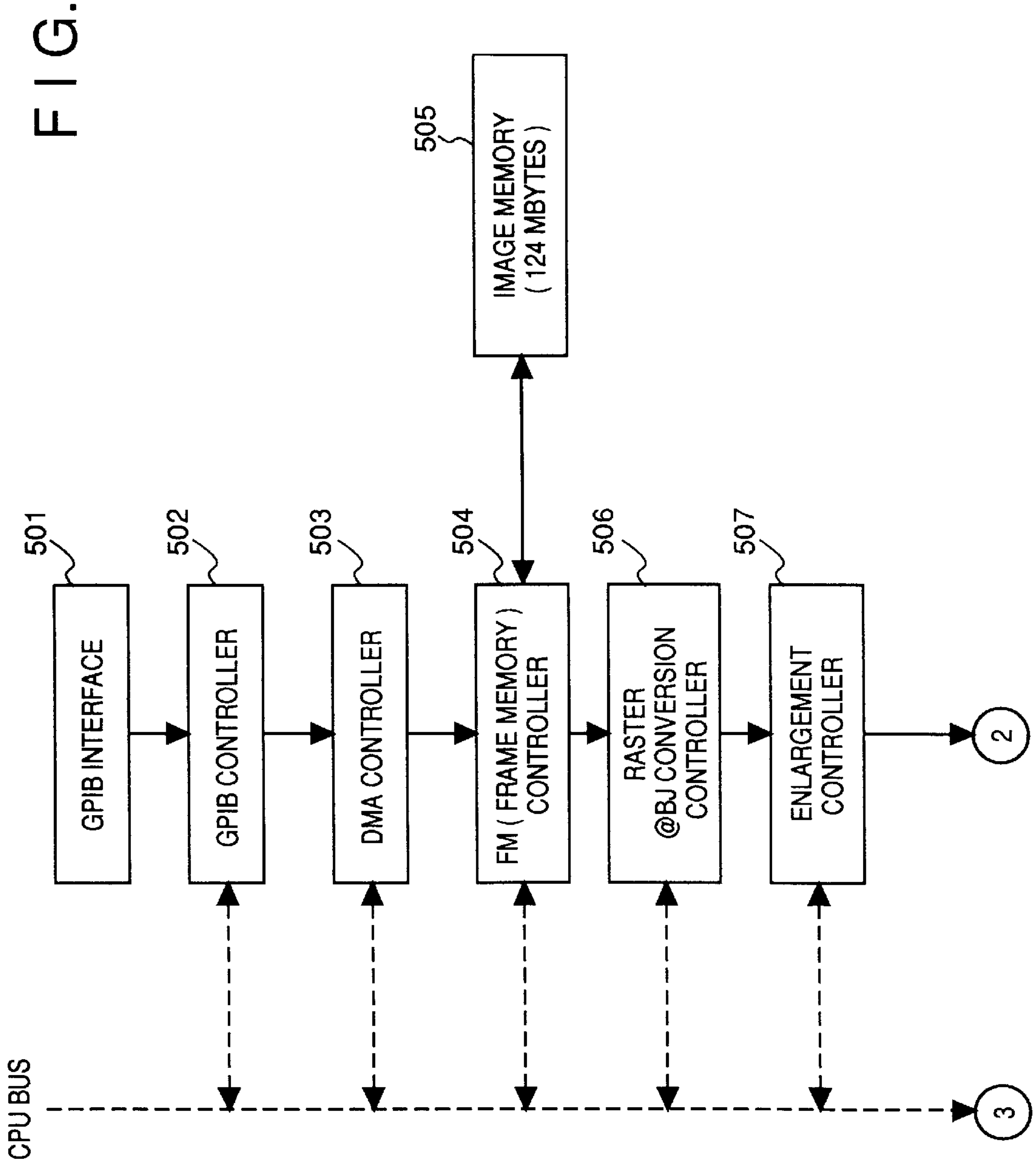
FIGS. 19 to 21 are block diagrams showing, as data flow, the construction of a control board in FIG. 17.
Figure 20:
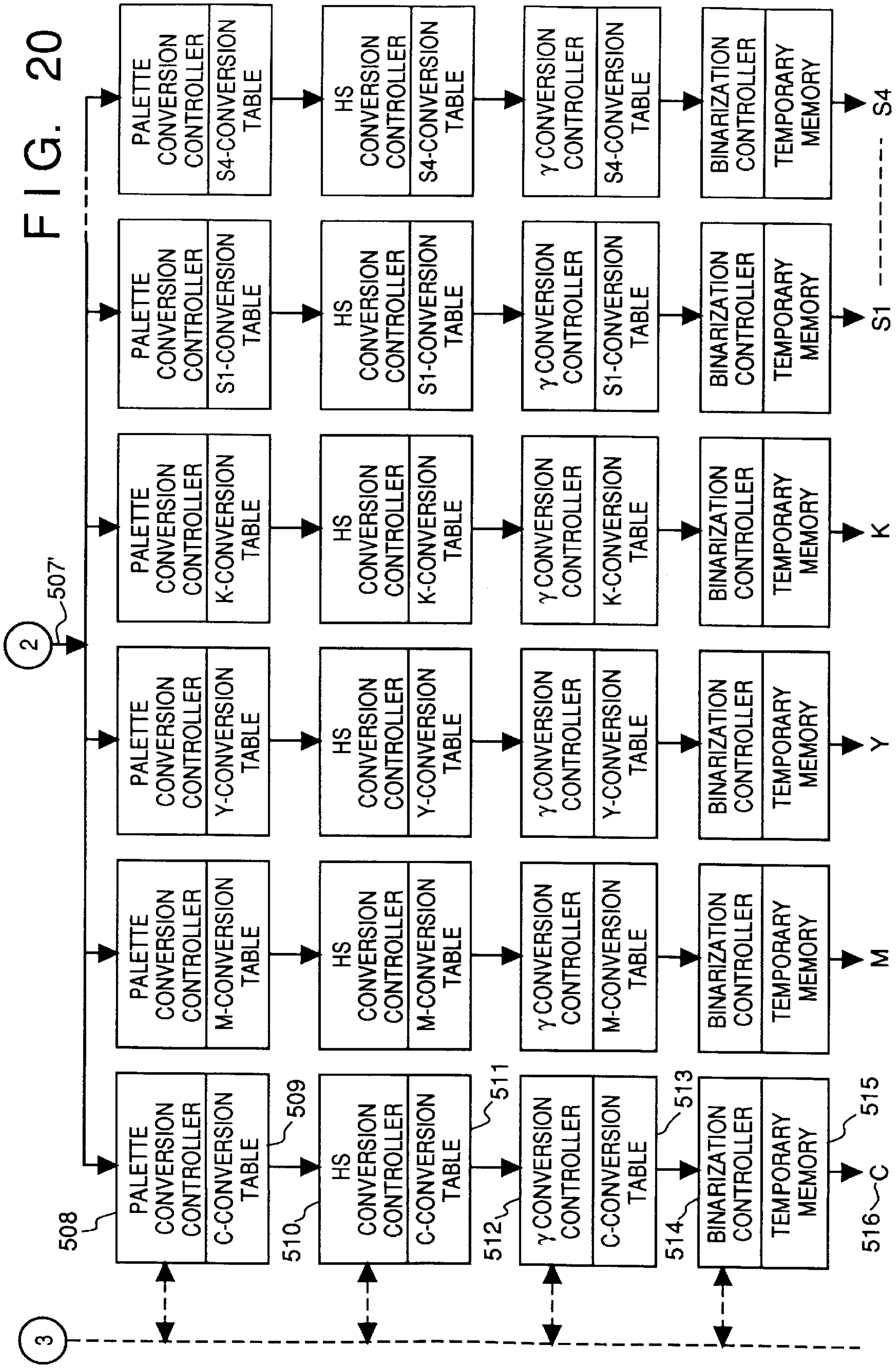
Figure 21:
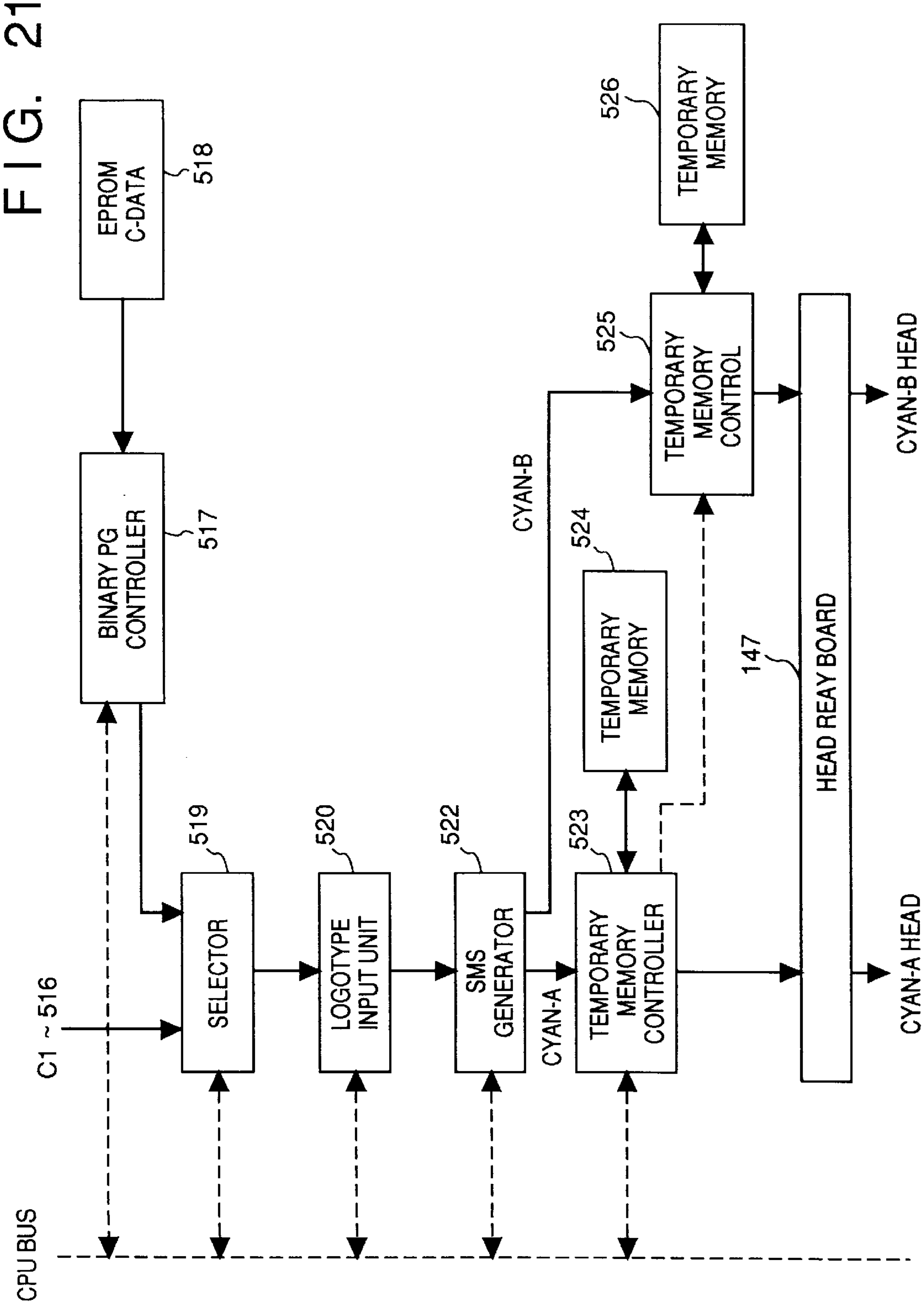

Next, the construction of the control system of the apparatus will be described with reference to FIGS. 17 to 21. FIGS. 17 and 18 respectively show an example of the construction of the image printer 1004 and the operation unit. FIGS. 19 to 21 conceptually show an example of the inner construction of a control board 142 in FIG. 17, along data flow.

Image data for printing is supplied from the controller 1009 via an interface (GPIB) to the control board 142 having the control circuit 16 shown in FIG. 13. The device that supplies image data is not limited to the controller 1009, and transmission may be made in the form of network-transmission or off-line transmission via a magnet tape. The control board 142, comprising a CPU 142A, a ROM 142B in which various programs are stored, a RAM 142C having various register areas and work areas, and other elements as shown in FIGS. 19 to 21, controls the overall apparatus. An operation/display unit 143 has an operation panel for an operator to issue instructions to the image printer 1004 and a display for indicating messages to the operator. A cloth conveyer 144 comprises a motor and so forth for conveying the recording medium such as a cloth. A driver-unit input/output port (I/O) 145 drives various motors (denoted with “M” appended to the trailing end thereof) and various solenoids (denoted by “SOL”) as shown in FIG. 18. A relay board 147 supplies a driving signal to the respective heads, and receives information on the heads (information on mounted/unmounted status, ink color of the head etc.) to supply the information to the control board 142. The information is transferred to the controller 1009 and used for requiring color palette data of a color to be used, recognition of head mounting range and setting of scanning range. A carriage driver 151 comprises motors for driving the carriages 124 and 124'.

When the control board 142 receives information of image data to be printed from the controller 1009, the control board 142 stores the data into an image memory 505 via a GPIB interface 501, a frame memory (FM) controller 504 (FIG. 19). The image memory 505 of the embodiment has a capacity of 124 Mbytes, and is arranged for storing data in 8-bit palette data format having the size of A1. That is, 8 bits are assigned to one pixel. A DMA controller 503 accelerates memory transmission so that printing can be started after a predetermined processing as soon as data transfer from the controller 1009.

The controller 1009, connected to the image printer 1004, transfers image data as raster image. The respective printing heads 2 have a plurality of ink discharge nozzles in the longitudinal (the subscanning) direction, the image data arrangement must be converted to coincide with the nozzle arrangement of the printing heads. A raster @ BJ conversion controller 506 performs this conversion, and supplies the converted data to a palette conversion controller 508 through enlargement by an enlargement controller 507 for changing the size of image data. Note that data supplied to the enlargement controller 507 is data from the controller 1009, which is a 8-bit palette signal. This palette data (8 bits) is supplied to the processor of the respective printing heads to be described later.

In FIGS. 19 to 21, printing heads for the special colors S1 to S4 as well as printing heads for the yellow, magenta, cyan, black colors are provided.

The palette conversion controller 508 supplies the palette data from the controller 1009 and the conversion table of the corresponding color to the conversion table memory 509. In case of an 8-bit palette data, colors of 0 to 255 levels can be reproduced. The controller 508 develops an appropriate table with respect to each color in the table memory 509. The followings are input levels and corresponding colors to be printed.

| (Input level) | | (Printing color) |
|---|---|---|
| 0 | → | thin gray |
| 1 | → | solid S1 |
| 2 | → | solid S2 |
| 3 | → | blue obtained by mixture of cyan and magenta |
| 4 | → | solid cyan |
| 5 | → | red obtained by mixture of magenta and yellow |
| | . | |
| | . | |
| | . | |
| 254 | → | solid yellow |
| 255 | → | no color |

The palette conversion table memory 509 has written conversion data at an address position corresponding to the palette data, and when the palette data is supplied as an address, accesses the memory in a reading mode. The palette conversion controller 508 performs management of the palette conversion table memory 509 and serves as an interface between the control board 142 and the palette conversion table memory 509. Regarding the special colors, a circuit for setting a special-color mixture amount (i.e., multiplying output with “0” to “1”) may be provided between the palette conversion system and a succeeding HS system comprising an HS controller 510 and an HS conversion table memory 511, and further, the setting amount may be variable.

The HS conversion controller 510 and the HS conversion table memory 511 correct variation in printing density corresponding to each outlet port of each printing head, based on data measured by a head characteristic measuring device 148 which includes a density variation corrector. For example, data of a low-density outlet port (ink discharge amount is small) is converted to higher-density data, and data of a high-density outlet port (ink discharge amount is large), to lower-density data. Data of a intermediate density is not converted. This conversion processing will be described later.

A γ conversion controller 512 and a γ conversion table memory 513 perform table conversion for raising or lowering the overall density for each color. For example, if no operation is performed, a liner table as follows is used:

| (Input) | | (Output) |
|---|---|---|
| 0 | → | 0 |
| 100 | → | 100 |
| 210 | → | 210 |
| 255 | → | 255 |

A succeeding binarization controller 514, having a pseudo half-tone processing function, inputs 8-bit multi-level data and outputs binarized 1-bit pseudo half-tone data. Methods for converting multi-level data to binary data are, e.g., the dither method and the error diffusion method. This embodiment also employs these binarization methods, however, any method that represents tone levels by the number of dots per a unit area can be used.

The binary data is stored into a temporary memory 515, and used for driving the respective printing heads. The binary data outputted from the temporary memory 515 is outputted as signals C, M, Y, BK, S1 to S4. As the binary signals for the respective colors are processed in the same manner, only the processing of the binary data C will be described with reference to FIG. 21 showing a construction in case of cyan. Though not illustrated, similar constructions for respective colors are provided. FIG. 21 shows the construction of a circuit following the temporary memory 515 shown in FIGS. 19 and 20.

The signal C binarized by the binarization controller 514 is outputted to a sequential multi-scan (SMS) generator 522, however, for a case of test printing about the apparatus by binary pattern generators 517 and 518, the binary data is first supplied to the selector 519. The selection of the selector 519 is controlled by the CPU of the control board 142. If the operator makes a predetermined operation to the operation/display unit 143 (FIG. 17), the selector 519 selects the data from the binary pattern controller 517. Normally, the selector 519 selects the data from the binarization controller 514 (temporary memory 516). A logotype input unit 520 is provided between the selector 519 and the SMS generator 522, corresponding to printing a logotype of a manufacturer, a designer's brand and so on an end portion of a cloth. In this case, a memory for storing logotype data and a controller for management of a printing position of the logotype may be provided.

The SMS generator 522 prevents density variation of a printed image due to change in ink discharge amount by nozzle. The multi-scan has been proposed in, e.g., Japanese Patent Application No. 4-79858. Whether performing multi-scan to let a plurality of outlet ports discharge inks to one pixel for image quality or omitting such multi-scan for high-speed printing can be selected by an appropriate input unit, e.g., the operation/display unit 143 or a host computer H.

The temporary memory 524 is a buffer memory for correcting the physical position of the printing head, i.e., the position between the upper and lower printings in FIG. 16 and the interval between the heads. Image data is temporarily stored into the memory 524, and outputted at a timing corresponding to the physical position of the head. Accordingly, the temporary memory 524 changes its capacity for each printing color.

After the above data processing has been performed, the data is transferred to the head via the relay board 147.

Conventionally, data for the palette conversion, the HS conversion and the γ conversion is fixedly held by the memory provided with the apparatus main body. Therefore, when data is not adaptable to the image data to be outputted, image of satisfactory quality cannot be obtained. The present embodiment enables input of conversion data from external devices, and stores the data into the respective conversion tables. For example, the palette conversion data as shown in FIGS. 5 to 8 is downloaded to the conversion table memory 509. That is, the conversion table memories 509, 511 and 513 comprise a RAM. The palette conversion data and the γ conversion data are transferred from, e.g., the controller 1009. The HS conversion data is inputted from the head characteristic measuring unit device 148 (FIG. 17). In this manner, data which is always corresponding to the head status can be obtained. To obtain the head characteristic of the respective printing color head, test printing (uniform printing at a predetermined half-tone density) is performed by each printing head, and the density distribution corresponding to the printing width is measured. The head status means the variation of ink discharging of the plurality of nozzles of the head, or the difference between the density of a printed image and a predetermined density.

In the present embodiment, to prevent abnormal output, until conversion parameters are inputted, the output is made "0" even though data is inputted not to perform printing. Similar arrangement is made for the γ conversion and the like.

Figure 23:
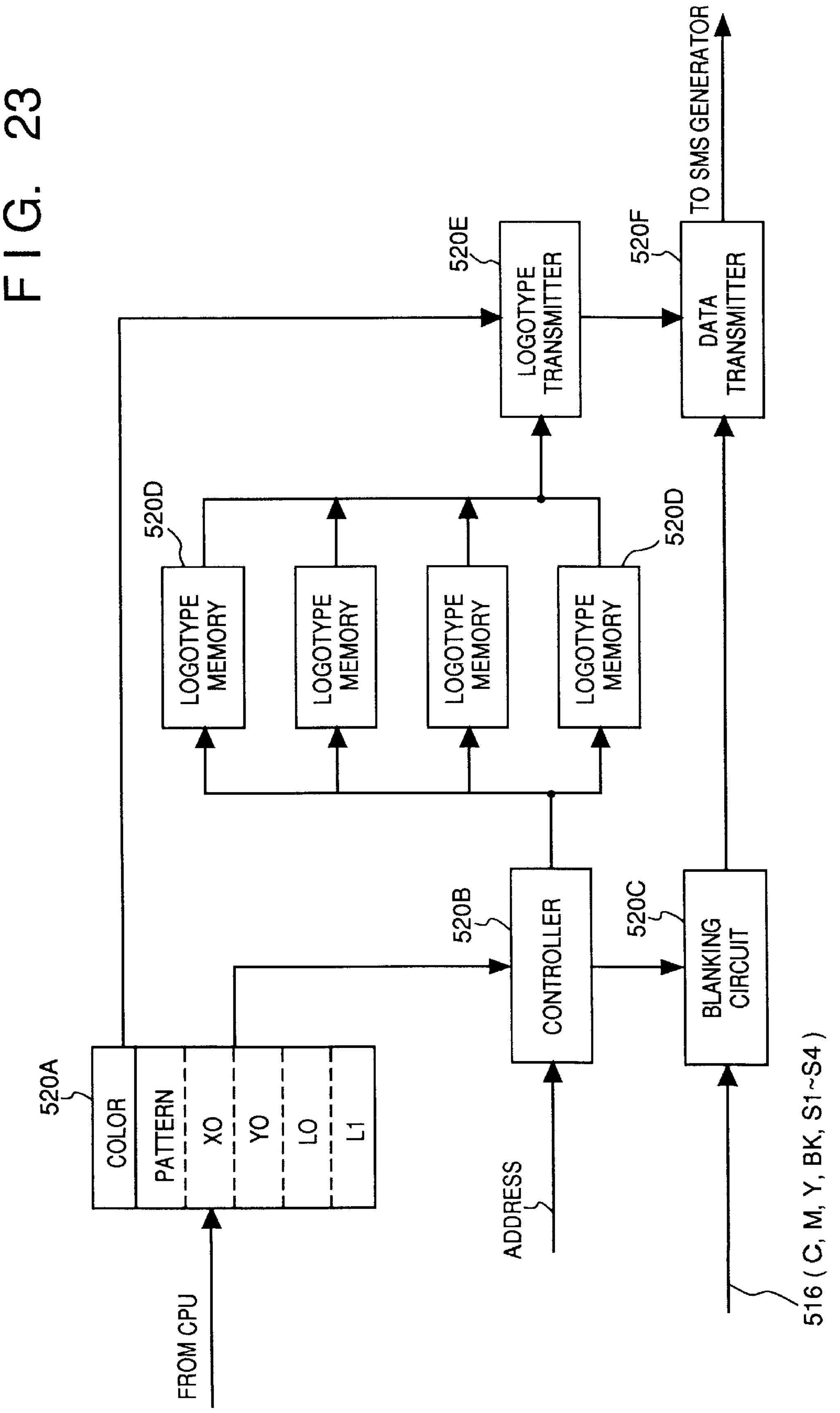
FIG. 23 is a block diagram showing an example of the construction of a log input unit in FIG. 21.

FIG. 23 shows an example of the construction of the logotype input unit 520 in FIG. 21, corresponding to the procedure performed by the controller 1009 shown in FIG. 11.

In the procedure in FIG. 11, the data <color>, <pattern>, <X0>, <Y0>, <L0>, <L1> transferred from the controller 1009 are set in a register 520A by the CPU 142 of the image printer 1004. A controller 520B, comprising a counter and the like, receives a signal (e.g., an address signal) for managing movement of the printing head in the main-scanning direction (Direction X) and movement of the cloth 103 in the subscanning direction (direction Y), and performing control so that a logotype is formed at a position defined by the <L0> and <L1> (FIG. 12). The controller 520B controls a blanking circuit 520C for blanking a logotype printing range, i.e., a range determined by the <X0> and <Y0> stored in the register 520A, of binary image data 516. The blanking circuit 520C receives a control signal from the controller 520B, and deletes image data within the range.

The controller 520B designate a logotype memory 520D in which the logotype to be printed is stored, based on the <pattern> stored in the register 520A. The present embodiment has four types of logotypes and the number of the logotype memories is four. The respective logotype memories 520D comprise two 4M-bit ROM's, corresponding to the largest size determined by the maximum X0 value (512 pixels) and the maximum Y0 value (the number of outlet ports×8 bands=2048 pixels).

Figure 24A:
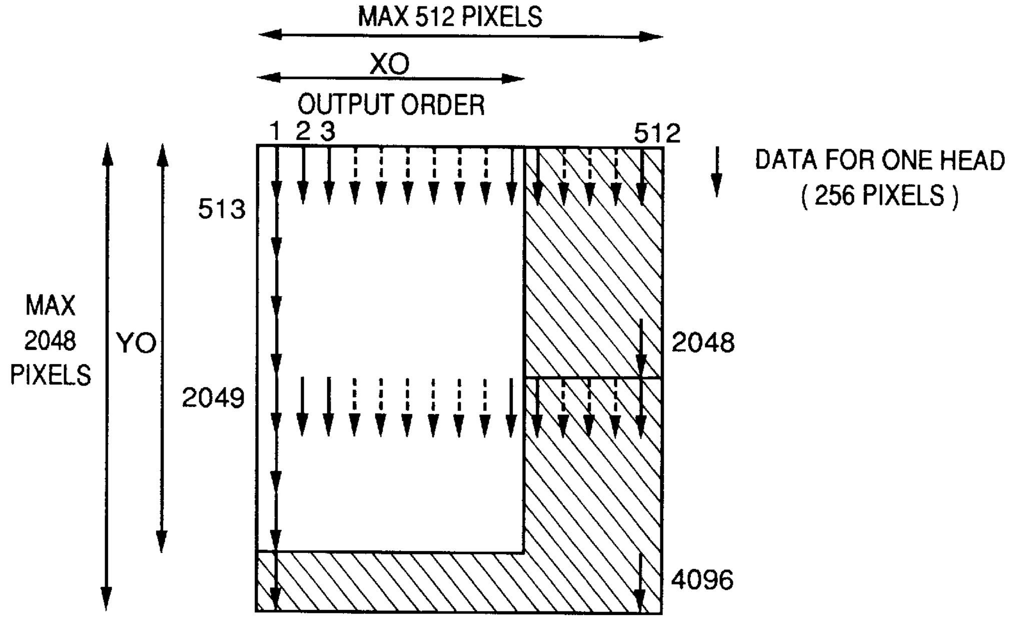
FIGS. 24A and 24B respectively illustrate an example of the relation between a logo image output range and logo memory space.
Figure 24B:
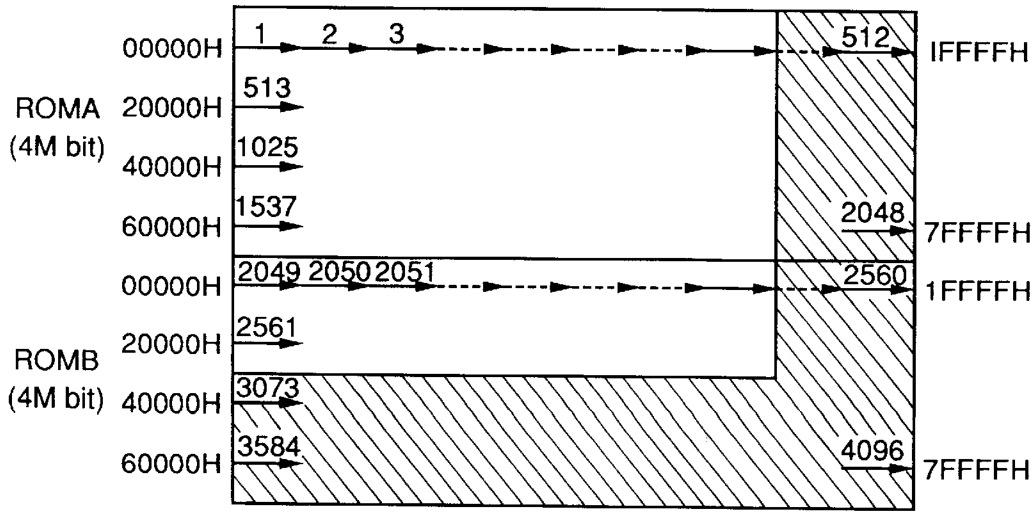

FIGS. 24A and 24B show the relation between a logotype image output range and the space of the ROM's (ROMA and ROMB). In FIGS. 24A and 24B, a hatched portion represents a portion which has values over designated X0 and Y0 values and therefore is not outputted.

Figure 25:
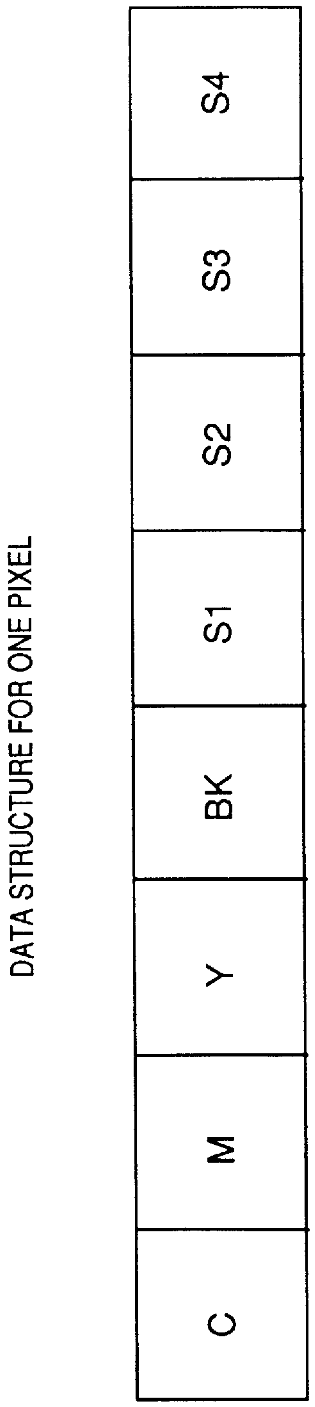
FIG. 25 illustrates an example of data structure for one pixel in the logo memory.

As shown in FIG. 25, one pixel in the ROM is constituted of 8 bits, and on/off data for one color is assigned to each bit.

The data read out of the logotype memory 520D designated by the controller 520B is supplied to a logotype transmitter 520E. The logotype transmitter 520E comprises a selector and the like, and it supplies only data designated by the logotype-color designating data <color> stored in the register 520A, as valid data, to a data transmitter 520F. The data transmitter 520F, comprises an OR circuit and so forth, transmits the image data 516 with data for printing the designated logotype of the designated color in the blanked area of the data 516, while passing the other area of the image data 516 without any data, to the following SMS generator.

In the embodiment, the logotype data are managed independently of the basic image data, thus a desired logotype data can be inserted at an arbitrary repetition period desired by the operator, regardless of the repetition period of the basic image or the type of a repeated pattern as shown in FIGS. 26A to 26E. Further, after the binarization, a designated range of the image data is blanked and a logotype is inserted there, accordingly, the logotype is not influenced by various conversions and is printed as it has been desired (e.g. clearly). As shown in FIG. 25, the data structure is one-byte (8 bits) space for one pixel, where each color is assigned to each bit, this improves the frequency of use of memory.

It should be noted that the CPU of the controller 1009 or the image printer 1004 may read the content of the logotype memory, and the CRT 1006 of the controller 1009 or the operation/display unit 143 of the image printer 1004 may display the read data.

In this embodiment, the logotype memory is a ROM, however, it may be a memory such as a RAM and an EPROM ROM rewritable by the controller 1009. In this case, the controller 1009 may have the logotype data in file format, store management numbers in an external storage, and may access the files by the management numbers. In case of a RAM, the logotype memory may be backed-up using, e.g., a battery to maintain the storage contents when the power is turned off. Otherwise, the controller 1009 transfers logotype data and develops the data in the storage area in correspondence with necessity.

Further, the number of the logotype patterns is not limited to four.

The image printer 1004 of the embodiment can select a mode such as multi-scan for performing ink discharging twice or more to one pixel. However, if high image quality is not required in a logotype, the control may be changed so that ink discharging is not performed from the second discharging. For example, a gate circuit can be added to the data transmitter 520F in FIG. 23 for deleting the logotype data in correspondence with the selected mode, so as not to perform ink discharging from the second time.

(3-3) Basic Image Print Pattern

Upon inputting basic image data, the CPU 1010 of the controller 1009 outputs an input image size (Xin, Yin), in the form of a command with a parameter, to the image printer 1004. The CPU 142A ensures an input area in the image memory 505 and stores the input image size in a predetermined parameter storage in the RAM 142C. Next, the controller 1009 sequentially transfers the image data to the image printer 1004, that stores the data into the image memory 505 via the FM controller 504. On the other hand, the controller 1009 transfers an output format of the image data to the image printer 1004. The image printer 1004 stores the output format into the parameter storage in the RAM 142C. FIGS. 26A to 26E show output formats.

Figure 26A:
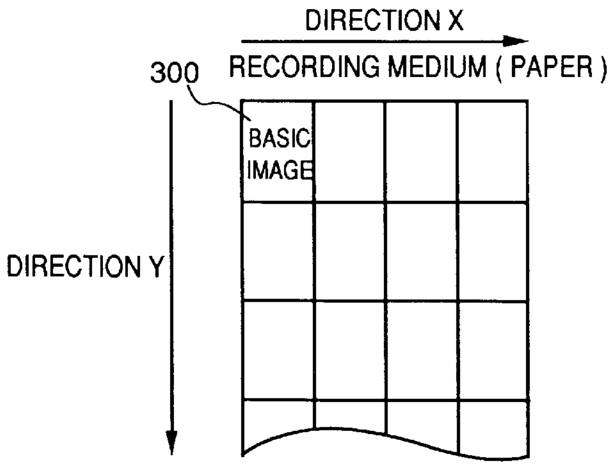
FIGS. 26A to 26E respectively illustrate a basic image forming pattern with respect to a recording medium.
Figure 26B:
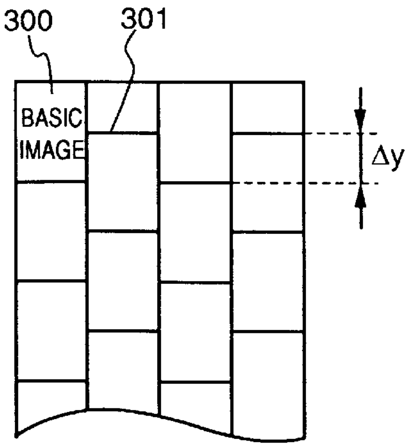
Figure 26C:
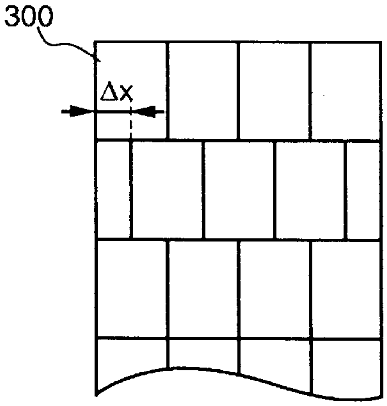
Figure 26D:
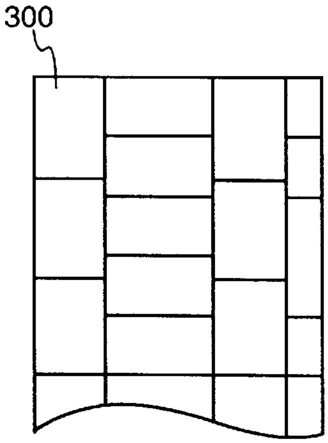
Figure 26E:
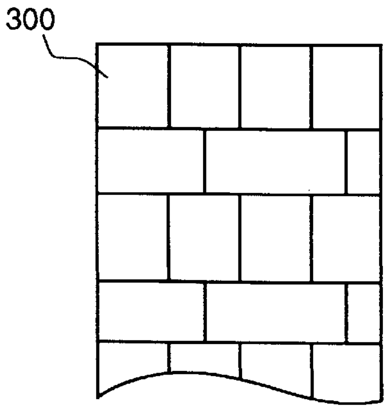

The output format shown in FIG. 26A is a format (type 1) for periodically repeating a basic image 300 in the direction X (direction along the movement of the carriage 1) and in the Direction Y (direction along the conveyance of the recording medium). The output format shown in FIG. 26B is a format (type 2) for shifting the basic image 300 by a predetermined offset amount (shift amount) $\Delta y$ in the direction Y alternatively in the direction X. The output format in FIG. 26C is a format (type 3) similar to the format in FIG. 26B, for shifting the basic image 300 by a predetermined offset amount $\Delta x$ in the direction X alternatively in the direction Y. The output format in FIG. 26D is a format (type 4) for rotating the basic image 300 (by 90° in FIG. 26D), and similarly to the type 2 (FIG. 26B) format, shifting the image 300 by a predetermined offset amount (offset amount is "0" in FIG. 26D) in the direction X. The output format in FIG. 26E is a format (type 5) for rotating the basic image 300 (by 90° in FIG. 36E), and similarly to the type 3 (FIG. 26C) format, shifting the image 300 by a predetermined offset amount (offset amount is "0" in FIG. 26E) in the direction X.

As parameters to designate the output format outputted from the controller 1009, in addition to the aforementioned parameter, the output types 1 to 5, a basic image size (Xb, Yb), an overall output image size (X0UT, Y0UT), the X-directional offset amount $\Delta x$, the Y-directional offset amount $\Delta y$, a rotation amount (90° in this example) are employed. These parameters are set on the following conditions:

$Xin \times Yin \leqq$ memory 505 capacity $Xb \leqq Xin$ $Yb \leqq Yin$ $XOUT \geqq Xb$ $YOUT \geqq Yb$ $\Delta x \leqq Xb$ $\Delta y \leqq Yb$ The controller 1009 outputs an instruction to print the image data to the image printer 1004 in step MS25 in FIG. 2, and the image printer 1004 starts printing.

More specifically, the CPU 142A controls timing of printing on the cloth 103 by controlling reading timing of an address controller provided in the FM controller 504 for reading data from the memory 505, timing of actuating the motor driver 23, and timing of actuating the head driver 24. The address controller sequentially reads image data out of the memory 505 in accordance with the parameter set in the parameter storage, and outputs the read data to the head driver 24. The head driver 24 forms driving signals for the printing heads 2_a_ to 2_d_, or further for the special color heads and outputs the signals to the respective printing heads. The respective printing heads, driven by the driving signals, discharge ink droplets to the cloth 103, and thus prints an image corresponding to the image data.

On the other hand, the motor driver 23 drives the recording medium conveying motor 9 to convey the cloth 103 to a printing position, and performs printing while rotating the carriage motor 5 in a predetermined direction to move the carriage 1 in the direction D (FIG. 13). When printing for one scanning is completed, the motor driver 23 rotates the carriage motor 5 in the opposite direction to move the carriage 1 in the direction E to the home position, then rotates the conveying motor 9 to convey the cloth 103 by the Y-directional one-scanning width or a width smaller than a multi-scan width in the direction Y. These operations are made based on one reciprocating movement of the carriage 1 as a basic cycle, and the printing speed of the printing head is used as a reference for printing timing.

Thus, the image printer 1004 completes printing of the image of the size designated by the overall output image size (XOUT, YOUT) by repeating the above operation, then it stops the operations of the motor driver, the head driver and the FM controller 504, and again waits for input from the controller 1009 and the operation/display unit 143.

Figure 27:
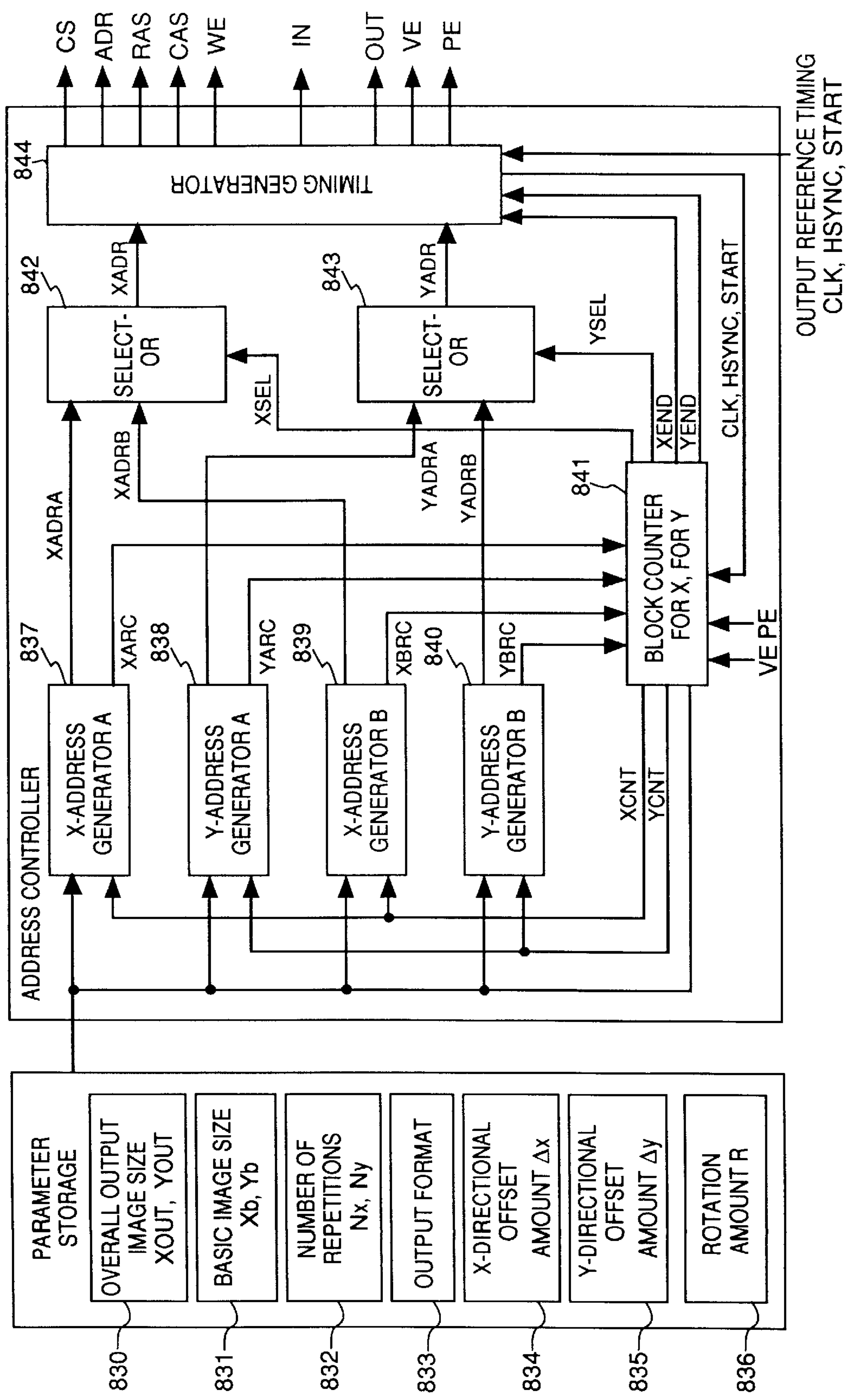
FIG. 27 is a block diagram showing the construction of a parameter memory and an address controller.

FIG. 27 shows an example of the construction of the parameter storage and the address controller.

In FIG. 27, numerals 830 to 836 denote registers in the parameter storage. An overall output image size (XOUT, YOUT) is stored in the register 830; a basic image size (Xb, Yb), in the register 831; a number of repetitions of outputting the basic image in the direction X and the direction Y (Nx, Ny), in the register 832; an output type, in the register 833; an offset amount $\Delta x$ in the direction X, in the register 834; an offset amount $\Delta y$ in the direction Y, in the register 835; and a rotation amount R, in the register 836. In this case, the number of repetitions in the directions X and Y is obtained as follows:

$Nx = INT(XOUT/Xb)$ $Ny = INT(YOUT/Yb)$

In the operation INT(a), if the number a is a decimal, the tenth's position of the decimal is deleted and the unit position of the decimal a is raised to the next higher value. For example, INT(1.2)=2.

These registers are connected to the corresponding portions of the address controller in accordance with the output format of input image data (more specifically, the stored values are used as reference values of comparators to be described below).

In FIG. 27, numeral 837 denotes an X-address generator A for counting the X-directional address (XADRA) of the basic image 300; 838, a Y-address generator A for counting the Y-directional address (YADRA) of the basic image 300; 839 and 840, an X-address generator B and a Y-address generator B for counting the X-directional address (XADRB) of the basic image 300 shifted in the direction X, as shown in FIG. 26B, and for counting the Y-directional address (YADRB) of the basic image 300 shifted in the direction Y, as shown in FIG. 26C. The address generators 837 to 840 comprise a counter for actually outputting an address and a comparator for comparing the address with the basic image size or the overall image size.

Numeral 841 denotes a block counter, mainly comprising a counter and a comparator, for counting the respective X-directional and Y-directional repetitions of the basic image 300; 842, a selector for selecting one of the X-directional address (XADRA) and the X-address shifted in the direction X (XADRB); 843, a selector for selecting one of the Y-directional address (YADRA) and the Y-address shifted in the direction Y (YADRB); 844, a timing generator for outputting various reading signals for the memory (CS, ADR, RAS, CAS, WE etc.) and various timing signals (IN, OUT, VE, PE etc.) based on the addresses (XADR and YADR) from the selectors 842 and 843.

Figure 28:
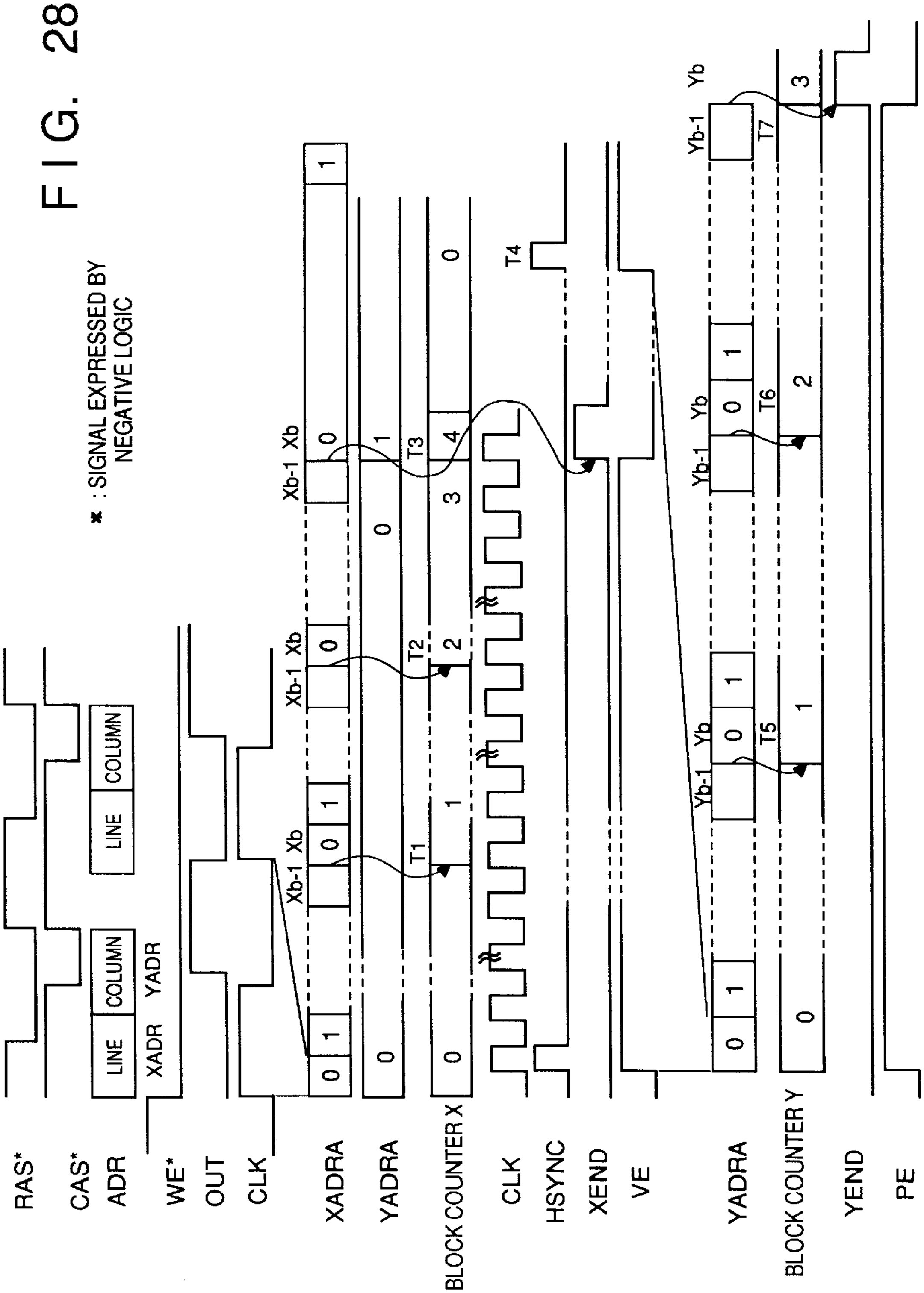
FIG. 28 is a timing chart showing output timings of respective signals at a memory controller in a case where image output (type 1) is outputted from a printer according to the embodiment.

In the various reading signals, the memory 505 is constituted by one or more DRAM (dynamic RAM) modules. The reading signal CS is a chip select signal for selecting the module; ADR, a signal for allocating the line address (YADR) and the column address (XADR) in terms of time; RAS, a line address strobe signal; CAS, a column address strobe signal; and WE, a write-enable signal. FIG. 28 shows the timings of these signals.

Figure 29:
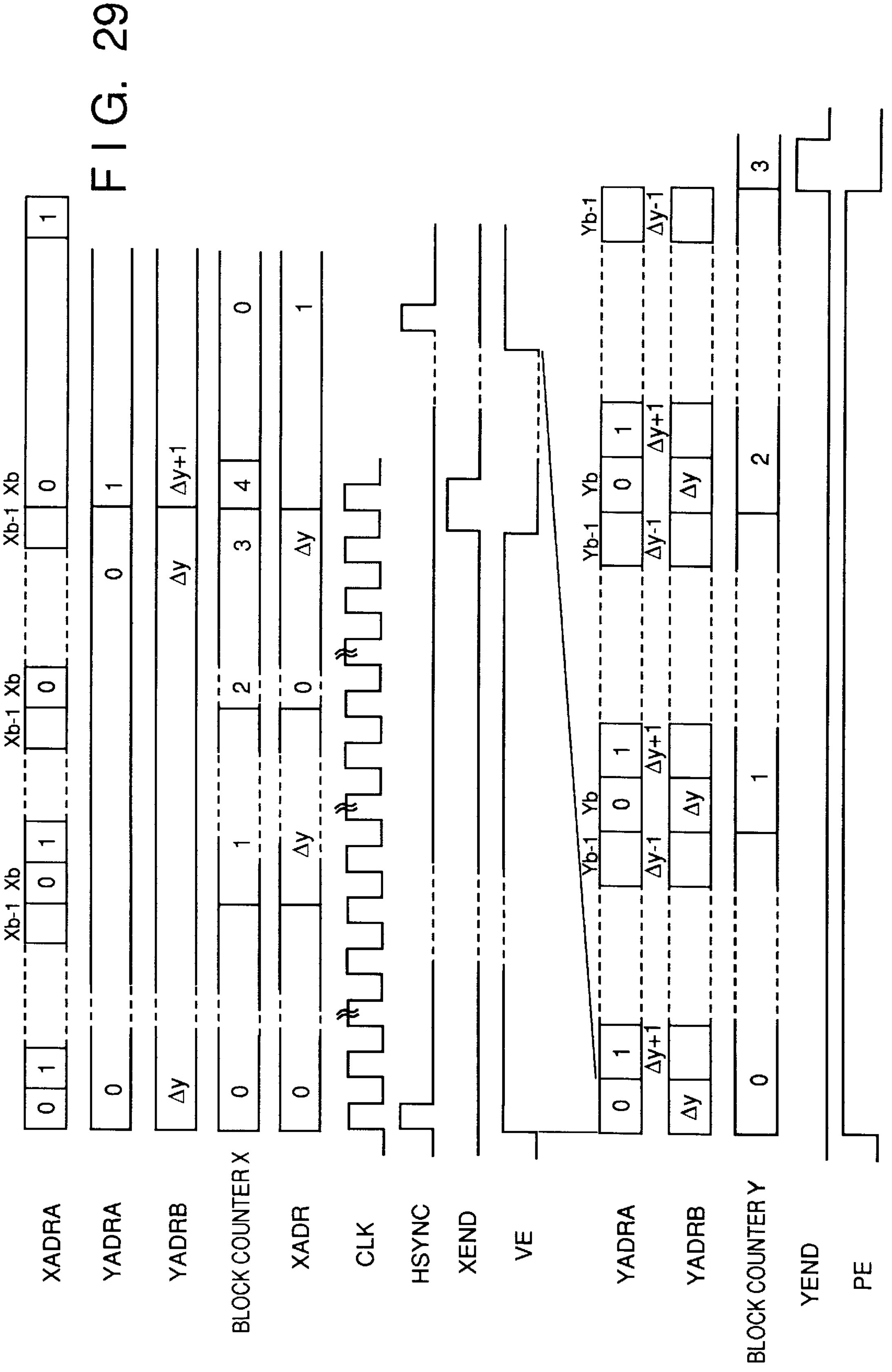
FIG. 29 is a timing chart showing output timings of respective signals at the memory controller in a case where image output (type 2) is outputted from the printer of the embodiment.
Figure 30:
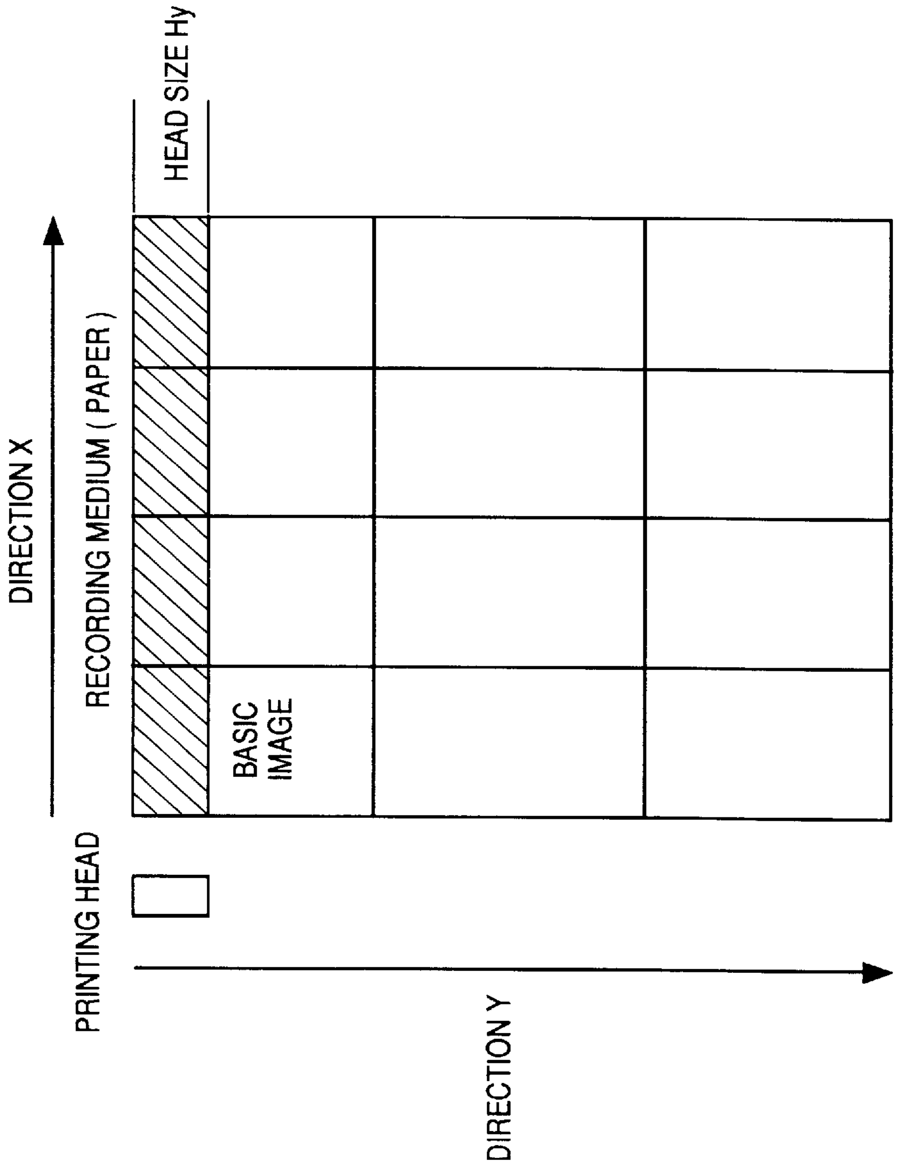
FIG. 30 illustrates an example of actual image output by the ink-jet printer of the embodiment.

In the above timing signals, the timing signal IN is a latch timing signal for a latch circuit which temporarily holds image input data; OUT, a latch timing signal for a latch circuit which temporarily holds image output data; VE, a video-enable signal for indicating effective image data for each raster; and PE, a page-enable signal for indicating effective raster of one page (FIG. 28 and 29).

Next, the operation of the respective elements of the address controller in case of the type 1 image output (FIG. 26A) will be described with reference to FIG. 28.

When the controller 1009 and the operation/display unit 143 issue a printing-start instruction, the CPU 142A outputs a START signal to the address controller to clear the X-address generator A 837, Y-address generator A 838 (set the XADRA and the YADRA to "0"), and to make these address generators ready to operate, further to make the timing generator 844 and the block counter 841 ready to operate.

When the level of the START of the output reference timing signals (image output clock CLK, raster synchronizing signal HSYNC, start signal START) turns to high (enable) and the horizontal synchronizing signal HSYNC rises, the timing generator 844 sets the signals VE and PE to a high level (enable), as shown in FIG. 28. While the signals VE and PE are high, the signals RAS, CAS, ADR, WE and OUT are outputted to the memory 505, in synchronization with the CLK as shown in FIG. 28, to read image data from the memory 505. While the signals VE and PE are high, the reading position and the output position for the image data are determined by controlling the address read out of the memory 505.

Next, the address control will be described.

The output from the X-address generator A 837 is cleared to "0" when the horizontal synchronizing signal HSYNC becomes high, and the address generator 837 counts up its output (XADRA) by one in synchronization with the rise of the CLK. When the count value becomes "Xb" (the X-directional length of the basic image size), the address generator 837 outputs a ripple carry signal (XARC) to the block counter 41, to clear its output address (XADRA) to "0" (timings T1 to T3 in FIG. 28). That is, the carry signal (XARC) is resulted from the comparison between the basic image size "Xb" stored in the basic image size register 831 and the CLK counter output value by a comparator (not shown).

During the above operation, the block counter 841 outputs selection signals XSEL and YSEL at a high level so that the selector 842 selects the address signal (XADRA) from the X-address generator A 837 and the selector 843 selects the address signal (YADRA) from the Y-address generator A 838. As the block counter 841 receives the carry signal (XARC) from the X-address generator A 837, the counter 841 increments the X-directional block count X by one until the block count X becomes equal to the number of X-directional repetitions Nx (timing 3), then the counter 841 outputs a signal YCNT for counting up the Y-address generator A 838 by one, and sets a signal XEND which indicates completion of image data output for one raster in the direction X to "1" (enable).

On the other hand, the timing generator 844 generates the address signal ADR and the chip select signal CS for the memory 505 based on the address signal (XADR) from the selector 842 and the address signal (YADR) from the selector 843, and outputs the signals RAS, CAS, WE, ADR, CS, OUT in synchronization with the output reference timing signal 500 to the memory 505 for reading the image data. When the signal XEND inputted from the block counter 841 becomes "1", the generator 844 sets the signal VE to a low level (disabled) (timing T3), to temporarily stop outputs of the respective signals so as to stop the image data reading from the memory 505. As the signal VE becomes low, the countings by the X-address generator A 837, the Y-address generator A 838, the block counter 841 stop.

Next, as the horizontal synchronizing signal HSYNC which is the leading portion of the next raster rises, the above operation is repeated, and the Y-address generator A 838 is sequentially counted up. Thus, the printing of the respective rasters are performed. When the Y-address (YADRA) outputted from the Y-address generator A838 coincides with the Y-directional length "Yb" of the basic image size (timings T5 to T7), the Y-address generator A 838 outputs a carry signal (YARC) to the block counter 841, and clears the address YADRA to "0".

The block counter 841 receives the carry signal (YARC) from the Y-address generator A 838, increments the Y-directional block count by one, and examines whether or not this value has become equal to the number of repetitions Ny. If the value is equal to the number of repetitions Ny, the counter sets a YEND signal which indicates completion of the Y-directional reading to a high level (enable) (timing T7). When the signal YEND becomes "1", the timing generator 844 sets the signals VE and PE to the low level (disabled), and stops the respective signal outputs, thus completing the image reading for one unit of the cloth. As the signal PE becomes low, the countings of the X-address generator A 837, the Y-address generator A 838 and the block counter 841 stop.

The number of repetitions Ny may be outputted with a command from the controller 1009, otherwise it may be calculated in accordance with step MS13 (FIG. 2), or it may be set by the operation/display unit 143.

Next, the operation of the address controller in case of the type 2 image output (FIG. 26B) will be described with the timing chart of FIG. 29.

The basic operation in this timing chart is similar to that in the type 1 image output shown in FIG. 28, however, the operation of the Y-address generator B 840 is validated, and the selection by the selector 843 is different from the operation in FIG. 28.

Specifically, the block counter 841 makes the selector 843 synchronized with the X-directional block count of the counter 841, to output the selection signal YSEL for switching the Y-address generator A 838 signal (YADRA) and the Y-address generator B 840 signal (YADRB) to the high/low level, thus switches the Y-address YADR by block.

As the horizontal synchronizing signal HSYNC rises, the Y-directional offset amount Ay is loaded. The Y-address generator B 840 compares the Y-directional length "Yb" of the basic image size with the Y-address generator B 840 output (YADRB), and when the output YADRB becomes equal to "Yb", the output is cleared to "0". At this time, a carry signal YBRC is not outputted. The block counter 841 increments the block counter Y by the carry signal (YARC) from the X-address generator A 837.

FIG. 29 shows this timing in detail. For example, when the initial scanning of the basic image 300 is printed, the Y-address generator A 838 output (YADRA) is selected as the Y-address (YADR) inputted into the timing generator 844 and the Y-address YADR becomes "0". Next, when the initial scanning of the right-side image area (offset portion)is printed, the Y-address generator B840 (YADRB) is selected and the Y-address becomes "Δy". Similarly, in the third image area (no offset portion), the Y-address (YADR) becomes "0" again, then in the next offset area, becomes "Δy" again.

Next, when the second scanning of the image 300 is printed, in the non-offset area, the Y-address generator A 838 output (YADRA) is selected and the Y-address (YADR) becomes "1", and in the offset area, the Y-address generator B 840 output (YADRB) is selected and the Y-address becomes "Δy+1".

After a line 301 in FIG. 26B has been outputted, the Y-address generator B 840 output (YADRB) equals to the basic image is "Yb", and the address is cleared to "0".

In case of the type 3 output shown in FIG. 26C, different from the type 2 output, the basic image 300 is offset in the direction X. In the type 2 output, the selector 843 selects one of the Y-address generator A 8383 output and the Y-address generator B 840 output to change the Y-address (YADR), while in the type 3 output, the selector 842 selects one of the X-address generator A 837 output and the X-address generator B 839 output and outputs the X-address (XADR).

Specifically, the block counter 841 makes the selector 842 synchronized with the Y-count value of the block counter 841 to change over the level of the selector 842 selection signal XSEL, to select one of the X-address generator A 837 (XADRA) and the X-address generator B 839 (XADRB) by block, and output the selected output as the X-address ADR to the timing generator 844. The X-directional offset amount "Δx" is loaded at the rise of the signal HSYNC. The X-address generator B 839 compares the X-directional width "Xb" of the basic image size with the X-address generator B 839 output (XADRB), and when the output XADRB exceeds the width "Xb", the X-address generator B 839 clears the value to "0" without outputting a ripple carry signal (XBRC). The block counter 841 increments the block counter X value by the carry signal (XARC) from the X-address generator A 837.

In the type 4 and type 5 outputs, if the ratio between the width "Xb" and the length "Yb" of the basic image size is an integer, the printed image is geometrically excellent and desirable. Especially, if Xb=Yb (the basic image is a square), the image can be printed in grid-like pattern arrangement. In such comparatively easily made arrangement, switching over the addresses XADR and YADR and changing the count direction (count-up/count-down) of the address generators 837 to 840 can be realized in accordance with the rotation amount R.

Upon rotating the basic image, a rotation processor may be inserted as a pipeline. Further, address control may be arranged so that the basic image rotated by, e.g., 90° is generated in the image memory before outputting image data. This enables simpler and high-speed image output including a rotated image.

Further, the block counter 841 counts the blocks of the basic image and outputs the overall output image size (XOUT, YOUT), however, this does not pose any limitation upon the present invention. Especially, if the image size (XOUT, YOUT) is not an integral multiple of the Xb and Yb, the XOUT and YOUT cannot be defined by only the block count value. Accordingly, the following equation is introduced to perform the comparison between the number of repetitions Nx and the comparison between the remainder pixels Xr, to determine whether or not the number of printed pixels has reached XOUT:

Remainder pixels $Xr = XOUT - Nx \times Xb$ $Nx = INT(XOUT/Xb) - 1$

This can be made with respect to the direction Y.

When the printing speed by the printing head is slow and the image output clock has a slow timing, the aforementioned address generation may be realized by software processing using e.g. a CPU. Especially, a part of the construction in FIG. 27 may be replaced with software by changing part of the memory with a software counter.

In this embodiment, the image data is outputted to the printing head in the raster format, and the image data arrangement is changed in dependence upon the printing head by the raster @ BJ conversion controller 506 (FIG. 19), the present invention is not limited to this arrangement. The image data format to be stored in the memory 505 and the format of the image data to be outputted to the printing head may be the same. Otherwise, if these data formats are different, the output image data format may be adjusted to the head arrangement of the printing head when the image data is outputted to the head driver.

The mechanical construction of the image printer 1004 is actually arranged so that a printing head having a recording range of an X-directional length Hx is moved to scan in the direction X for image output.

In this case, the Y-address generator A 838 and the Y-address generator B 840 of the address controller included in the FM controller 504 can be replaced by a counter (with a comparator) for counting only the Y-directional width Hy and a counter (with a comparator) for counting the ripple carry from the Hy counter.

Further, image can be read out by the width Hy in the direction Y and by the output size XOUT as a band unit in the direction X. At this time, in place of the upper-ranked counters of the Y-address generator A 838 and the Y-address generator B 840, only the lower-ranked counter, i.e., the Hy counter may be used. Specifically, upon image outputting in band units, the CPU 142A loads a Y-directional predetermined address (Y-address of the initial image data in the current band to be printed) into the Hy counter to start counting there.

(3-4) Downloading of Conversion Data and Parameters

Figure 31:
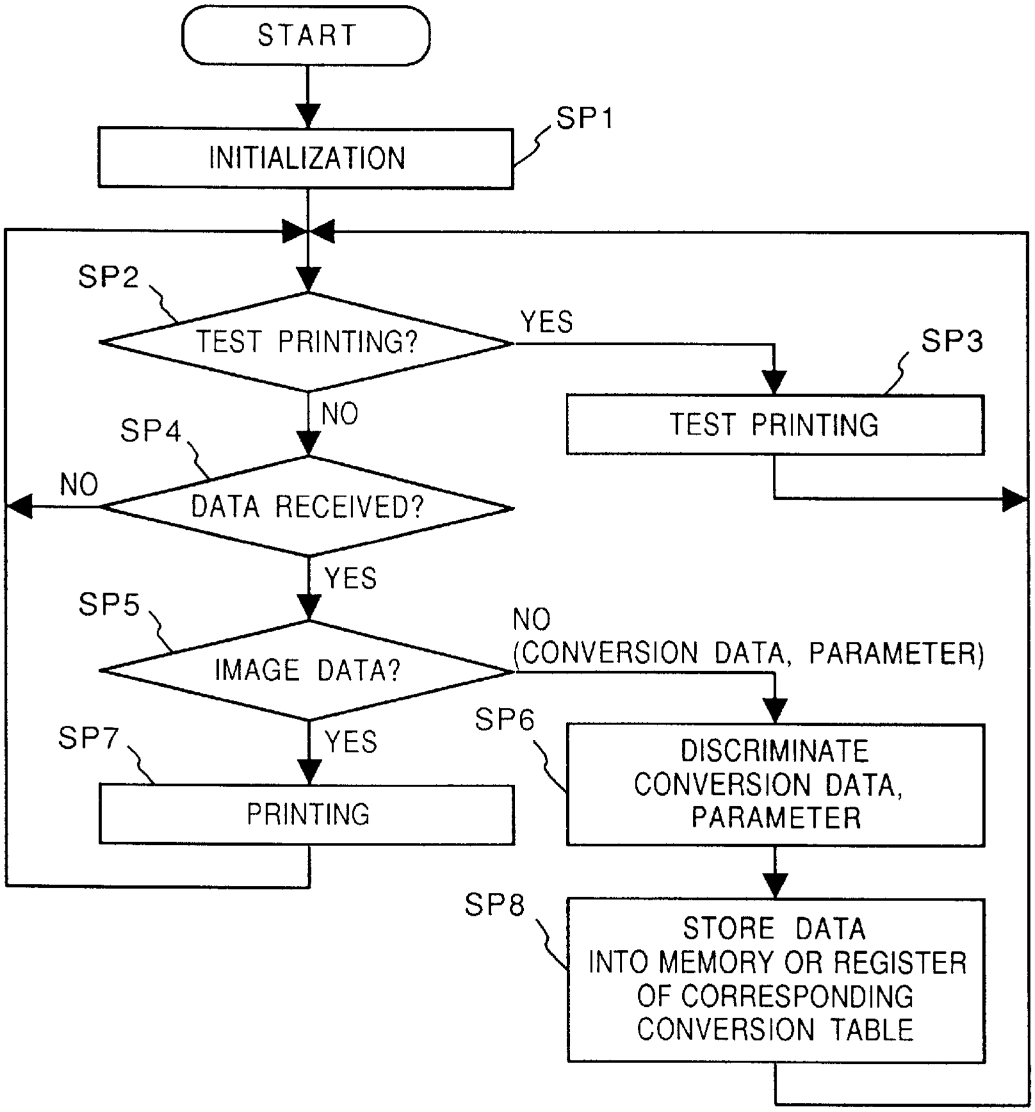
FIG. 31 is a flowchart showing an example of procedure for setting conversion data and parameters at respective memories and registers, as shown in FIG. 20.

The apparatus of the present embodiment performs processings in accordance with the flowchart in FIG. 31 for downloading the aforementioned conversion data to the conversion tables via the conversion controllers or for storing the various parameters set by the controller 1009 and the operation/display unit 143 in predetermined registers. The program for the processings is stored in the ROM 142B in the control board 142 and it is executed by the CPU 142A.

When the power of the printing system is turned on, the image printer 1004 is initialized in step SP1. The initialization includes initialization of the conversion tables 509, 511 and 513 for the respective recording colors.

In step SP2, whether a test-printing instruction has been received from the controller 1009 or the operation/display 143 is determined. If YES, the process proceeds to step SP3 to perform test printing. In this case, the selector 519 for the respective recording colors outputs an instruction signal to select data from the binary PG controller 517, to perform printing processing.

If NO in step SP2, the process proceeds to step SP4 in which whether or not data is received via the GPIB interface 501 and the reception is awaited. If data is received, the process proceeds to step SP5, in which whether the received data is image data or data for the conversion table or a parameter is determined. The determination as to whether or not the received data is image data is made by interpreting the control command positioned at the leading position of the received image data. Especially, if the received data is data for conversion data or a parameter, identifying data is added to indicate the printing color of the conversion table or the control to be performed by the received data.

If it is determined that the received data is image data, the process proceeds to step SP7 to perform printing based on the image quality of the data.

If it is determined that the received data is data for the conversion table or a parameter, the process proceeds to step SP6, to interpret the control command of the data to determine the printing color of the conversion table or the control of the parameter. In step SP8, the data is stored into the conversion table or the register via the corresponding conversion controller or CPU, based on the determination result.

Figure 32:
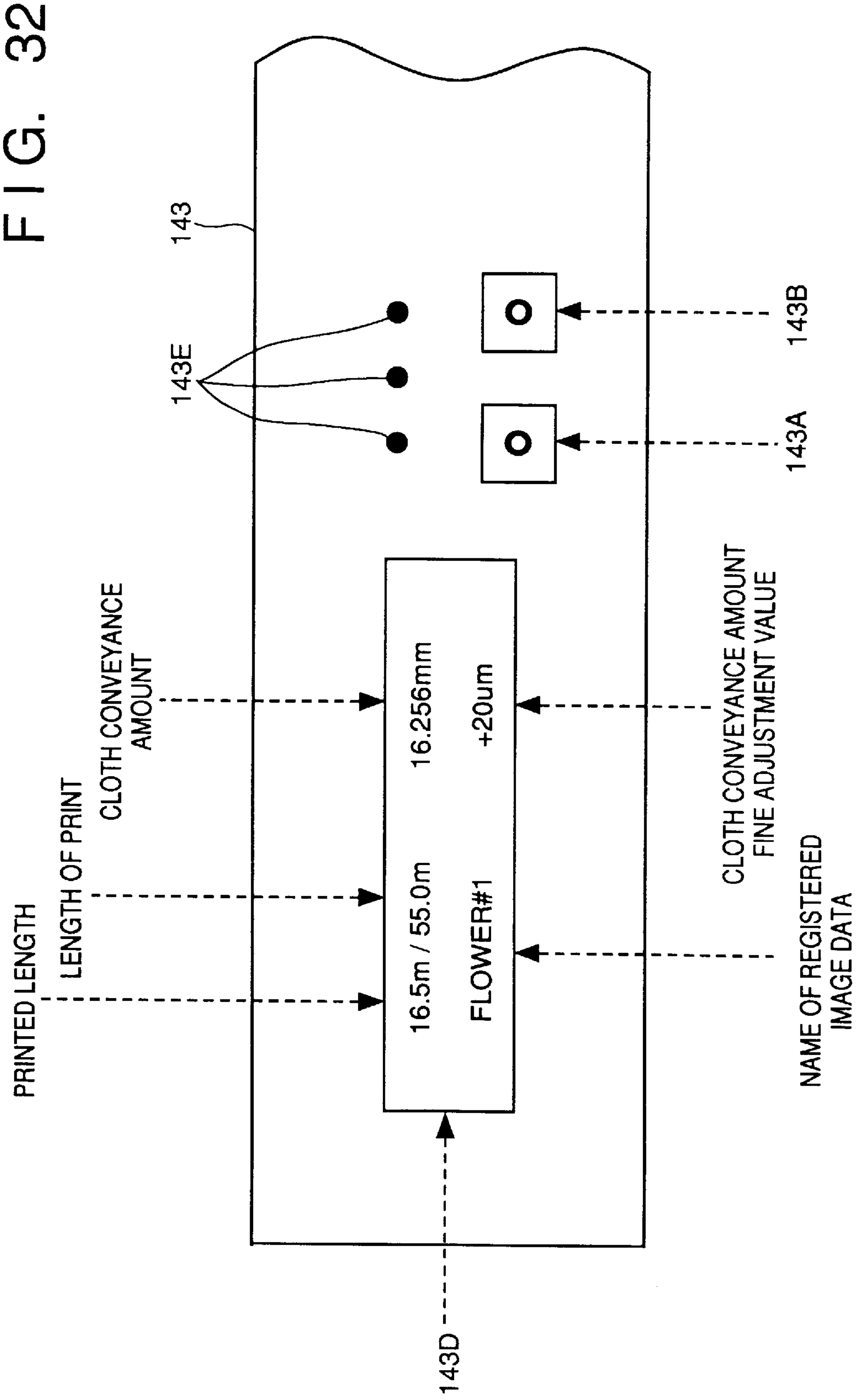
FIG. 32 is a schematic view showing keys and display of operation/display unit shown in FIG. 17.

It should be noted that information and the like set by the controller 1009 and the operation/display unit 143 may be displayed on the display of the operation/display unit 143. FIG. 32 shows an example of the display. In FIG. 32, a display 143D displays the length of a printed image, the entire length of the cloth, and the cloth conveyance amount, however, the display 143 can also display the various parameters and modes set by the controller 1009 and operation buttons of the operation/display unit. Numeral 143E denotes various error lamps; 143A and 143B, respectively a stop button and an emergency stop button, used for selecting a stop mode in which printing-output continuity is protected or a stop mode in which the printing output continuity is not protected.

(4) Other Constructions

In the above embodiment, the controller 1009 supplies color palette image data to the image printer 1004, and the image printer 1004 performs printing using the C, M, Y, BK colors and the special colors S1 to S4 based on the color palette conversion table. Following is an example where the controller 1009 supplies RGB luminance data to the image printer 1004. In this example, the printing system has a similar construction to that in the foregoing embodiment, however, image data represented by RGB luminance data in place of palette image data is stored in the image memory 505 in FIG. 19. Further, the construction shown in FIG. 21 is replaced with that in FIG. 33.

Figure 33:
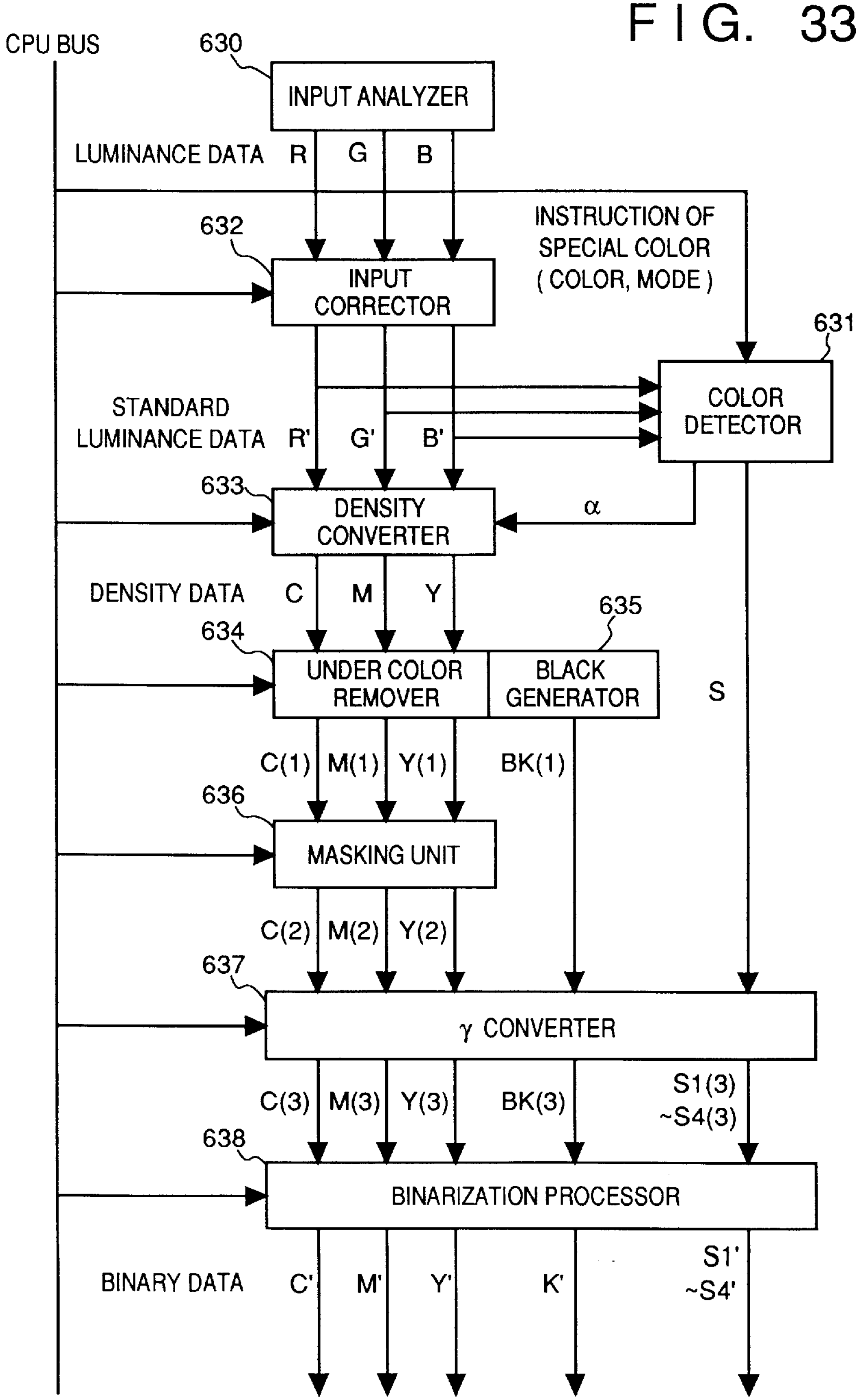
FIG. 33 is a block diagram showing another construction of the main portion of a control board shown in FIG. 17 as data flow.

FIG. 33 shows an example of the image processor for converting RGB signals to CMYBK signals and generating signals for the special colors S1 to S4.

In this example, the controller 1009 transfers RGB color image data to the image printer 1004 via an interface. The CPU 142A arranges timings of the image data processor, the recording head driver 24, the motor driver 23 and the like provided in the control board 142. Under the control of the CPU, a color image is printed by discharging cyan C, magenta M, yellow Y, black BK inks or further the special color S1 to S4 inks on the cloth 103.

In FIG. 33, an input corrector 632 converts image data (luminance data) RGB supplied from the memory 505 via the controllers 504, 506,507 and to standard luminance data R'G'B' (e.g., RGB data based on the color television NTSC standard), in consideration of spectral characteristics and dynamic range of the input image data. A density converter 633 converts the standard luminance data R'G'B' to density data CMY using non-linear conversion such as logarithmic conversion. An under color remover 634 and a black generator 635 perform under-color removal (UCR) and black-color generation in accordance with the following equations:

$$C(1)=C-\beta\times MIN\ (C,M,Y)$$

$$M(1)=M-\beta\times MIN\ (C,M,Y)$$

$$Y(1)=Y-\beta\times MIN\ (C,M,Y)$$

$$K(1)=\sigma\times MIN\ (C,M,Y) \tag{1}$$

Next, a masking unit 636 corrects unnecessary absorption characteristics of inks with respect to the under-color-removed C(1), M(1) and Y(1) in accordance with the following equations:

$$C(2)=A11\times C(1)+A12\times M(1)+A13\times Y(1)$$

$$M(2)=A21\times C(1)+A22\times M(1)+A23\times Y(1)$$

$$Y(2)=A31\times C(1)+A32\times M(1)+A33\times Y(1) \tag{2}$$

$aij(ij=1\sim3)$:masking coefficient.

Next, a γ corrector 637 performs γ correction on the data C(2), M(2) and Y(2) and outputs γ-adjusted C(3), M(3), Y(3) (i.e., the image density printed with ink corresponding to each of the signals C(3), M(3), Y(3) and BK(3) is corrected to be linear).

The printing head is a binary recording unit which discharges or does not discharge ink droplets, therefore, a binarization processor 638 performs binarization on the multi-level data C(3), M(3), Y(3) and K(3) to C', M,' Y' and BK' for respective pseudo half-tone image formation, and outputs the converted data to a circuit shown in FIG. 21.

Further, this example has a color detector 631 which issues an instruction to convert colors of a predetermined RGB range (R'G'B' provided by the input corrector 632) on a chromaticity diagram in correspondence with special color designation from the CPU 142A to the special colors S1 to S4 for printing.

The instruction is supplied to the γ converter 637 as a signal S, and the γ converter 637 outputs appropriate signals S1(3) to S4(3). The binarization processor 638 binarizes the signals and generates signals S1' to S4'.

Figure 34:
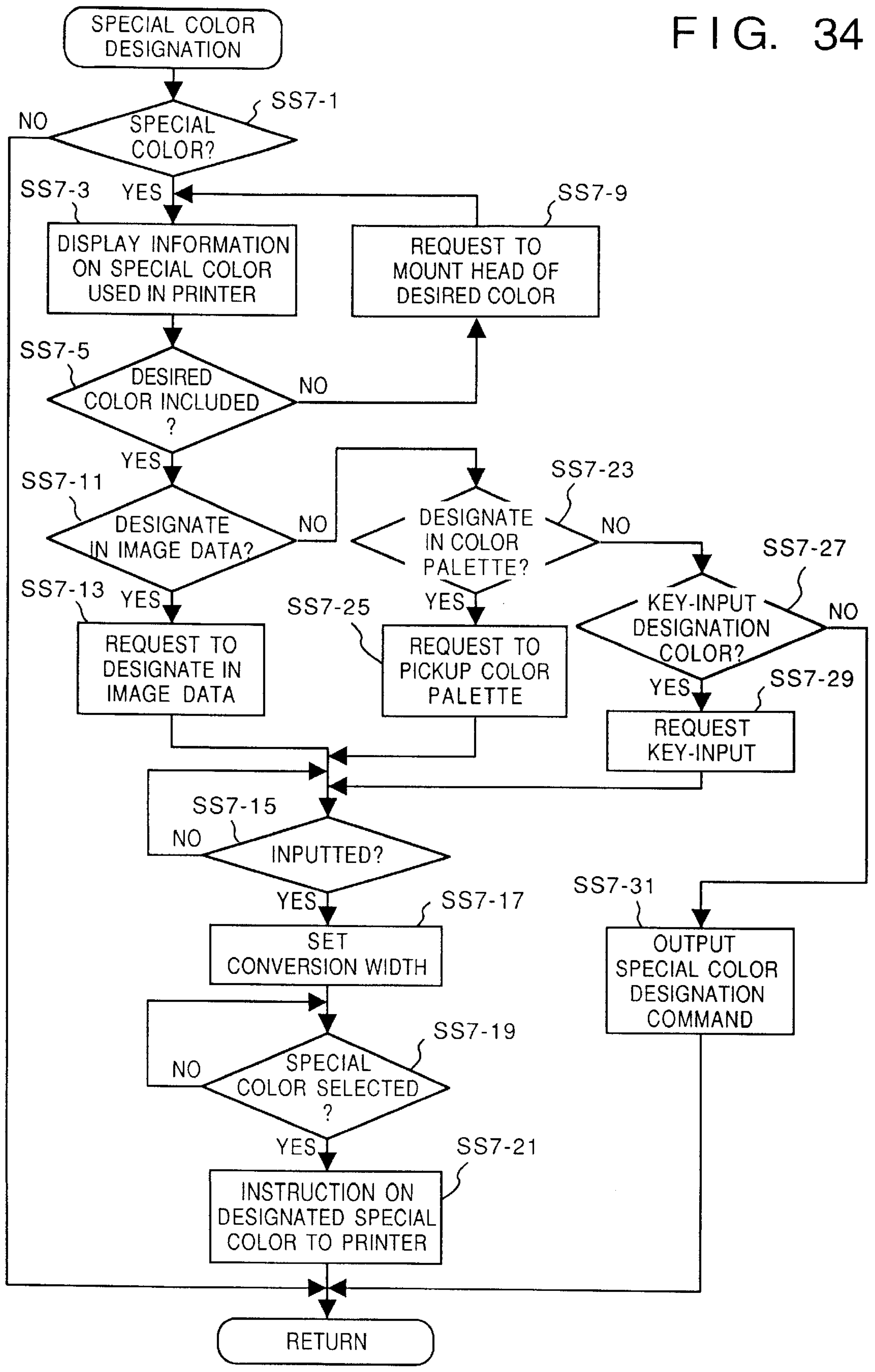
FIG. 34 is a flowchart showing an example of special color designating procedure by the construction in FIG. 33 applicable to a host computer.

FIG. 34 shows an example of the special color designation by the controller 1009 in the construction in FIG. 27. In this procedure, a desired range on the chromaticity diagram is determined based on the designation of a desired RGB range, and the color within the range is converted to a desired special color.

The procedure also employs steps SS7-1 to SS7-7 in FIG. 4. In a case where the printing head of the desired color is mounted, whether or not direct designation is made with respect to the color in original image data displayed on the CRT 1206 is determined in step SS7-11. If YES, the process proceeds to step SS7-13 to request the designation, and in step SS7-15, if it is determined that the designation is made, designation of conversion width of the special color for the respective RGB colors is awaited in step SS7-17. Upon designation, a minimum conversion width (min) and a maximum conversion width (max) are designated for the respective RGB colors. Next, in step SS7-19, the desired special color is selected. For example, if the four special colors S1 to S4 are provided, the special colors may be designated by numerical values respectively assigned to the special colors.

Thus the conversion range designation and the special color designation are made, then in step SS7-21, an instruction is issued to the image printer 1004, in command format, e.g., an identification code <WCOLOR> with codes <Rmin>, <Rmax>, <Gmin>, <Gmax>, <Bmin>, <Bmax> and <byte>. This means-the special color designated by <byte> is to be used for the data within the range on the chromaticity diagram determined by:

$Rmin \leqq R \leqq Rmax$ $Gmin < G < Gmax$ $Bmin < B < Bmax$

If NO in step SS7-11, the process proceeds to step SS7-23, in which whether or not designation of a conversion color is made with a color chart on a CRT screen employed in a computer having a color-graphic function is determined. If YES, the process proceeds to step SS7-25 to request the designation, then proceeds to step SS7-15 to perform the aforementioned processing.

On the other hand, if NO in step SS7-23, the process proceeds to step SS7-27 to determine whether or not conversion color information is designated by key-input. If YES, the designation is requested (SS7-29), and the process advances to step SS7-15. If NO in step SS7-27, it is determined to use the special color currently used in the image printer 1004 (SS7-31), and the process ends.

Figure 35:
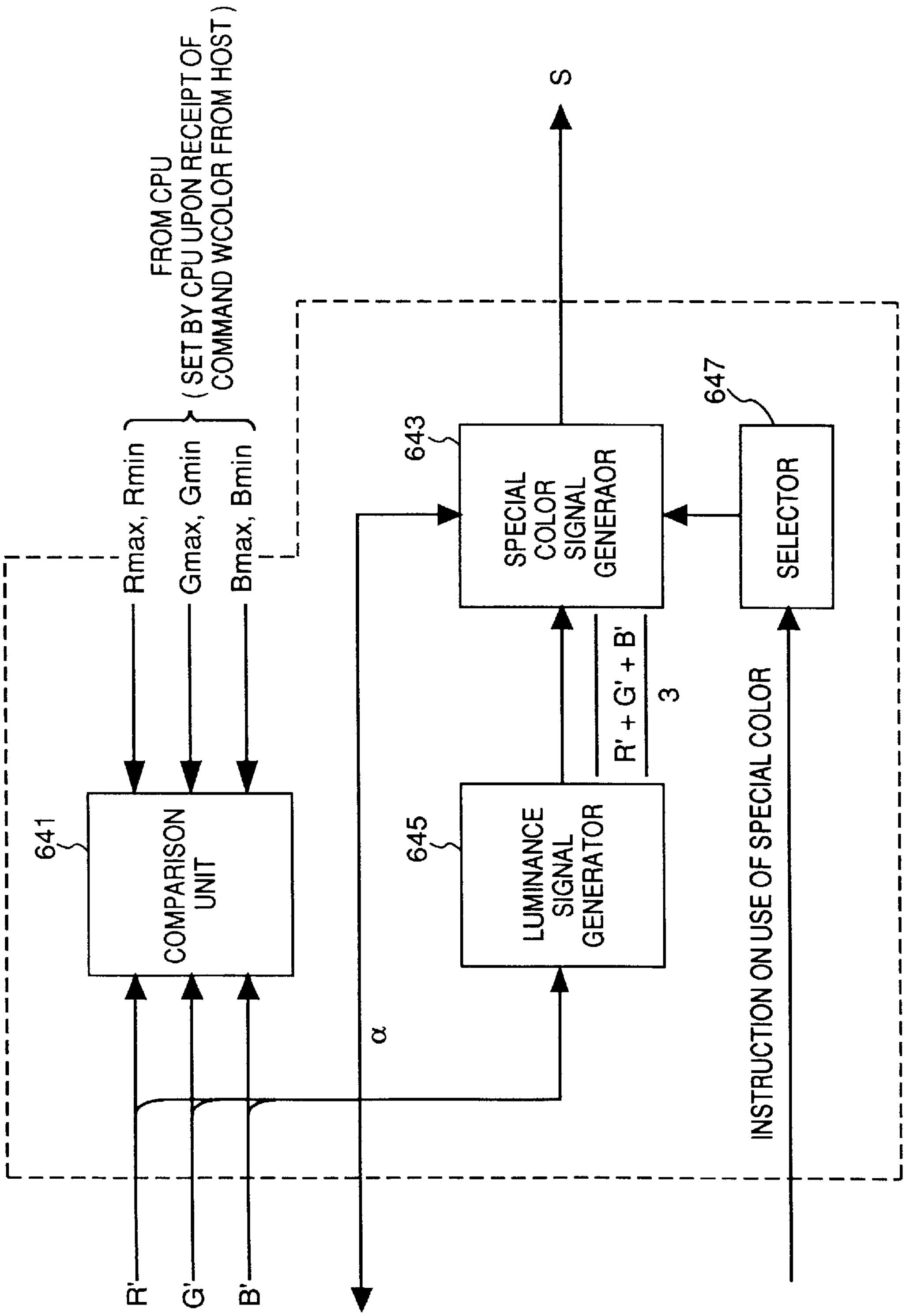
FIG. 35 is a block diagram showing the construction of a color detector in FIG. 33 for the special color designating procedure.

It should be noted that the color detector 631, which deals with the designation from the controller 1009, may be a circuit as shown in FIG. 35.

In FIG. 35, the CPU 142A sets the data outputted from the controller 1009 in a comparison unit 641 comprising a register, comparator and the like. The comparison unit 641 receives the R'G'B' signals from the input corrector 632, and compares the input signals with set values. If the comparison result resides within the designated range, it generates a signal $\alpha$ having a value "0", while if the comparison result resides without the designated range, it generates a signal $\alpha$ having a value "1". The signal $\alpha$ is supplied to the density converter 633 and a special color signal generator 643. If $\alpha=0$, the density converter 633 does not generate CMY signals for the R'G'B' data.

The R'G'B' signals are also supplied to a luminance signal generator 645, which calculates i.e. R'+G'+B'/3 and supplies the calculation result to the special color signal generator 643 so as to attain fine reproduction of the image density. The selector 647, switched by the CPU 142A in accordance with data designated by the code <byte>, instructs the special color signal generator 643 to use the designated special color. If the $\alpha$ outputted from the comparison unit 641 is "0", the special color signal generator 643 generates special color data S of the special color at a density corresponding to the luminance signal from the luminance signal generator 645, in accordance with the instruction from the selector 647.

In a case where the mixture of a special color with the CMY colors is desired, the data <byte> may be increased, and the comparison unit 641 may generate data to determine the mixture ratio for mixing colors between the instruction "$\alpha=0$" instructing use of only special color and the instruction "$\alpha=1$" instructing use of only the CMY color.

Figure 36:
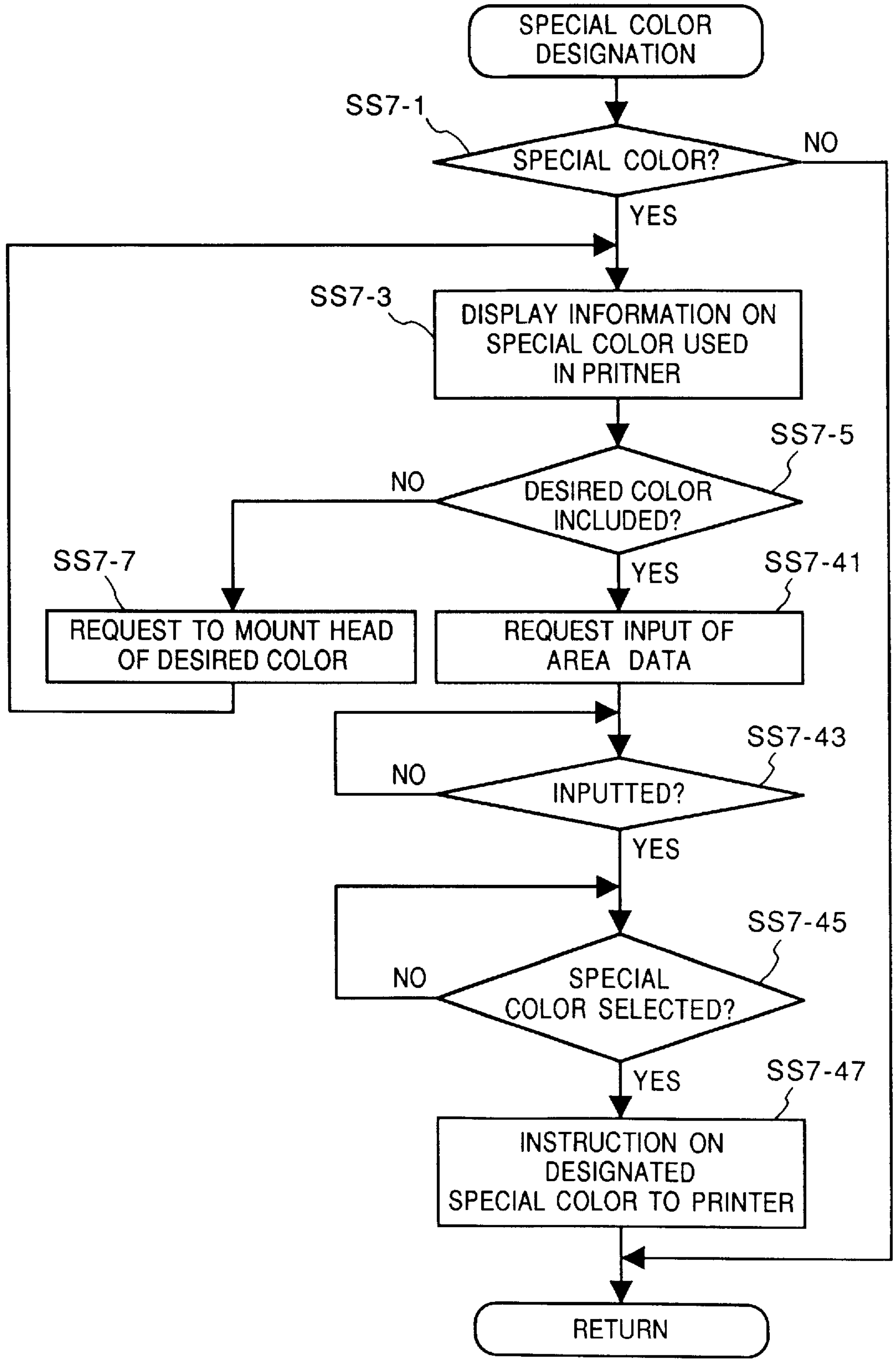
FIG. 36 is a flowchart showing another example of the special color designating procedure.

FIG. 36 shows another example of the special color designation by the controller 1009. In this procedure, a specific area on original image data is designated and the area is printed in a designated color.

Also in this procedure, the aforementioned steps SS7-1 to SS7-7 are used. If the printing head of the special color to be used is mounted, input of coordinate data indicative of a desired area on the original image is requested in step SS7-41. Then, if it is determined that the designation is made in step SS7-43, whether or not selection of special color is made is determined in step SS7-45. In step SS7-47, an instruction on the area data, the special color designation data is given to the image printer 1004. The command format may be, e.g., an identification code <WAREA> with codes <X1>, <Y1>, <X2>, <Y2>, <X3>, <Y3>, <byte>. Similar to the foregoing example, the code <byte> is special color designation data.

Figure 37:
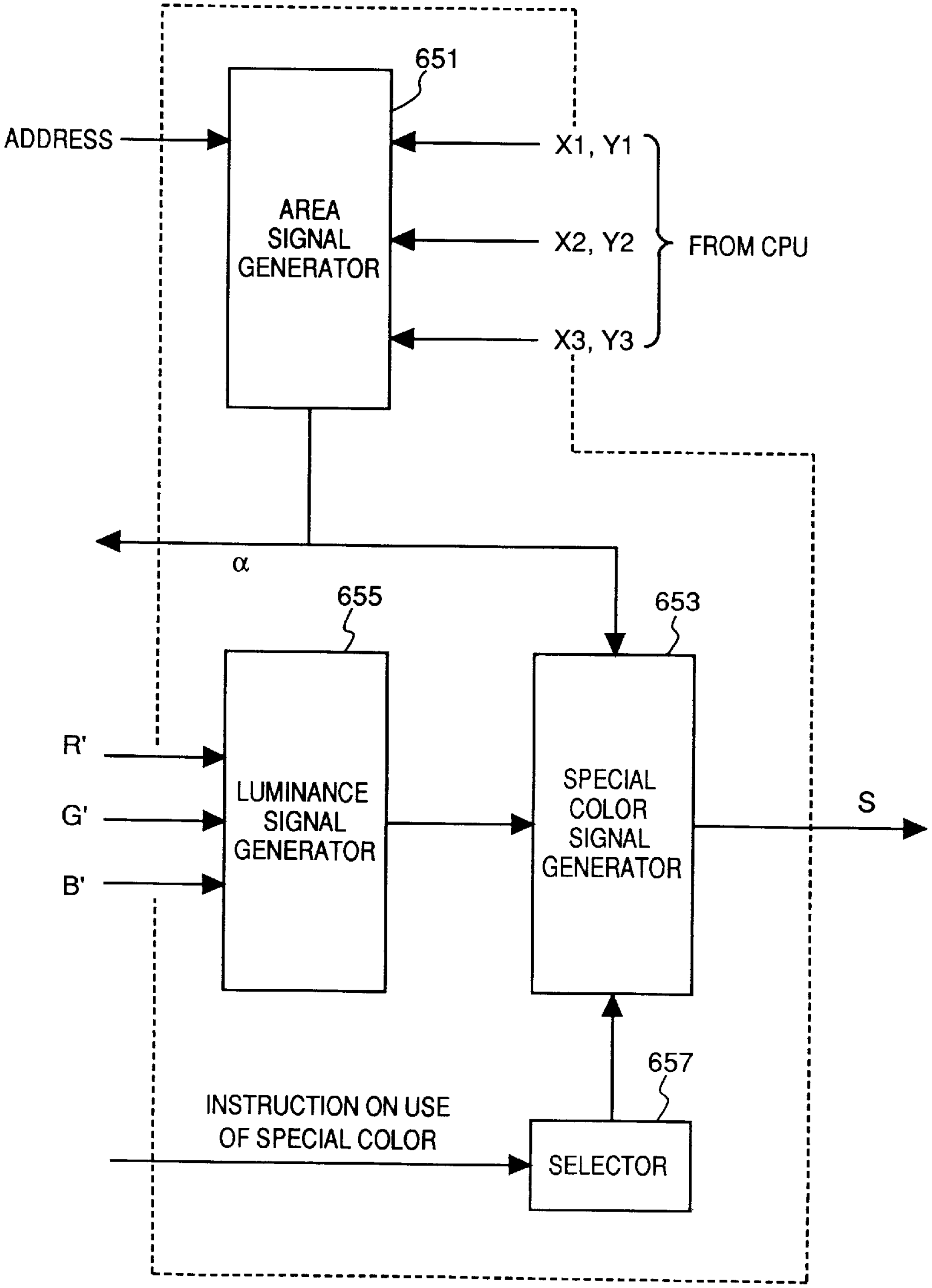
FIG. 37 is a block diagram showing the construction of a range detector provided in place of the color detector for the special color designating procedure.

It should be noted that the area detector in the image printer 1004 may be the -color detector 631 in FIG. 33, and its area detector may be a circuit as shown in FIG. 37.

In FIG. 37, the CPU 142A sets the area data from the controller 1009 in an area signal generator 651 comprising a register, a comparator and the like. The area signal generator 651 receives an image address from the CPU bus, compares the address with set values, and generates a signal $\alpha$ having a value "0" if the comparison result resides within the designated range, while it generates a signal $\alpha$ having a value "1" if the comparison result resides out of the range. The area signal generator 651 supplies the signal to the density converter 633 and the special color signal generator 643. If $\alpha=0$, the density converter 633 does not generate CYM signals. Note that the area signal generator 651 may be arranged to generate data of mixture ratio between the CMY colors and the special colors.

In FIG. 37, a special color signal generator 653, a luminance signal generator 655 and a selector 657 have similar constructions to those of the special color signal generator 643, the luminance signal generator 645 and the selector 647. If the signal $\alpha$ from the area signal generator 651 is "0", the special color signal generator 653 generates the special color data S of the special color at a density corresponding to the luminance signal from the luminance signal generator 655, in accordance with the instruction from the selector 657.

The special color designation procedures described with reference to the flowcharts in FIGS. 4, 34 and 36 may be arranged corresponding to the construction of the image printer 1004, i.e., any of these procedures may be started based on information provided by the image printer 1004. Otherwise, if the image printer has a circuit corresponding to any of these procedures, an operator may select one of the procedures.

In the above embodiment, the "special color" represented by using the printing head for the special color is a color impossible or difficult to reproduce by YMC, such as metallic colors, vivid R, G, B, violet or orange color. Further, the special color includes a color which can be reproduced or even easily reproduced by YMC mixture, but which may be used, in a case where the amount of ink for a particular color becomes extremely large because of its high frequency of use, in order to reduce the ink amount of such frequently-used color. Further, the special color includes a color represented by the mixture of YMC with the special color or the mixture of the special colors.

The embodiment in FIGS., 9 and 10 employs the procedure for generating color-palette data to reproduce a color selected by a designer with high fidelity, however, in a case where the controller 1009 outputs RGB luminance signals to the image printer 1004 as shown in FIGS. 33 and the subsequent Figures, the correction as shown in FIG. 9 or the selection as shown in FIG. 10 may be used for outputting RGB signals for excellent color reproduction.

(5) Operation of Overall Apparatus

The image output apparatus (printer) according to the present invention is not limited to the ink-jet printing method, and may employ various recording methods. In case of ink-jet printing method, the apparatus comprises a heat-generating unit (e.g., an electrothermal converter or laser-light emitter) for generating thermal energy as energy used for ink-discharging, to attain preferable effects in the printing heads based on changing ink-status by such thermal energy. According to this method, high-density and high-precision recording can be obtained.

The essential parts of the image printer 1004 according to the above construction will be described with reference to FIGS. 38 to 41.

Figure 38:
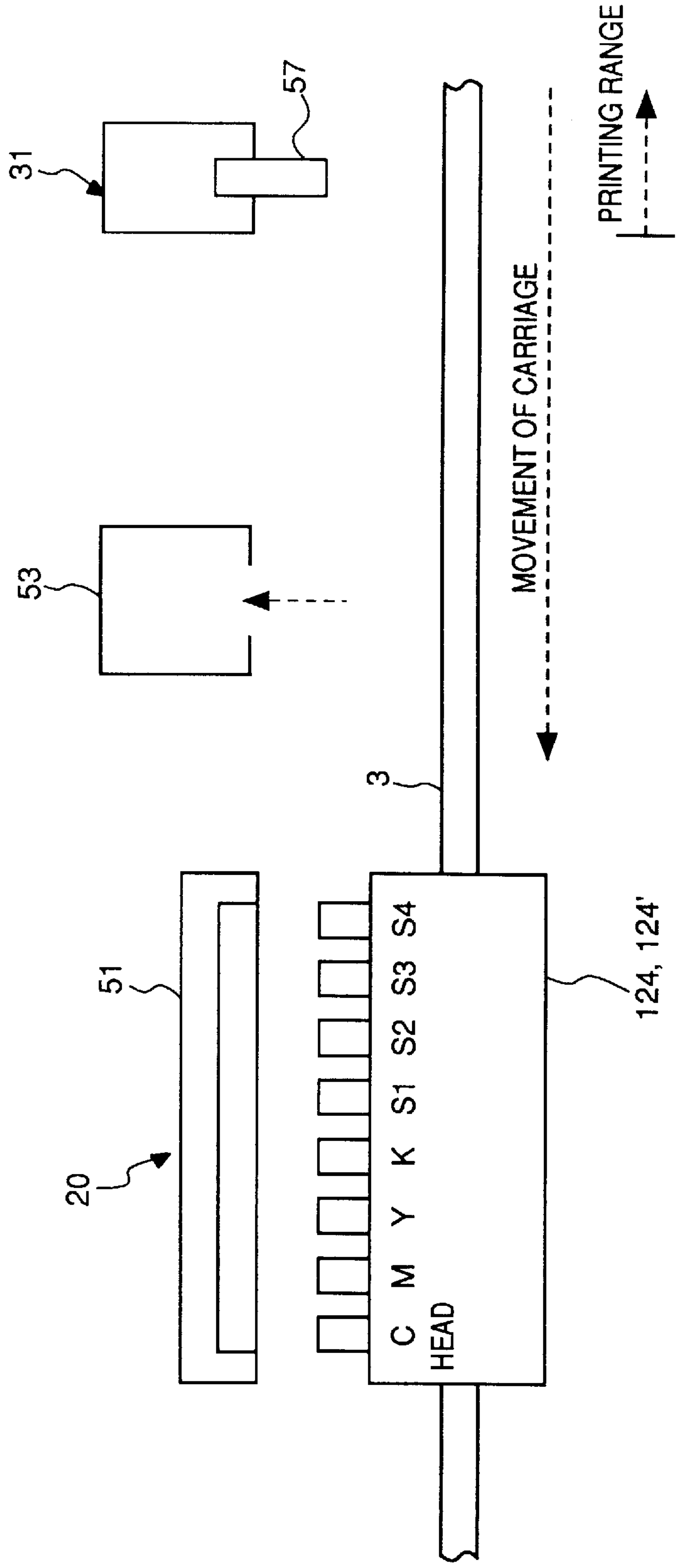
FIG. 38 schematically illustrates a recovery unit for the printing head shown in FIG. 15.

FIG. 38 shows the recovery unit which performs recovery processing for fine ink discharged from the ink-jet heads as shown in FIGS. 15 and 16. A capping member 51 of the capping unit 20, having a drying-preventing function for the discharge surface of the printing head, covers the discharge surface in non-printing status or stand-by status. An idle-discharging receiver 53 receives inks having raised viscosity at the inside of the outlet ports and discharged from the outlet ports. The carriage 124 or 124' moves along the shaft 3 while discharging inks to the idle-discharging receiver 53. A wiping member 57 of the clog prevention unit 31, comprising an elastic member or porous member for eliminating foreign materials adhered to the discharge surface of the printing head, engages with the discharge surface of the respective S4-head to C-head while the carriage 124 or 124' moves, removing foreign materials.

In textile-printing, in addition to the printing primary colors of cyan, magenta, yellow, black, colors difficult to represent by the mixture of these primary colors are used as special colors. The special colors include, e.g., vivid cobalt blue, gold and silver. What color is added as a special color depends on a designer's needs, for this reason, printing patterns may require different special colors. However, the recording apparatus ensures four areas as special color heads (S1 to S4) mounting space on the assumption that four special colors will cover substantially every design.

Figure 39A:
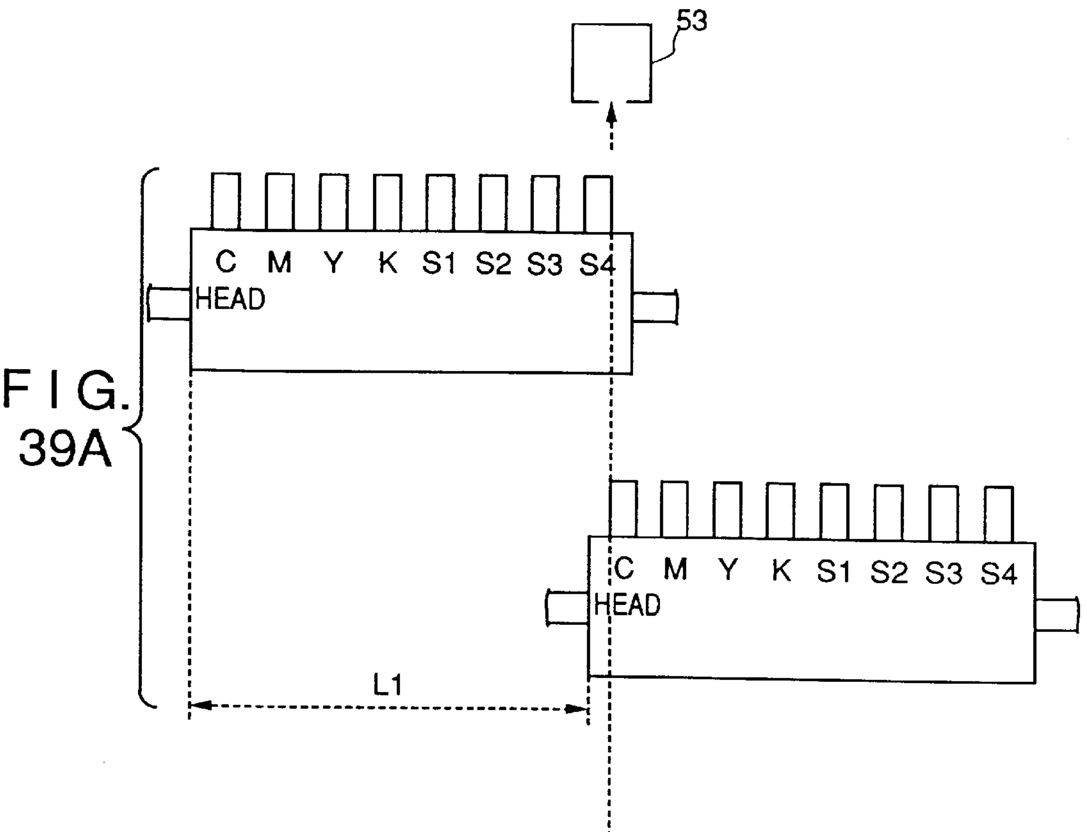
FIG. 39A illustrates the moving range of a carriage mounted with all of special-color printing heads as well as basic printing color heads.
Figure 39B:
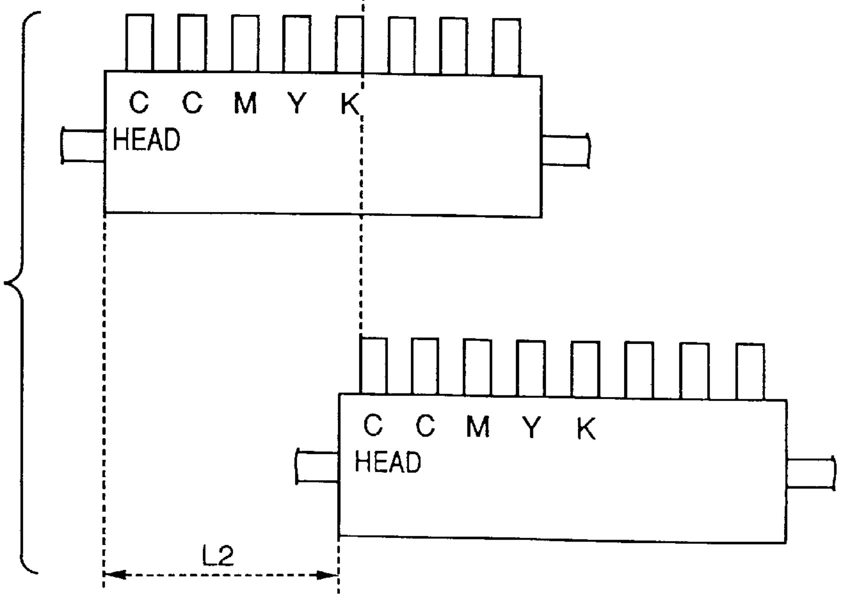
FIG. 39B illustrates the moving range of the carriage mounted with one special-color head as well as basic printing color heads.

FIGS. 39A and 39B illustrate the moving range of the carriage mounted with four special color heads in addition to the primary color heads (FIG. 39A) and the carriage mounted with one special color head (two cyan heads in place of the special color head) in addition to the primary color heads (FIG. 39B) corresponding to the idle-discharging to the idle-discharging receiver 53. As is apparent from these figures, to improve printing speed, recognizing the number of heads or head mounting range should preferably be made before changing the moving range of carriage. That is, a moving distance L1 for the carriage holding eight heads can be changed to a distance L2 if the carriage holds five heads.

This is not only applicable to the idle-discharging but to the wiping and the printing.

In textile-printing for swim suits and ski suits and the like, occasionally, extremely strong printing is required. In such case, superimposed printing may be performed by plurality of scanning on the same printing portion, to raise the printed density. However, this lowers the printing speed. In the example of FIG. 39B, two printing heads for an ink to be printed at a high density are mounted in the head-mounting area for the special color head. Thus, the desired color can be printed using a plurality of printing heads.

In this case, the image processing system as shown in FIGS. 19 to 21 may be arranged as follows. Regarding the palette conversion tables in FIG. 20, the M-conversion table is changed to a C-conversion table; the Y-conversion table, to a M-conversion table; the K-conversion table, to a Y-conversion table; the S1-conversion table, to a K-conversion table. To prevent output from the S2 to S4-conversion tables, the values of the S2-S4 tables are set to "00". The subsequent HS conversion table and the γ conversion table are changed in a similar manner.

The above arrangement renders the binary output 516 in FIG. 20 C, C, M, Y, K. The cyan color has been printed twice, therefore the density is doubled. If the density is desired to be lower, the inclination of the cyan γ conversion table may be rendered small to lower the density to a desired level.

Figure 40:
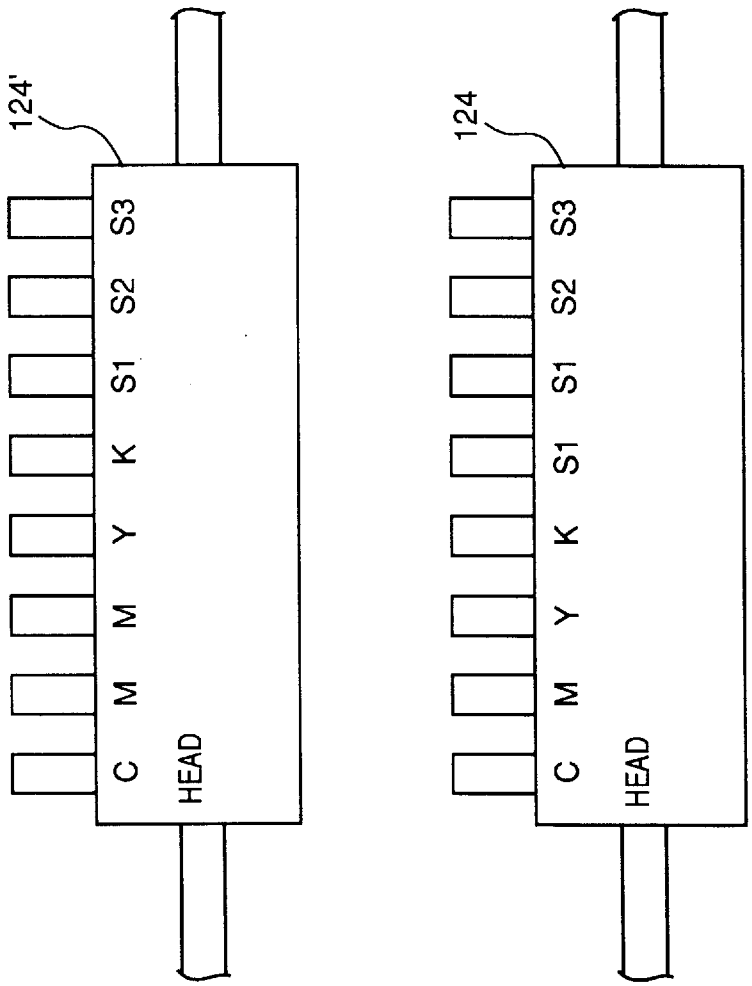
FIG. 40 illustrates an upper carriage mounted with a set of printing heads and a lower carriage mounted with another set of printing heads different from these of the upper carriage.

In this manner, arranging a printing head of a color to be printed at a higher density in the special color head area raises the printing density of the color. Note that in this example the printing head order, i.e., the order of color mixture is not changed, the above arrangement does not cause any change in color tones. FIG. 40 shows an example where the upper carriage 124' is mounted with two magenta heads, and the lower carriage 124 is mounted with two S1 heads. In this example, the tables in the image processing system can be changed in correspondence with the mounted heads.

Figure 41:
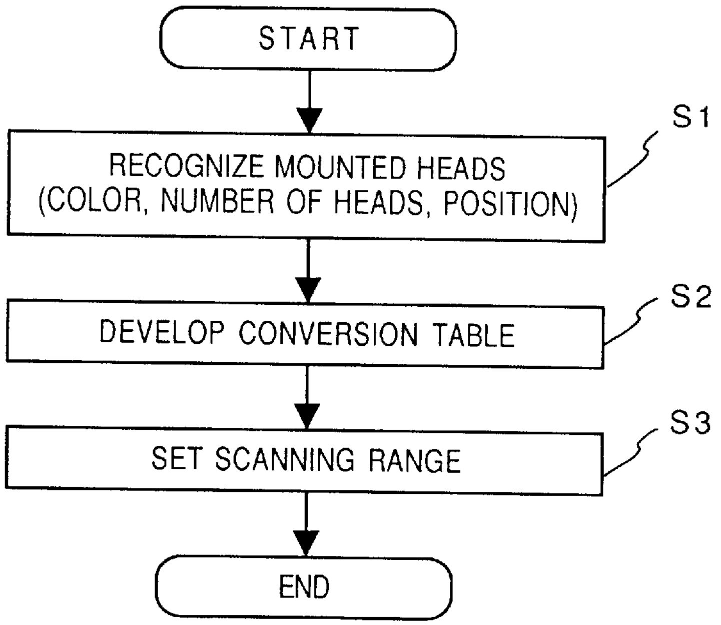
FIG. 41 is a flowchart showing an example of various setting procedures in correspondence with a printing head to be mounted on the carriage.

FIG. 41 shows an example of setting the conversion tables and scanning range in accordance with the printing heads mounted on the carriages 124 and 124'.

In step S1, recognition of the heads mounted on the carriages 124 and 124', i.e., recognition of the colors, the number of the heads and the mounting range is performed. For example, to recognize the number of heads and the mounting range of the heads, the CPU 142A measures impedance between lines on which the heads exist from a signal line between the relay board 147 and the printing heads, or the CPU 142A makes determination based on on/off status of switches respectively provided at the head-mounting positions on the carriage. Otherwise, the recognition of information as disclosed in Japanese Patent Application Laid-Open No. 2-187343 by the present applicant, where each printing head of an ink-jet printing unit 1005 has a unit (pattern cutting) for indicating its own information, and an image printer 1004 (FIG. 1) side which recognizes the information by the unit may be employed. The information indication unit may comprise an EPROM and a DIP switch. To apply to the present invention, the information may be an ink color of the printing head, and the printer may read the information to recognize the color, the number of the printing heads, and the head mounting range. Further, an operator may input the information using the operation/display unit 143.

The control board 142 issues a necessary instruction to the controller 1009 (FIG. 1) based on the recognition result, and develops conversion data, outputted from the controller 1009 in response to the instruction, in the conversion tables 509, 511 and 513 (FIG. 20) in step S3. Further, as described with reference to FIGS. 39A, 39B and 40, the control board 142 sets scanning range in the idle-discharging, the wiping and the printing, based on the number of heads and/or the head mounting range in step S5.

It should be noted that all the printing heads or some of the heads may be removable, otherwise, all the heads may be fixed to the carriage. In the former case, to realize setting of scanning range based on only the number of printing heads, the heads may be arranged at the respective mounting positions so as to avoid irregular space between the heads. In the latter case and in a case where a part of the heads are used for printing, information on the heads to be used may be inputted, or the colors of original image may be analyzed in the controller 1004 to recognize the information of head to be used, and the setting of scanning range may be performed.

Next, an example where printing density is improved will be described. In this example, a similar construction of apparatus and processing procedures to those in the foregoing embodiment may be employed. This example is preferable to ensure a desired printing density in textile-printing.

Figure 42:
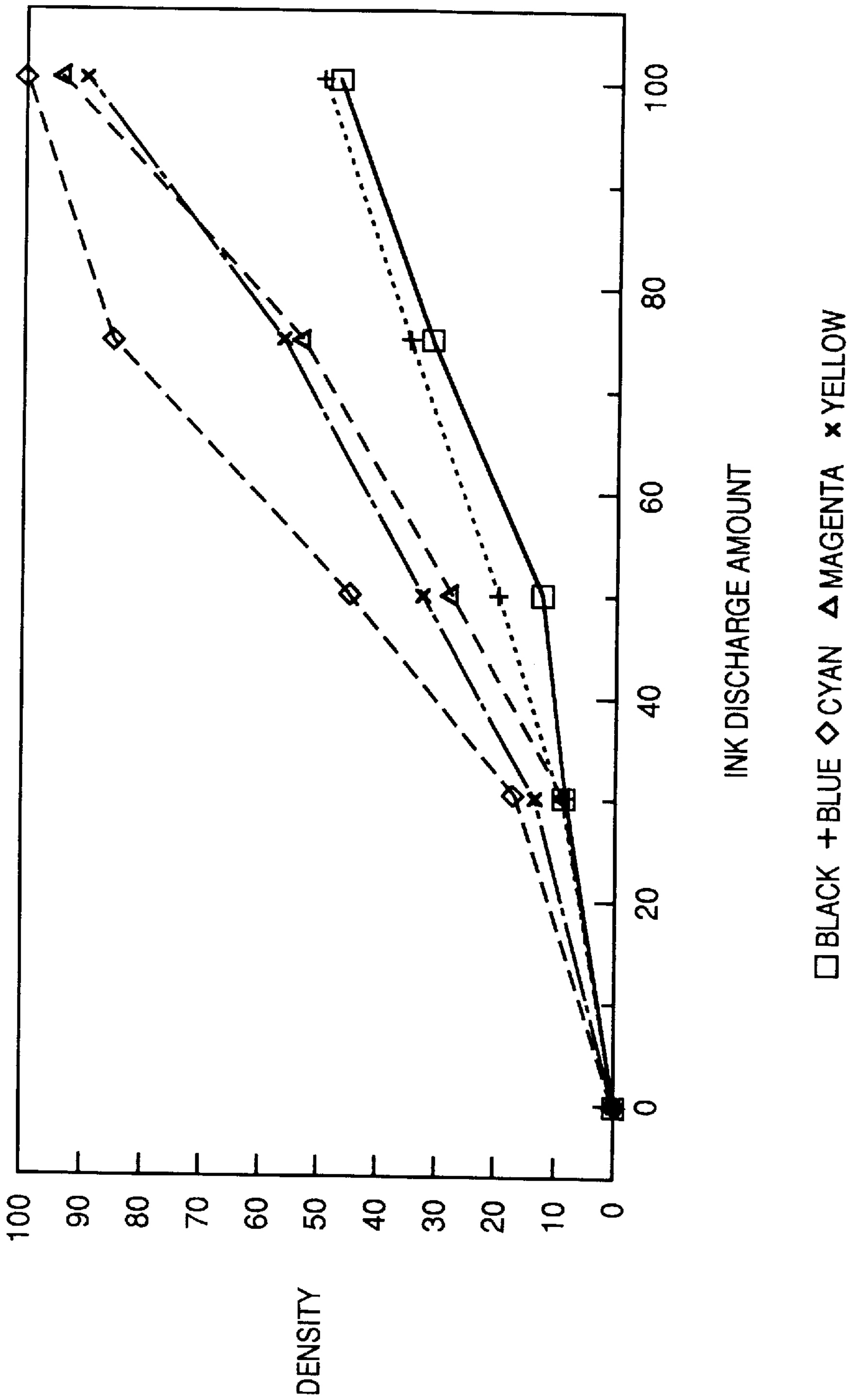
FIG. 42 is a line graph explaining the densities of respective color inks upon printing.

FIG. 42 shows the relation between the amount of inks to be discharged on the cloth 103 and printing densities. In FIG. 42, the horizontal axis represents ink discharge amount where the maximum discharge amount per unit area is "100". The vertical axis represents printing density, called a K/S value, as a function of a reflection rate R of the printed cloth after the coloring and washing, represented by:

$$K/S = \frac{(1-R)^2}{2R} \quad (3)$$

In this graph, the maximum cyan value is "100", and the other color values are quantitatively expressed. The larger the value becomes, the higher the density becomes. Here the characteristics of four primary colors of yellow, magenta, cyan and black, and a special color blue are shown.

As it is apparent from FIG. 42, even when the inks of the same amount are discharged, the printing densities are not the same; the densities of black and blue are about half of the densities of yellow, magenta and cyan.

Upon textile-printing of swim suits, ski suits and the like, occasionally, printing at an extremely high density is required. If use of colors difficult to ensure high density such as black and blue are required, to raise the printing density, raising the density of inks of such color or adjusting the size of ink droplets, as described above are possible. However, high-density inks might cause trouble in ink discharging, further, superimposed printing might cause stripes on the cloth by shifted printings, degrading printing quality and lowering printing speed.

Figure 43:
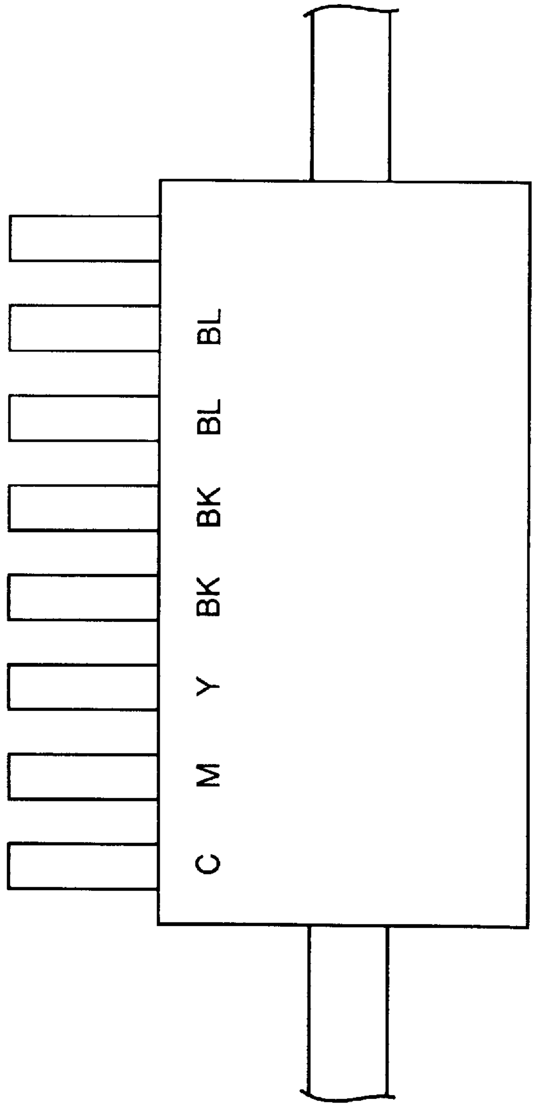
FIG. 43 illustrates a carriage mounted with color heads.

As shown in FIG. 43, this example mounts plurality of printing heads corresponding to a color to be printed at high density on the head-mounting area of the carriage. That is, in FIG. 43, the carriage is mounted with two black (BK) heads and two blue (BL) heads on the head-mounting area.

In this case, the image processing system shown in FIGS. 19 to 21 may be arranged as follows. In FIG. 20, regarding the palette conversion tables 508, the S1-conversion table is changed to a K(black)-conversion table; and S2 and S3-conversion tables, to BL (blue) tables. To prevent any output from the S4-conversion table, the table value is set to "00". The subsequent HS conversion table and the γ conversion table may be changed in accordance with the mounted printing heads.

The above arrangement renders the binary output 516 in FIG. 20 C, M, Y, K, K, BL and BL. As the printing density of black and blue are doubled, in case these densities are lowered a little, the inclination of the γ conversion tables of those colors may be rendered small to obtain desired printing densities.

Figure 44:
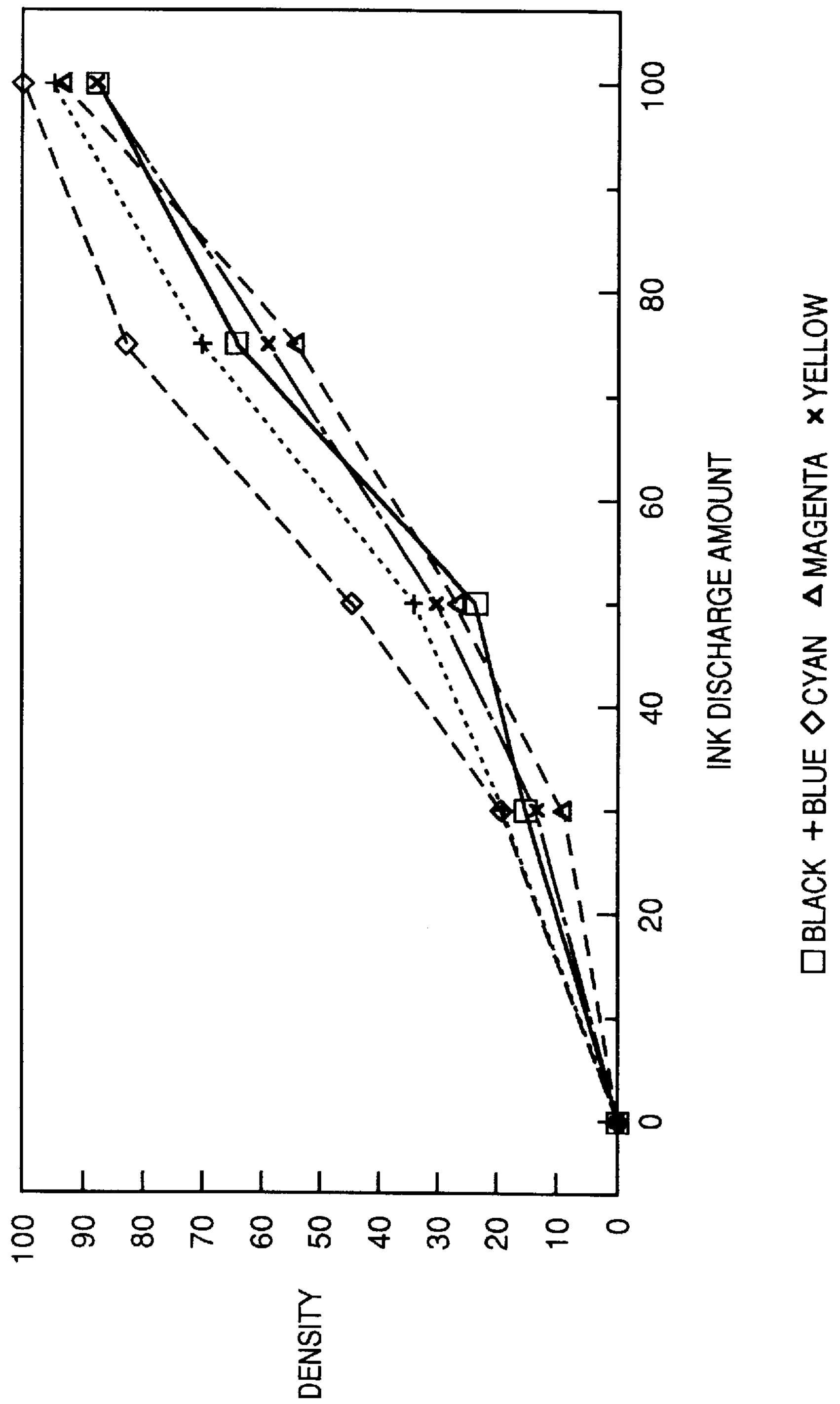
FIG. 44 is a line graph explaining the densities of respective colors upon printing by the printing head in FIG. 43.

FIG. 44 shows printing densities in a case where two black heads and two blue heads are mounted. As is apparent from this graph, the densities of these colors can be the same as the densities of the other three colors.

In this manner, providing plurality of heads of an ink to be printed at a higher density in the special color head mounting area improves the density of the color. In this example, as the order of printing heads, i.e., the order of color mixture is not changed, the above arrangement does not cause any change in color tones.

Similar to the foregoing embodiment, a processing procedure as shown in FIG. 41 may be employed to set the conversion tables corresponding to the mounted printing heads.

That is, in step S1, the recognition of the heads mounted on the carriage, i.e., recognition of the colors, the number of heads and/or head mounting range is performed. The control board 142 issues an instruction based on the recognition result to the controller 1009, and develops conversion data outputted from the controller 1009 in response to the instruction in the conversion tables 509, 511 and 513 in step S3. Further, step S5 is executed in correspondence with the number of heads and/or the head mounting range, to perform the idle discharging, the wiping and the printing range setting, as described with reference to FIGS. 39A, 39B and 40. If these operations are unnecessary, step S5 may be omitted.

It should be noted that in this example, two black printing heads and two blue printing heads are mounted to obtain desired densities, however, the number of heads of an object color can be changed in accordance with a desired density and the setting in the image processing system can be changed in accordance with the mounted heads.

(Example of Inks)

Next, preferable inks to be employed in the textile-printing in the above embodiment and examples will be described.

Screen printing method, in which printing is performed directly on a printing medium such as a cloth by using a silk screen plate, is a well-known conventional textile-printing. More specifically, screen plates are formed with respect to colors used in an original image, and inks are directly applied onto the cloth through the silk texture.

However, this screen printing requires a lot of steps and working time for making screen plates, further, preparation of respective inks and alignment of the screen plates. The size of a printing apparatus is large and it becomes larger in proportion to the number of colors, occupying large setting space, moreover, space for holding the screen plates is necessary.

On the other hand, an ink-jet printing apparatus has been put into practical use, as an output apparatus for a work station or a combined electronic device, including a recording device such as a facsimile apparatus a computer and a word processor. This ink-jet printing apparatus can be utilized for textile-printing system where inks are directly discharged on a cloth as described in the above embodiment and examples. The printing system using the ink-jet printer requires no screen plate, for this reason, it can substantially reduce preparation steps and time before the actual printing operation, further, it enables downsizing of the recording apparatus, furthermore, it enables safekeeping of image information with small space, for printing data can be stored by magnetic tapes, floppy disks, optical disks and so on-. In addition, the system realizes processings such as changing of color arrangement, changing of layout, enlargement/reduction of original image.

Especially, an ink-jet recording unit (printing head) which discharges ink by utilizing thermal energy, having high-density fluid path arrangement (discharge port arrangement) can be easily manufactured. To constitute such printing head, an electrothermal converter, electrodes, fluid-path walls, a top plate and the like are formed on a base plate via semiconductor-manufacturing processes such as etching, evaporation and spattering. This can obtain a further compact printing unit, further, it accelerates printing speed and improves high precision in image quality.

Compared with conventional inks for ink-jet printing on recording medium such as paper, inks used for the ink-jet textile printing must have the following characteristics:

a. Sufficient density is obtained in a printed color.

b. Clogging in the discharge ports and the ink channels of a printing head are prevented.

c. Irregular blurs on a cloth are reduced.

d Ink discharge characteristic does not change during a long use. Especially, in a case inks are discharged by utilizing thermal energy, adhesion of foreign materials to a heater can be avoided. Further, breakage of the heater due to cavitation at ink-bubble deforming time can be avoided.

Upon making the ink-jet textile-printing fit for practical use, the following problems have arisen.

A serial scanning type printer is known as an apparatus for ink-jet printing. This apparatus moves a carriage mounted with printing heads in a main-scanning direction along a recording medium to print an image for one line. Thereafter, the apparatus conveys the recording medium in a subscanning direction by a predetermined amount (pitch conveyance), then performs printing for next one line. These operations are repeated to perform printing on the whole recording medium.

To use this ink-jet printer in textile-printing, printing length (scanning length) must be extremely longer (about 0.5 m or longer) than that of printers for office use, to meet requirements from the points of manufacturing speed and final product form such as clothes. In this case, if an ink-jet printing in which a printing head discharges ink by thermal energy generated by heat-generating elements by application of a driving signal, the temperature rise of the printing head at one scanning is large because of the long scanning distance, which greatly changes the viscosity of the ink, therefore, stable ink discharging in one scanning is difficult. This causes poor ink discharging.

Further, the sedimentation amount of ink-mist occurred if ink discharging becomes very large due to the long scanning distance, and the nozzle orifices are filled with the ink-mist. This also causes poor ink discharging. The ink-mist accumulated around the nozzles is drawn by the contact with fibers such as nap and waste of thread on the cloth surface to nozzle orifices and plugs up the orifices, which also causes poor ink discharging. Further, the nap and waste of thread on the cloth are frequently brought into contact with the nozzle orifices, to fill the orifices and prevent ink discharging. These problems are characteristic to the printer having a long printing length, in which ink discharging is made by $1.8\times10^4$ driving-signal applications for one scanning.

In the ink-jet printer having a long printing length, to perform stable ink discharging without poor ink discharging, and to obtain printed matter without image printing fault, further, to solve the above problems, i.e., to obtain high-density printed matter without blur, to prevent clogging at the head discharge orifices and to improve durability and discharge characteristic of long use, appropriate inks must be employed.

The above objects may be attained by constructing the ink-jet textile printing as follows.

That is, in the ink-jet textile printing where the printing head discharges ink by thermal energy generated based on the application of a driving signal to the heat generating elements of the printing head, the printing head scans relatively to the cloth, and during one scanning, at least one of the ink-discharge nozzles discharges the ink by $1.8\times10^4$ or more applications of driving signal, and the ink contains dyes from 2 wt % or more to 30 wt % or less of the gross ink weight, and the ink viscosity is from 1.5 cp or greater to 4 cp or less, and the surface tension of the ink is from 35 dyn/cm or greater to 65 dyn/cm or less.

Further, in the ink-jet textile printing where the printing head discharges ink by thermal energy generated based on the application of a driving signal to the heat generating elements of the printing head, using at least black, magenta, cyan and yellow inks and/or desired special color inks, the printing head scans relatively to the cloth, and during one scanning, at least one of the discharging nozzles discharges the ink by $1.8\times10^4$ or more applications of driving signal, and each ink contains dyes from 2 wt % or more to 30 wt % or less of the gross ink weight, and the ink viscosity is from 1.5 cp or greater to 4 cp or less, and the surface tension of the ink is from 35 dyn/cm or greater to 65 dyn/cm or less.

Next, the inks available to the ink-jet printing apparatus in the above embodiment and examples will be described in detail in accordance with a preferred example.

The ink used in this example is composed of coloring matter, water, organic solvent, addition agent and so forth. As the coloring matter, dyes are preferable, and any dye may be used so far as it dyes cloth material. Acid color, cationic dye, reactive dye, disperse dye are included in such dyes. The ink may contain one or more kinds of these dyes, and may use different hue dyes together. Generally, the content of the dye to obtain sufficient coloring on the cloth is from 2 wt % or greater to 30 wt % or less, preferably, from 4 wt % or greater to 25 wt % or less. Especially, a black ink should preferably contain the dye of from 6 wt % or greater to 20 wt % or less.

The content of water as the main ingredient of the ink is from 10 to 93 wt %, preferably, from 25 to 87 wt %, and more preferably, from 30 to 80 wt % to the gross ink weight.

As for organic solvent, eg., keton or keto-alcohol such as acetone and diacetone alcohol; ether such as tetrahydrofuran and dioxane; oxyethylene or oxypropylene addition polymer such as diethylene glycol, triethylene glycol, tetraethylene glycol, dipropylene glycol, tripropylene glycol, polyethylene glycol, and polypropylene glycol; alkylene containing two or six carbon atoms such as ethylene glycol, propylene glycol, trimethylene glycol, butylene glycol, 1,2,6-hexanetriol and hexylene glycol; glycerin; polyalcohol lower alkyl ether such as ethylene glycol monomethyl (or ethyl) ether, diethylene glycol monomethyl (or ethyl) ether and triethylene glycol monomethyl (or ethyl) ether; polyalcohol lower dialkyl ether such as triethylene glycol dimethyl (or ethyl) ether, and tetraethylene glycol dimethyl (or ethyl) ether; sulfolane, N-methyl-2-pyrrolidone, and 1,3-dimethyl-2-imidazolidinone.

Generally, the aquaorganic solvent content is 5 to 60 wt %, and preferably, 5 to 50 wt % to the gross ink weight.

The above solvent may be used both in single or mixture form, and preferably, the solvent should include one sort of polyalcohol, especially, single thiodi glycol, diethylene glocol mixture, and thiodi glycol mixture are desirable.

In addition to the essential ingredients are as mentioned above, publicly-known various dispersing agent, detergent, viscosity regulator, surface tension regulator optical whitening agent and the like may be used. For example, viscosity regulator such as polyvinyl alcohol, cellulose and aquaresin; various cation or nonion detergent; surface tension regulator such as diethanolamine, and triethanolamine; buffer solution as pH regulator, and mold resistant may be used.

It should be noted that to realize excellent ink-jet textile printing, the ink viscosity should be maintained within a range from 1.5 cp or greater to 4 cp or less, preferably, 2.0 cp to 3.8 cp; the surface tension, within a range from 35 dyn/cm or greater to 65 dyn/cm or less.

That is, to perform the ink-jet textile printing having a long printing length, the ink characteristic must be managed on the conditions more strict than the conventional printing inks.

Assuming that the ink viscosity is 4 cp or greater, poor ink discharging will increase drastically. As the discharging force is too weak, ink discharging is hindered by ink stagnant around the discharging orifices and/or waste of thread. Assuming that the ink viscosity is 1.5 cp or less, a printed image may have blur and ink discharging is unstable. (satellite by splash).

When the ink viscosity resides within the above range, if the surface tension is 35 dyn/cm or less, the length of discharge failure (length of white (unprinted) portion) becomes several tens cm. That is, recovery after the discharge failure does not work smoothly. If this tens cm discharge failure occurs even once, the cloth cannot be used as it is an inferior product.

Contrary, if the surface tension is 65 dyn/cm or greater, the frequency response is lowered and discharging becomes unstable.

Accordingly, the effective printing by the ink-jet printer of long printing length can be obtained by setting the range of ink viscosity and the range of surface tension. In other words, if any of the ink viscosity and surface tension is outside of the set range, a desired effective printing cannot be attained.

Adjustment of the ink viscosity and surface tension can be easily made by those skilled in the art from, e.g., combination of arbitrarily-selected dyes and organic solvent, and adding various addition agents to the dyes and solvent.

The cloth materials for ink-jet textile printing may be natural fibers, regenerated fibers, semi-synthetic fibers and synthetic fibers, e.g., cotton, silk, nylon and polyester, especially, the natural fibers such as cotton and silk fibers are desirable. These fibers can be used in any form of textile, knitting, non-woven fabric and so on.

To obtain excellent printed matter, the conventional pre-process should preferably be performed on the cloth. Especially, the pre-process, where the cloth contains an alkali substance at 0.01 to 5 wt %, or a substance at 0.01 to 20 wt %, selected from a group consisting of water soluble metal salt, water soluble polymer, urea and thiourea, is desirable.

The alkali substance is, e.g., alkali hydroxide metal such as sodium hydroxide and potassium hydroxide; amines such as mono, di and triethanol amine; carbonic or bicarbonic alkali metal such as sodium carbonate, potassium carbonate and sodium bicarbonate; organic acid metal salt such as calcium acetate and barium acetate; ammonia; and ammonia compound. Further, trichloroacetic sodium may be used with steaming and under dry condition. As preferable alkali substance, sodium carbonate or sodium bicarbonate used in a reactive dye drying method.

The water soluble polymer is. e.g., starch such as corn and wheat flour; cellulose such as carboxymethyl cellulose, methylcellulose and hydroxyethyl cellulose; polysaccharide such as sodium alginate, gum Arabic, sweet bean gum, tragacanth gumr gua-gum and tamarind seed; protein such as gelatin and casein; and natural water-soluble polymer such as tannin and lignin.

The synthetic polymer is, e.g., polyvinyl alcohol compound, polyethylene oxide compound, acrylic acid type water soluble polymer and maleic anhydride type water soluble polymer. Preferable synthetic polymer is a polysaccharide polymer or cellulose type polymer.

The water-soluble metal salt is, e.g., a compound such as a halide of alkali metal and alkali earth metal which forms a typical ion crystal and having a pH value of 4 to 10. More specifically, such alkali metal includes NaCl, Na2SO4, KCl, CH3COONa, and the alkali earth metal includes CaCl2 and MgCl2. It is preferable to employ a salt of Na, K or Ca.

Next, a description will be made using an example of inks and the comparison between the inks.

1. Mixing Ink

Water-soluble inks A to H obtained by mixing the respective ingredients, stirring the mixture for two hours, and filtering it through Fluoropore filter FP-100 (a brand name, manufactured by Sumitomo Electric Industries, Ltd.)

| | |
|---|---|
| Ink A | |
| C.I. Reactive Black 39 | 15.0% |
| thiodiglycol | 15.0% |
| diethylene glycol | 10.0% |
| water | 60.0% |
| Ink B | |
| C.I. Reactive Red 24 | 11.0% |
| thiodiglycol | 10.0% |
| diethylene glycol | 20.0% |
| water | 59.0% |
| Ink C | |
| C.I. Reactive Blue 72 | 8.0% |
| thiodiglycol | 20.0% |
| diethylene glycol | 10.0% |
| water | 62.0% |
| Ink D | |
| C.I. Reactive Yellow 95 | 11.0% |
| thiodiglycol | 25.0% |
| diethylene glycol | 10.0% |
| water | 54.0% |
| Ink E | |
| C.I. Reactive Black 39 | 15.0% |
| thiodiglycol | 15.0% |
| diethylene glycol | 15.0% |
| water | 55.0% |
| Ink F | |
| C.I. Reactive Black 39 | 15.0% |
| thiodiglycol | 10.0% |
| water | 75.0% |
| Ink G | |
| C.I. Reactive Red 24 | 11.0% |
| isopropyl alcohol | 10.0% |
| thiodiglycol | 10.0% |
| diethylene glycol | 20.0% |
| water | 49.0% |

-continued

| | |
|---|---|
| Ink H | |
| C.I. Reactive Red 24 | 11.0% |
| glycerin | 10.0% |
| water | 79.0% |

Water soluble inks I and J obtained by mixing the respective ingredients, regulating its pH level to 4.8 using acetic acid, stirring the mixture for two hours, and filtering it through the Fluoropore filter FP-100

| | |
|---|---|
| Ink I | |
| C.I. Acid blue 40 | 4.0% |
| diethylene glycol | 36.0% |
| water | 60.0% |
| Ink J | |
| C.I. Acid black 26 | 6.0% |
| diethylene glycol | 36.0% |
| water | 58.0% |

2. Ink-Jet Textile Printing Apparatus The apparatus as shown in FIG. 15 or 16 is used on the following conditions (printing apparatus a)

Printing head:400 dpi, 256 nozzles, orifice size=22 μm×33 μm

Driving voltage:24.0 V

Head temperature:25~60° C.

Driving pulse width:10 μs

Driving frequency:1.5 KHz~4.0 KHz

Distance between nozzles and cloth:1 mm

Ink discharge amount:20~50 pl/dot

Printing length (scanning length):1.6 m

Further, the apparatus as shown in FIG. 15 or 16 is used as a recording apparatus b on the above conditions except the printing length, which is 310 mm in this case.

3. Cloth

Two kinds of cloths a and b are used. The cloth a has been dipped into 10% sodium hydrate aqueous solution and dried. The cloth b has been dipped into 15% urea aqueous solution and dried.

a: plain weave shirting (cotton 100%)

b: habutae (8 monme) (silk 100%)

4. Operation

Solid printing by 30 scannings is performed using the inks A to J, the ink-jet printing apparatuses a and b on the above cloths a and b (printing apparatus a prints by $1.8\times10^4$ pulse/nozzle per each scanning; printing apparatus b, by $4.0\times10^3$ pulse/nozzle per each scanning), in order to examine the occurrence frequency of ink-discharge failure and the average length of the discharge failures. Further, the printed matter is fixed by steaming (104° C., 10 min.) process, then, it is washed with neutral detergent and dried, thereafter, blurredness is evaluated. Furthermore, the head orifice surface after printing is observed. FIG. 45 shows results from these examinations. In FIG. 45, the printings using inks of different viscosities are shown as examples 1 to 6 and comparison examples 1 to 4.

*1 Average length of discharge failures: $\Sigma l/n$ (cm)

l: discharge failure length n: number of discharge failures

*2 Evaluation of irregularity in straight edge of solid-printed image by observation with naked eye o: No irregularity Δ: some irregularities found x: many irregularities found

*3 Evaluation of discharging and head orifice surface o: no ink droplets adhered Δ: ink droplets adhered, but no problem in discharging x: ink droplets adhered to the orifice surface, discharging is difficult Full-color printing using the inks A to D have provided well-colored printed matter with no blur, by stable ink discharge.

As described above, the inks of this example may be used to attain stable discharge without discharge failure in textile-printing of a long printing length, and obtain printed matter of high-density without blur.

(Others)

The present invention is not limited to the ink-jet printing but applicable to various printing methods. When the ink-jet printing is adopted, a printer having a energy generating means (e.g., an electrothermal converter or a laser light emitter) for ink discharge by thermal energy can perform effective printing, because utilizing this method attains high-density and high-precision printing.

Next, the construction of the ink-jet printing unit 1005 (FIG. 1) of the embodiment will be described below.

Figure 46:
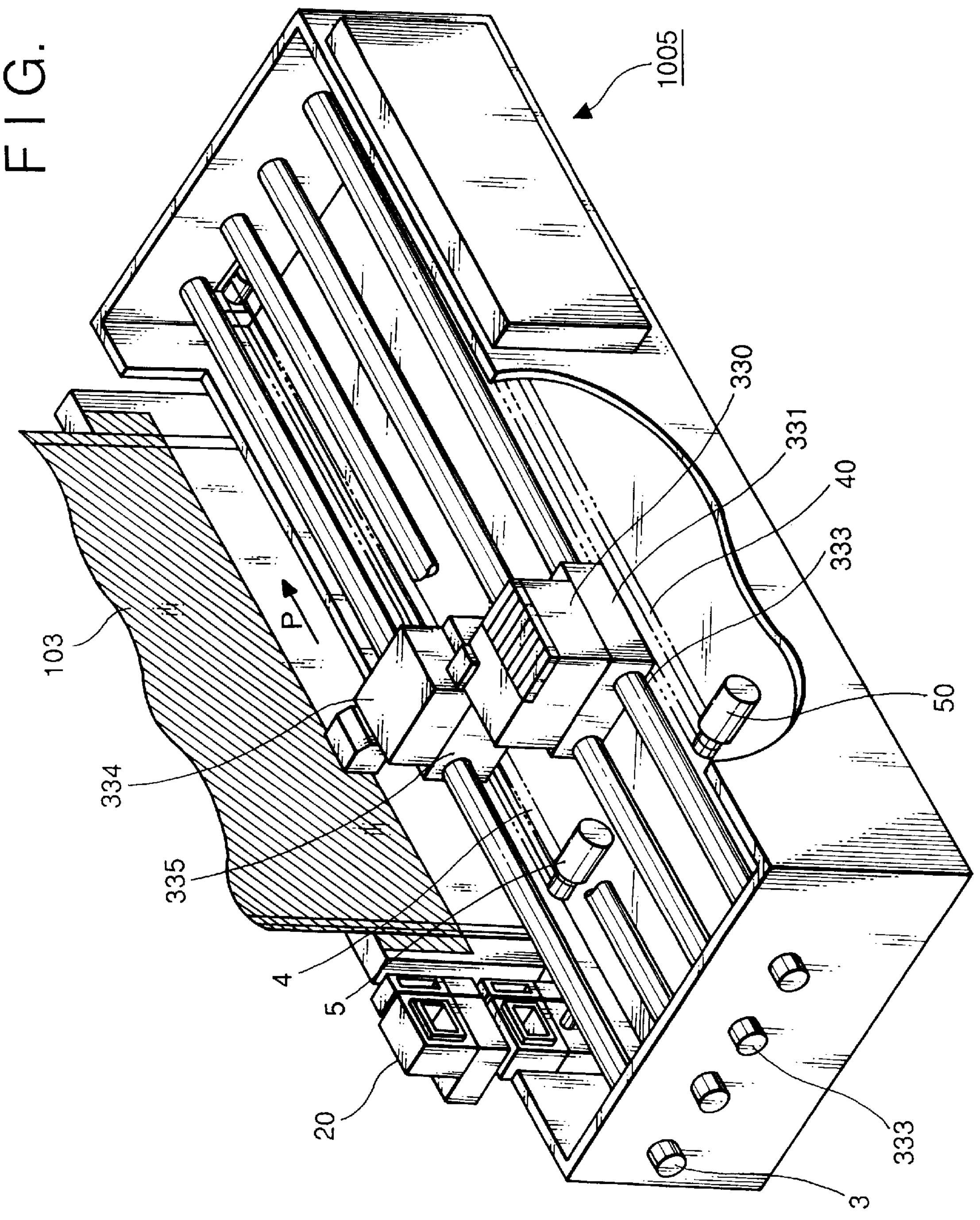
FIG. 46 illustrates a first ink-jet printing unit of the embodiment.

A. Manufacturing Ink-Jet Printing Apparatus of Embodiment and First Ink-Jet Printing Apparatus FIG. 46 shows an example of the construction of the ink-jet printing unit 1005.

The ink-jet printing unit 1005 comprises a main body, a head carriage 334, a head carriage base 335, two head carriage slide rails 3, a head carriage driving system, an ink tank carriage 330, an ink tank carriage base 331, two ink tank carriage slide rails 333, an ink tank carriage driving system and a recovery device 20. The head carriage 334 and the ink tank carriage 330 move respectively along the slide rails 3 and 333 in a main-scanning direction (arrow P direction).

Next, the respective constituents of the ink-jet printing unit 1005 will be described below.

(1) Head carriage 334, head carriage base 335, head carriage slide rails 3 and head carriage driving system As described above, the head carriage 334 is mounted with eight printing heads for discharging ink droplets from a plurality of discharge ports for cyan, magenta, yellow, black inks and four special inks. The head carriage 334 is provided on the head carriage base 335. The head carriage base 335 is slidably supported by the head carriage slide rails 3. The head carriage driving system has an endless main-scanning belt 4 for the head carriage and a main-scanning motor 5 for moving the main-scanning belt 4.

The main-scanning belt 4 holds the head carriage base 335, and the main-scanning motor 5 moves the main-scanning belt 4, thus the head carriage 334 moves in the main-scanning direction.

(2) Ink tank carriage 330, ink tank carriage base 331, ink tank carriage slide rails 333 and ink tank carriage driving system The ink tank carriage 330 is mounted with eight ink tanks for supplying predetermined inks to the respective printing heads. The ink tank carriage 330 is provided on the ink tank carriage base 331, that is slidably supported by two ink tank carriage slide rails 333. The ink tank carriage driving system has an endless main-scanning belt 40 for the ink tank carriage and a main-scanning motor 50 for moving the main-scanning belt 40.

The main-scanning belt 40 is attached to the ink tank carriage base 331, and the main-scanning motor 50 moves the main-scanning belt 40, thus the ink tank carriage 330 moves in the main-scanning direction in synchronization with the head carriage 334.

Next, the advantageous point in the movement of the head carriage 334 and the ink tank carriage 330 along the respective slide rails in the main-scanning direction, as the feature of the ink-jet printing unit 1005, will be described with reference to FIGS. 47A to 47C.

Figure 47A:
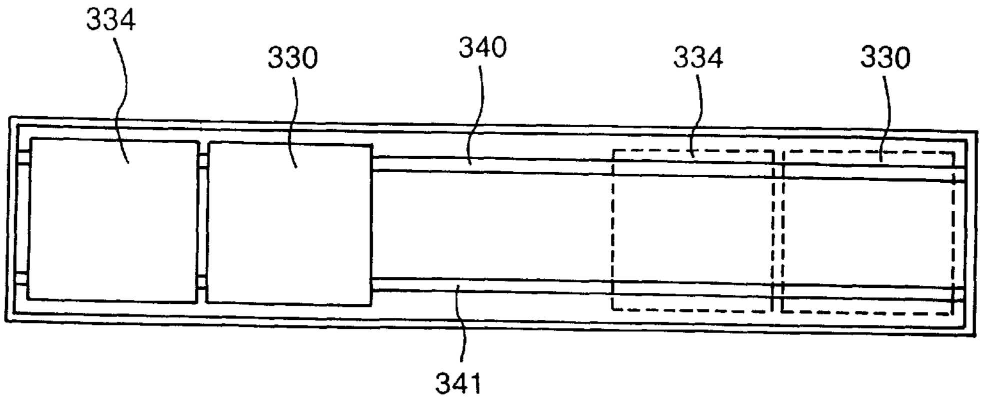
FIGS. 47A to 47C illustrate the advantages of the first ink-jet printing unit in FIG. 46.
Figure 47B:
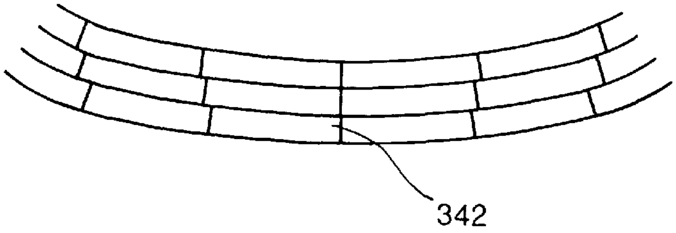

As shown in FIG. 47A, upon designing the ink-jet printing unit 1005, the present inventors first considered the moving of the head carriage 334 and the ink tank carriage 330 along the same two slide rails 340, 341 in the main-scanning direction (direction represented by an arrow). However, to realize an ink-jet printing apparatus capable of continuously printing on a printing medium having a printing width of one meter or longer for hours, the sum of the weight of the head carriage 334 and the ink tank carriage 330 is several to tens kg, which causes the following problems:

(1) If the diameters of the slide rails 340 and 341 are small, when the head carriage 334 and the ink tank carriage 330 move to the central portion in the main-scanning direction, the slide rails 340 and 341 are deflected due to the weight of the head carriage and the ink tank carriage. As a result, as shown in FIG. 47B, as the carriages move from the central portion to the end portion, a pixel 342 is shifted by each scanning (line) in the vertical direction. This degrades image quality. To prevent this deterioration of image quality, e.g., in a case where the main-scanning width for the pixel 342 is 60 $\mu$m, 100 $\phi$ slide rails 340 and 341 of about 240 kg are required to maintain the maximum shift amount of the pixel 342 per each scanning 30 $\mu$m or less.

(2) The ink tank carriage 330 vibrates by movement of the ink surface due to consumption of ink within the respective ink tanks. As a result, the vibration of the ink tank carriage 330 is transmitted to the head carriage 334 via the slide rails 340 and 341, and printing quality is degraded.

(3) To move the head carriage 334 and the ink tank carriage 330 along the slide rails 340 and 341 in the main-scanning direction, the head carriage 334 and the ink tank carriage 330 must be arranged in a line as shown in FIG. 47A. As a result, the width of the ink-jet printer main body must be the width of the ink tank carriage 330 to the main-scanning direction. This results in a larger apparatus.

On the other hand, the ink-jet printing unit 1005 shown in FIGS. 46 and 47C, where the head carriage 334 and the ink tank carriage 330 move along the respective slide rails in the main-scanning direction, has advantages as follows:

(1) The weight acting upon the head carriage slide rails 3 and the ink tank slide rails 333 can be lessened, therefore, the diameters of the slide rails 3, 333 can be reduced. This achieves reduction of weight of the slide rails (70 kg in general designing).

(2) Though the ink tank carriage 330 vibrates by the movement of the ink surface due to ink consumption within the respective ink tanks, the vibration can be prevented from being transmitted to the head carriage 334.

Figure 47C:
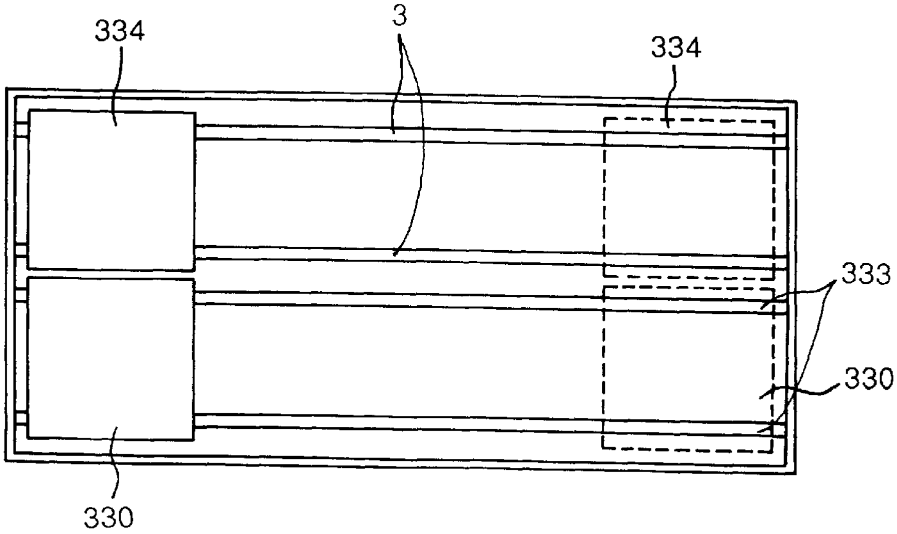

(3) As shown in FIG. 47C, arranging the head carriage 334 and the ink tank carriage 330 lengthwise and moving the head carriage 334 and the ink tank carriage 330 in the main-scanning direction can reduce the width of the ink-jet printing unit 1005 main body to a minimum width.

In the above explanation, the ink-jet printing unit 1005 has the ink tank carriage driving system, however, the ink tank carriage driving system may be omitted. In this case, the ink tank carriage base 331 may be connected to the head carriage base 335 to move the ink tank carriage base 331 with the movement of the head carriage base 335. However, as shown in FIG. 47C, in a case where the head carriage 334 and the ink tank carriage 330 are arranged in a line to move the head carriage 334 and the ink tank carriage 330 in the main-scanning direction, upon exchanging the head carriage 334, the ink tank carriage driving system as the present embodiment drives only the ink tank carriage 330 so that the head carriage 334 can be removed from the ink tank carriage 330 side, thus improving operator convenience.

Figure 48:
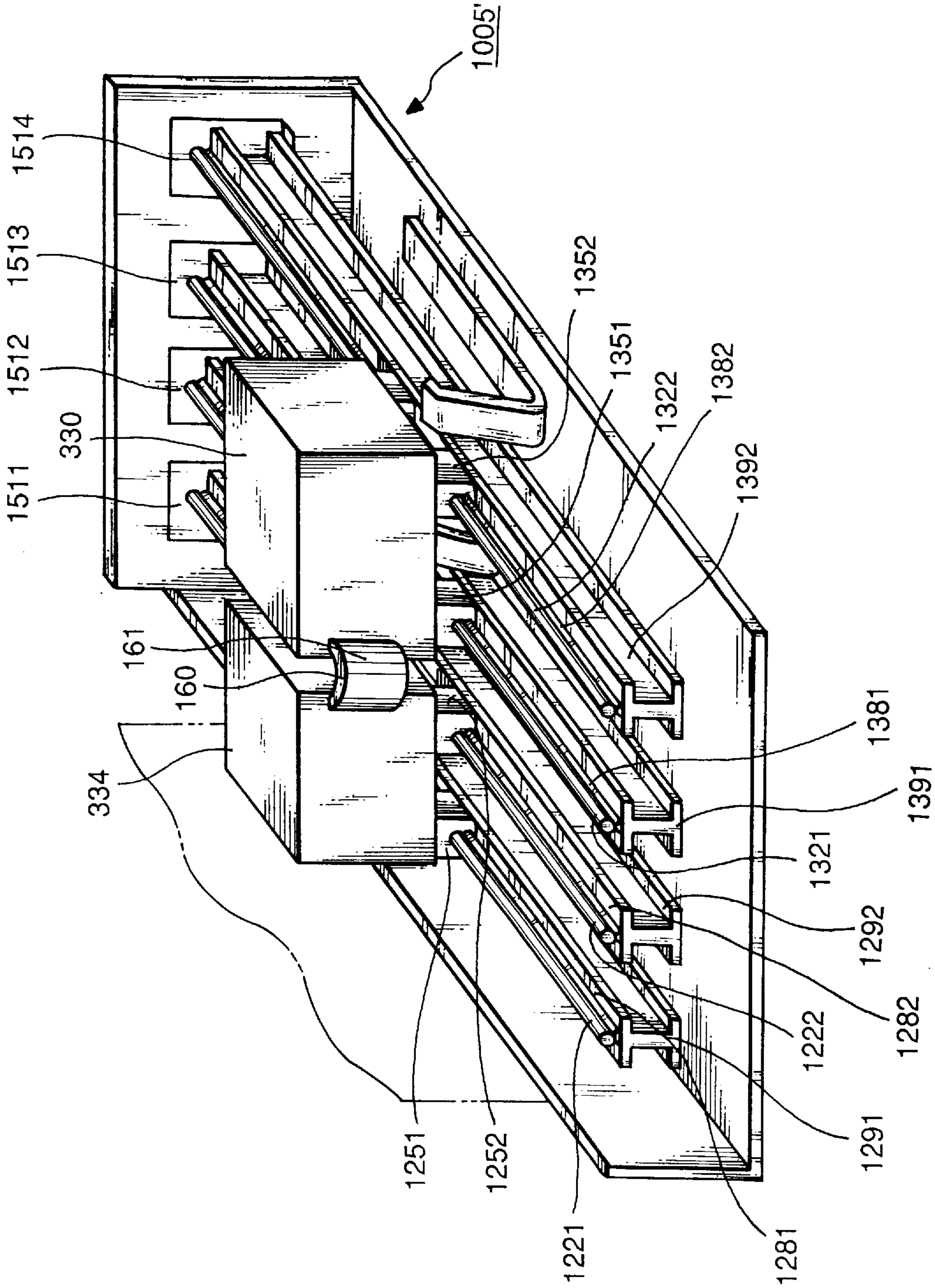
FIG. 48 is a schematic perspective view showing the construction of a second ink-jet printing unit of the embodiment.

B. Manufacturing Ink-Jet Printing Apparatus of Embodiment and Second Ink-Jet Printing Apparatus FIG. 48 schematically shows an example of the construction of a second ink-jet printing apparatus according to the present embodiment.

An ink-jet printing unit 1005' has a main body, the head carriage 334, two head carriage slide rails 1221, 1222, a head carriage driving system (not shown), the ink tank carriage driving system (not shown) and a recovery system (not shown). Similar to the ink-jet printing unit 1005 in FIG. 46, the head carriage 334 and the ink tank carriage 330 move along the respective slide rails in the main-scanning direction.

Difference is that the printing unit 1005' comprises first I-steels (I-bars) 1291 and 1292 on which first supports 1281 and 1282 are respectively fixed and second I-steels 1391 and 1392 on which second supports 1381 and 1382 are fixed, and that the head carriage 334 is slidably supported by the head carriage slide rails 1221 and 1222 via four head carriage slide bushes 1251 to 1254 (only two slide bushes 1251 and 1252 are shown) and the ink tank carriage 330 is slidably supported by the ink tank carriage slide rails 1321 and 1322 via four ink tank carriage slide bushes 1351 to 1354 (only two slide bushes 1351 and 1352 are shown). The first I-steels 1281 and 1282 and the second I-steels 1381 and 1382 are respectively fixed at their both ends to a support member (not shown) attached to windows 1511 to 1514 and 1521 to 1524 (not shown) on both side surfaces of the main body.

Though not shown in FIG. 46, an ink tube 160 and electric cables 162 (see FIG. 48) are provided between the head carriage 334 and the ink tank carriage 330.

Figure 49A:
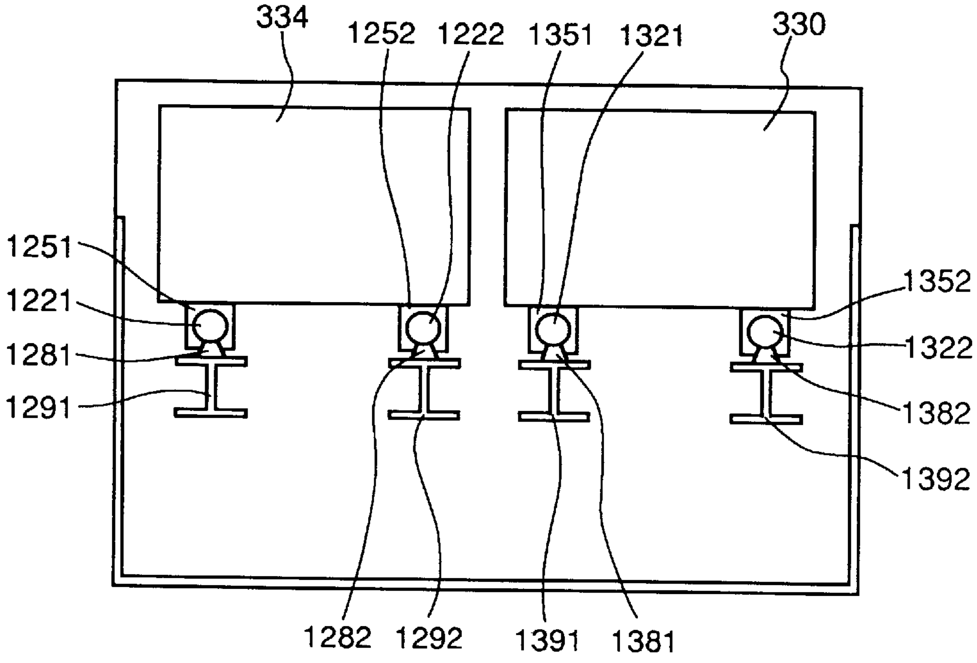
FIGS. 49A and 49B illustrate the advantages of the second ink-jet printing unit in FIG. 48.

As shown in FIG. 49A, in the ink-jet printing unit 1005', the head carriage slide rails 1221 and 1222 are fixed to the first support 1281 and 1282, and the ink tank carriage slide rails 1321 and 1322 are fixed to the second support 1381 and 1382. This provides advantages as follows.

Figure 49B:
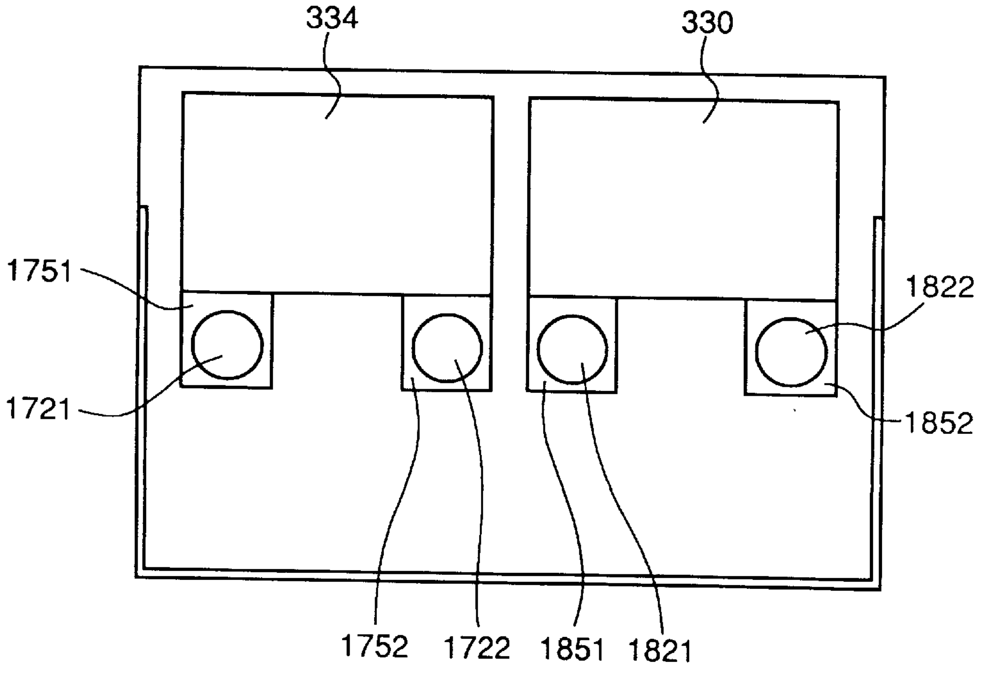

As shown in FIG. 49B, similar to the ink-jet printing unit 1005 in FIG. 46, as the head carriage 334 and the ink tank carriage 330 are slidably supported by respective slide rails 1721 and 1722, 1821 and 1822, the weight of the slide rails can be reduced and the vibration of the ink tank carriage 330 can be prevented from being transmitted to the head carriage 334. It should be noted that the diameters of the slide rails 1721 and 1722, 1821 and 1822 must correspond to a size large enough not to cause image quality problems by the deflection of the rails due to the weight of the head carriage 334 and the ink tank carriage 330. Further, the four slide bushes 1751 to 1754 (only two slide bushes 1751 and 1752 are shown) provided to the head carriage 334 and the four slide bushes 1851 to 1854 (only two slide bushes 1851 and 1852 are shown) must have a size corresponding to the diameters of the slide rails 1721 and 1722, 1821 and 1822. For example, in general designing, to render the maximum deflection amount of the slide rail of 3500 mm in length, a slide rail of about 100 $\phi$ is required, and the weight of the slide bush is 10 kg.

The ink-jet printing unit 1005' of the present embodiment can support the head carriage 334 by the first I-steels 1291 and 1292, and can support the ink tank carriage 330 by the second I-steels 1391 and 1392. For this reason, the diameters of the ink tank carriage slide rails can be minimized. As a result, the weight of the head carriage slide rails 1221 and 1222, and 1321 and 1321 and 1322 can be reduced. Further, the ink tank carriage slide bushes 1351 and 1352 can be minimized. For example, in general designing, the slide rails 1221 and 1222, 1321 and 1322 can be slide rails of 20 to 30 ϕ, and the weight of the slide bushes 1251 and 1252, and 1351 and 1352 can be 300 g to 800 g.

Figure 50:
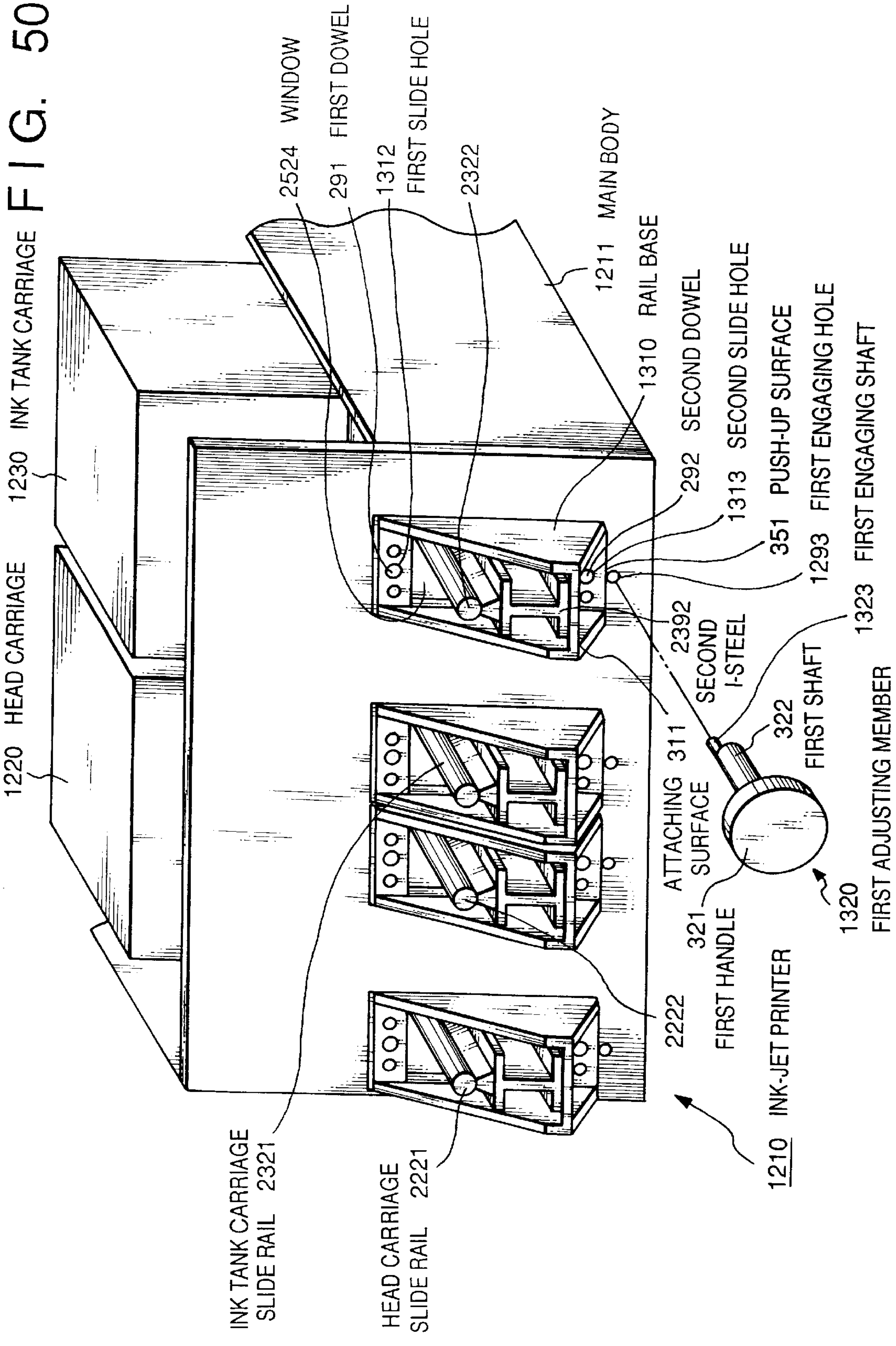
FIG. 50 is a perspective rear view of a third ink-jet printing unit in FIG. 48.

FIG. 50 is a perspective rear view of a third ink-jet printing unit in FIG. 48.

The ink-jet printing unit 1210 comprises an aligning mechanism for head carriage slide rails 2221 and 2222, and an aligning mechanism for ink tank carriage slide rails 2321 and 2322, that differs from the ink-jet printing unit 1005 shown in FIG. 48. The aligning mechanisms have a similar construction with each other, therefore, the construction and the operation of the aligning mechanism for the ink tank carriage slide rail 2322 at the right end of FIG. 50 will be described below.

Figure 51:
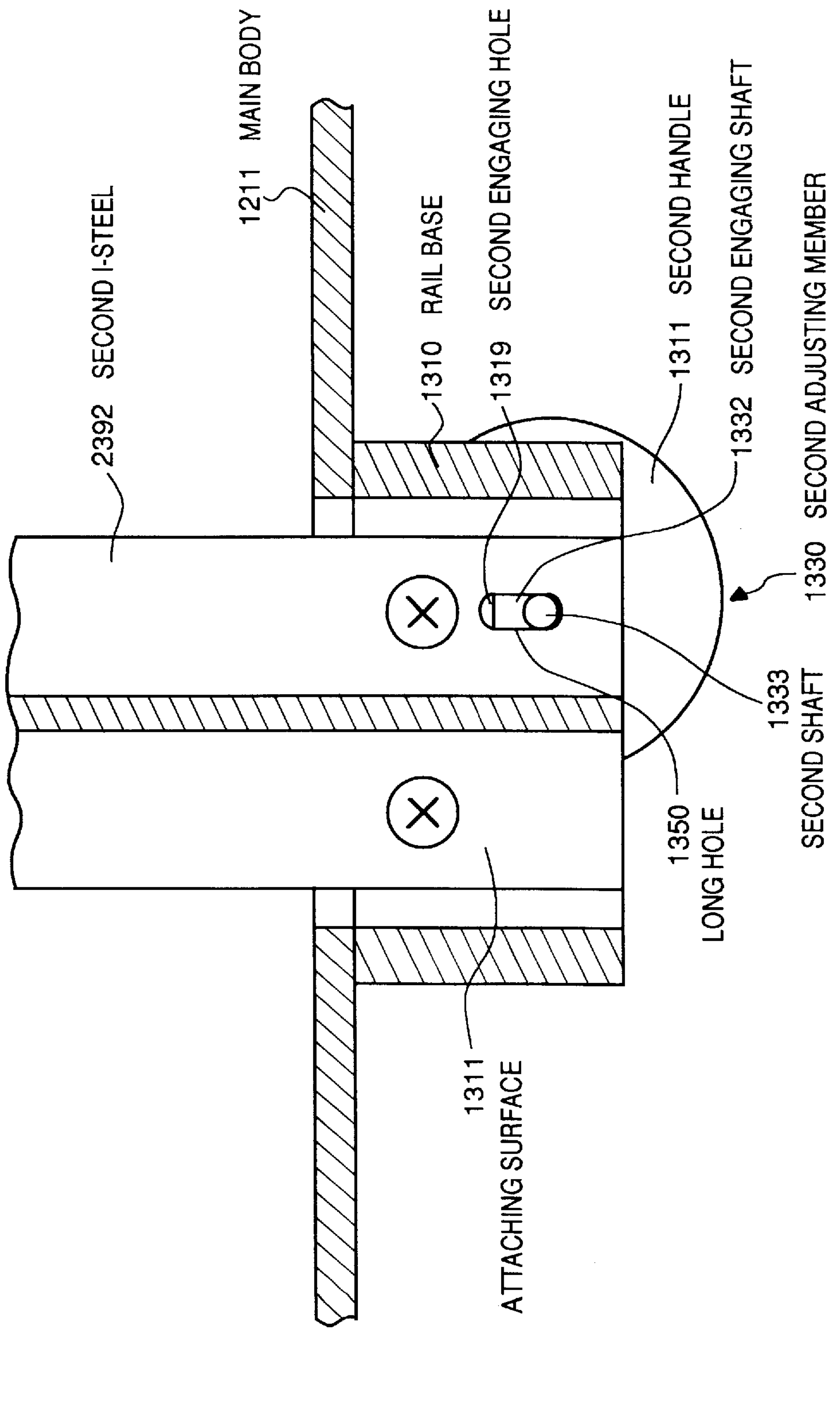
FIG. 51 illustrates alignment of a slide rail for an ink tank carriage in FIG. 50 with respect to a right-to-left direction of the illustration.

The aligning mechanism for the ink tank carriage slide rail 2322 has a rail base 1310, a first adjusting member 1320 and a second adjusting member 1330 (FIG. 51). The rail base 1310 has an attaching surface 1311 on which a second I-steel 2392 is fixed, a first slide hole 1312 in which a first dowel 291, provided at an upper portion of a window 2524 at the side surface of a main body 1211, is inserted, and a second slide hole 1313 in which a second dowel, provided at a lower portion of the window 2524, is inserted. The first adjusting member 1320 has a disk-shaped first handle 321, a first shaft 322 attached coaxially to the first handle 321 at the shaft end portion, and a first engaging shaft 1323 attached to the other end of the first shaft 322, the axis of the shaft 1323 being shifted from the shaft 322 axis. The first engaging shaft 1323 is inserted into the engaging hole 1293 provided at a lower portion of the second dowel 292 on the side surface of the main body 1211. As shown in FIG. 51, the second adjusting member 1330 has a disk-shaped second handle 1331, a second engaging shaft also attached coaxially to the second handle 1331 at the shaft end portion, and a second shaft 1333 attached to the other end portion of the second shaft 1332, the axis of the shaft being shifted from the engaging shaft axis. The second engaging shaft 1332 is inserted into a second engaging hole 1319 provided on the attaching surface 1311 of the rail base 1310, and the second shaft 1333 is inserted into a long hole 1350 provided on the second I-steel 2392.

The alignment of the ink tank carriage slide rail 2322 in the horizontal direction (right-and-left direction of the figure) is made such that the second engaging shaft 1333 is inserted into the second engaging hole 1319, and the second shaft 1333 is inserted into the long hole 1350, then the second handle 1331 is rotated to move the second I-steel 2392 in the horizontal direction. As the, alignment in the horizontal direction is completed, the second I-steel 2392 is fixed to the attaching surface 1311 of the rail base 1310 with two fixing screws. The alignment of the ink tank carriage slide rail 2322 in the vertical direction (up-and-down direction of the figure) is made such that the first engaging shaft 1323 is inserted into the first engaging hole 1293, then the first handle 321 is rotated to move a push-up surface 351 of the rail base 1310 in contact with the first shaft 322 upward and downward. As the alignment in the vertical direction is completed, the rail base 1310 is fixed on the side surface of the main body 1211 with four fixing screws. It should be noted that the aligning mechanism for the ink tank carriage slide rail 2322 is also provided on the other side surface of the main body 1211.

Thus, the alignment of the two head carriage slide rails 2221 and 2222, and the alignment of the other ink tank carriage slide rail 2321 may be performed in a similar manner to the above-mentioned alignment of the ink tank carriage slide rail 2322, thus, parallelism and horizontality of the slide rails 2221 and 2222, and 2321 and 2322 can be ensured.

C. Third Ink-Jet Printing Unit and Manufacturing Third Ink-Jet-Printed Matter

Figure 52:
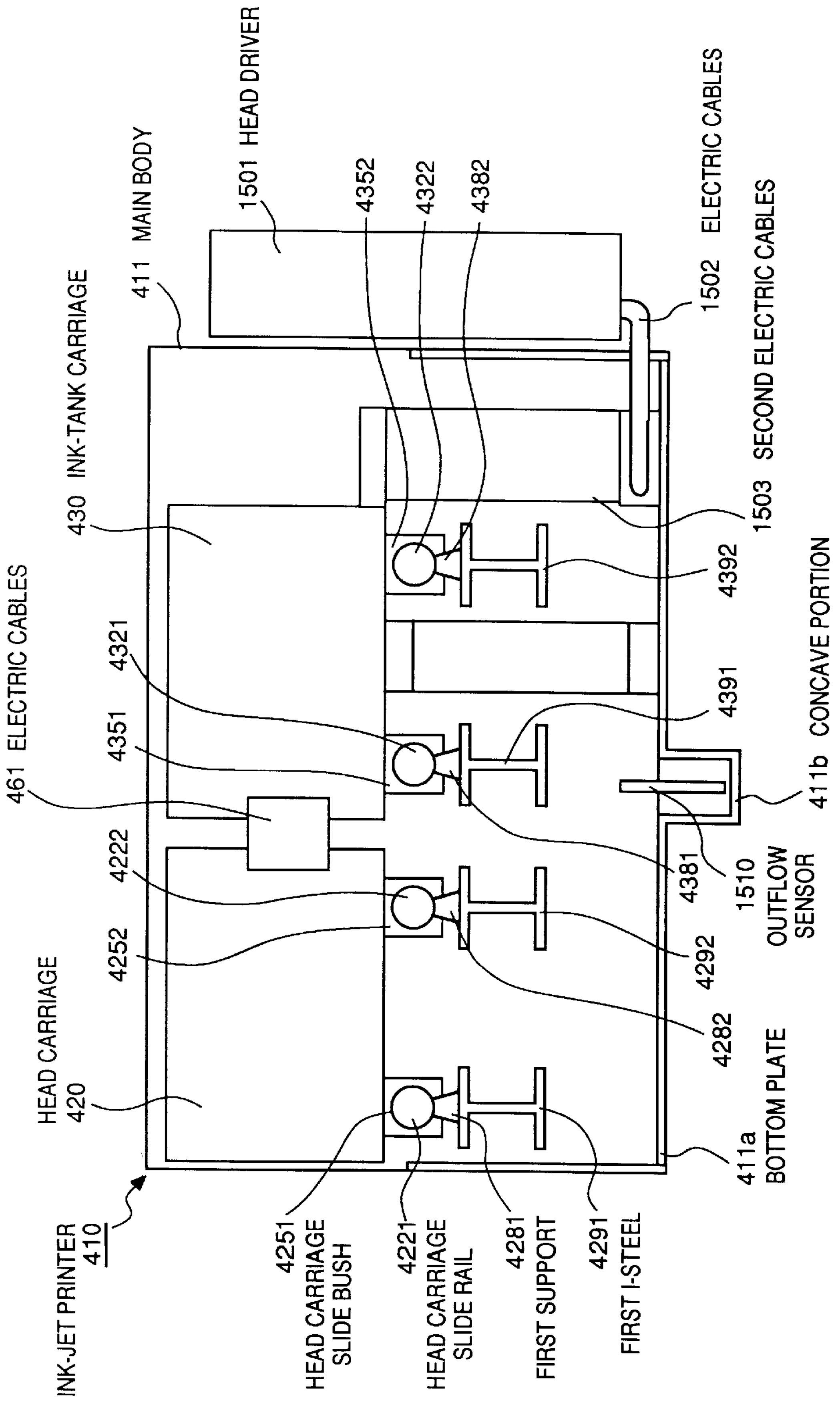
FIG. 52 schematically illustrates the construction of a third ink-jet printing unit of the embodiment.

FIG. 52 shows an example of a third ink-jet printing unit according to the present embodiment.

An ink-jet printing unit 410 comprises a main body 411, a head carriage 420, two head carriage slide rails 4221 and 4222, a head carriage driving system (not shown), an ink tank carriage 430, two ink tank carriage slide rails 4321 and 4322, an ink tank carriage driving system (not shown) and a recovery device (not shown). Similar to the ink-jet printing unit 1005' in FIG. 48, the head carriage 420 and the ink tank carriage 430 move along the respective slide rails in the main-scanning direction, first I-steels 4291 and 4292 are fixed to first supports 4281 and 4282, and second I-steels 4391 and 4392 are fixed to second supports 4381 and 4382, further, the head carriage 420 is slidably supported by the head carriage slide rails 4221 and 4222 via four head carriage slide bushes 4251 to 4254 (only two ink tank carriage slide bushes 4251 and 4252 are shown) and the ink tank carriage 430 is slidably supported by the ink tank carriage slide rails 4321 and 4322 via four ink tank carriage slide bushes 4351 to 4354 (only two ink tank carriage slide bushes 4351 and 4352 are shown).

A difference is that the ink-jet printing unit 410 comprises a concave portion **411*b* on a bottom plate 411*a* of the main body 411, and an outflow sensor 1510 within the concave portion 411*b*. Further, the ink-jet printing unit 410 has electric devices such as a head driver 1501, a head carriage driver, an ink tank carriage driver and a power source (not shown) outside of the main body 411. Note that electrical connection between the printing head of the head carriage 420 and the head driver 1501 is made via first electric cables 1502, second electric cables 1503 and electric cables 461**.

The ink-jet printing unit 410 having the above construction provides the following advantages:

(1) When the ink within the ink tank mounted on the ink tank carriage 430 is low, an external main tank supplies the ink. At this time, ink leakage within the main body 411 might happen. If the various electric devices are provided in the main body, conceivable trouble is that electric short circuit breaks the electric devices. For this reason, the electric devices require a short-circuit prevention mechanism. However, the ink-jet printing unit 410, that performs printing on a printing medium having a printing width of one meter or longer, different from small-sized apparatuses such as a word processor, does not always require the electric devices to be inside of the main body. Accordingly, arranging the electric devices outside of the main body can solve the above problem.

(2) If an operator is not aware of ink leakage within the main body 411, the main body 411 is contaminated, and the operation of the ink-jet printing unit 410 must be stopped while the inside of the main body is cleaned. In a case where the ink-jet printing unit 410 is employed for long-period of operation, this lowers producibility. As the ink-jet printing unit has the concave portion **411*b* on the bottom plate 411*a* of the main body 411, and the outflow sensor 1510 within the concave portion 411*b*, the ink leakage can be found at an early stage and the contamination of the main body 411** can be made a minimum. Thus, the degradation of producibility can be prevented.

D. Fourth Ink-Jet Printing Unit and Manufacturing of Fourth Ink-Jet Printed Matter FIG. 53 shows the construction of a fourth ink-jet printing unit according to the present embodiment.

The fourth ink-jet printing unit of this example has two printing heads. As described above, one of the objects of the ink-jet printing unit, that performs printing on a printing medium having a printing width of one meter or longer for hours, is to improve image forming speed. Accordingly, the ink-jet printing unit of this example has two printing heads to improve image forming speed.

Figure 53:
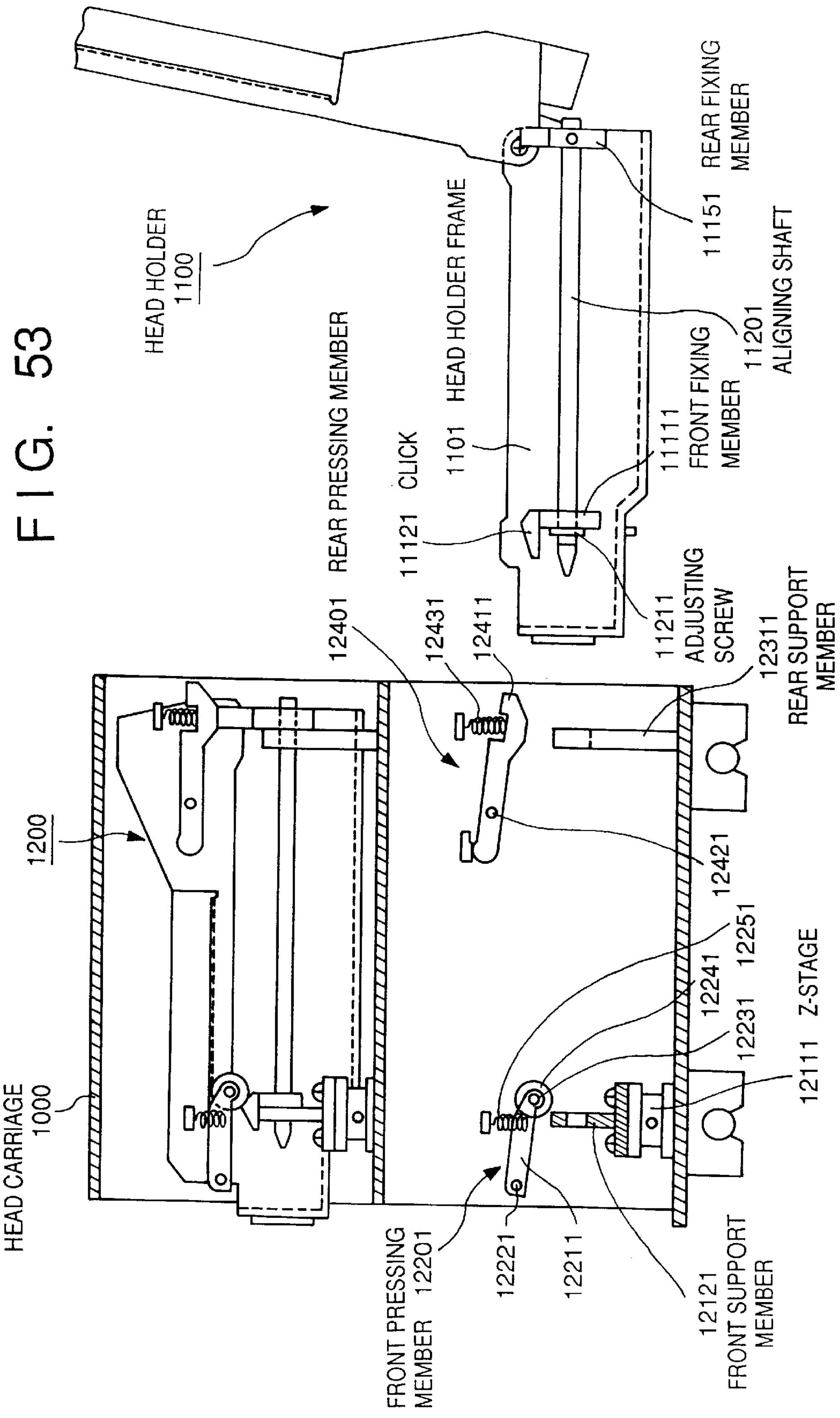
FIG. 53 is a schematic cross-sectional view of upper and lower heads at a fourth ink-jet printing unit of the embodiment.

In FIG. 53, a head carriage 1000 is separated into upper and lower parts, and head holders 1100 and 1200 respectively having a printing head are provided in the upper and lower parts. At this time, the head holders 1100 and 1200 are mounted and aligned as follows.

The head holder 1100 has two front fixing members 11111 and 11112 (only fixing member 11111 is shown), two rear fixing members 11151 and 11152 (only fixing member 11151 is shown), and two aligning shafts 11201 and 11202 (only aligning shaft 11201 is shown).

Figure 54:
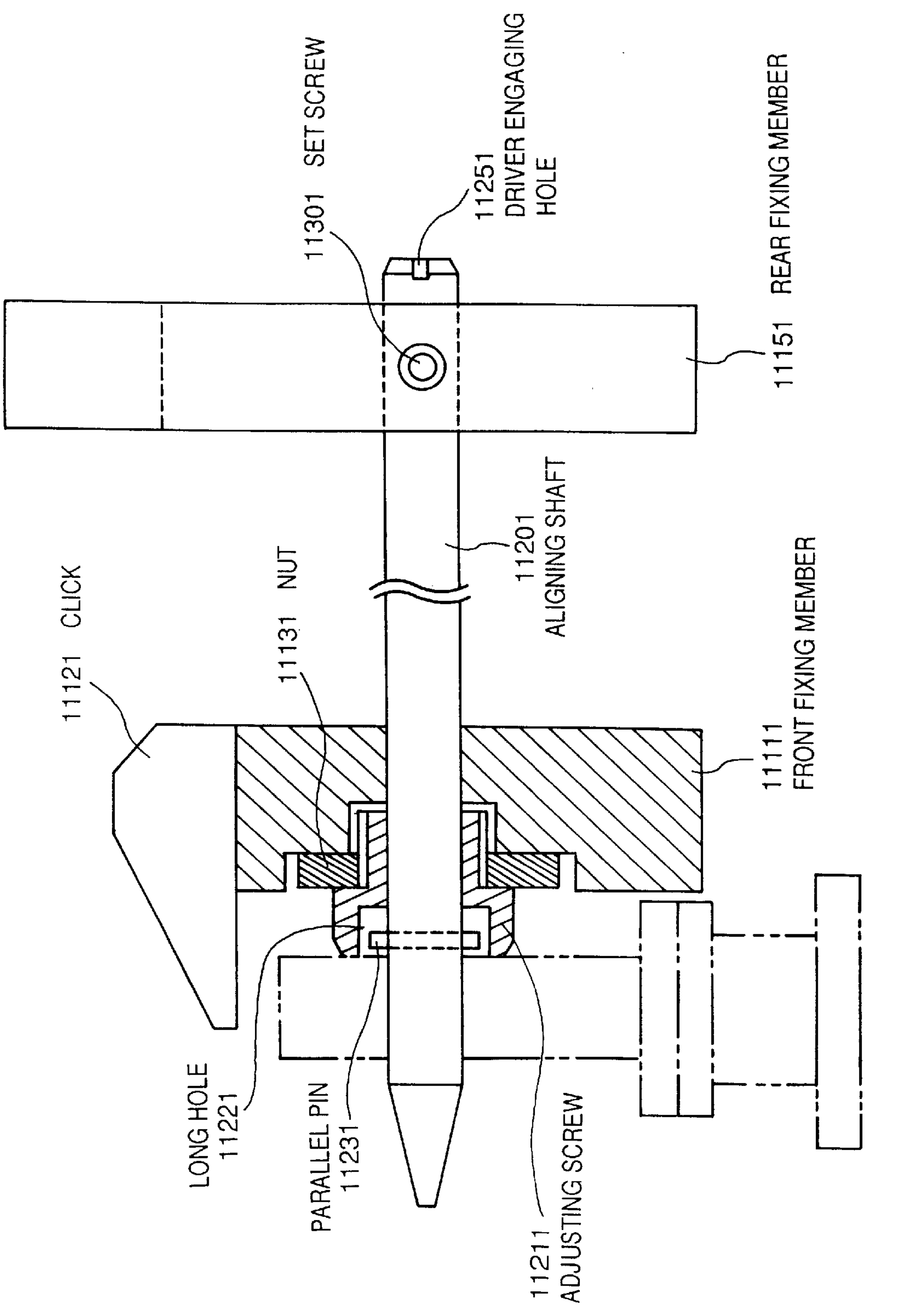
FIGS. 54 to 57 are schematic cross-sectional views of a head holder in FIG. 53 respectively for explaining mounting and alignment of the head holder.

The front fixing member 11111 is attached to the side surface of a head holder frame 1101 of the head holder 1100 on the printing head side (left side in FIG. 53). A click 11121 is provided above the front fixing member 11111. As shown in FIG. 54, the side surface of the front fixing member 11111 on the printing head side has upper and lower concave portions and through holes. The upper concave portion holds a nut 11131 in order to prevent the nut from looseness. This avoids influence of the eccentricity of an adjusting screw 11211 (described later) occurring upon fixing the nut 11131 to the front fixing member 11111, and the center of the nut 11131 and the center of the aligning shaft 11201 coincide, thus improving aligning precision. The fixing member 11112 has the same construction.

Figure 55:
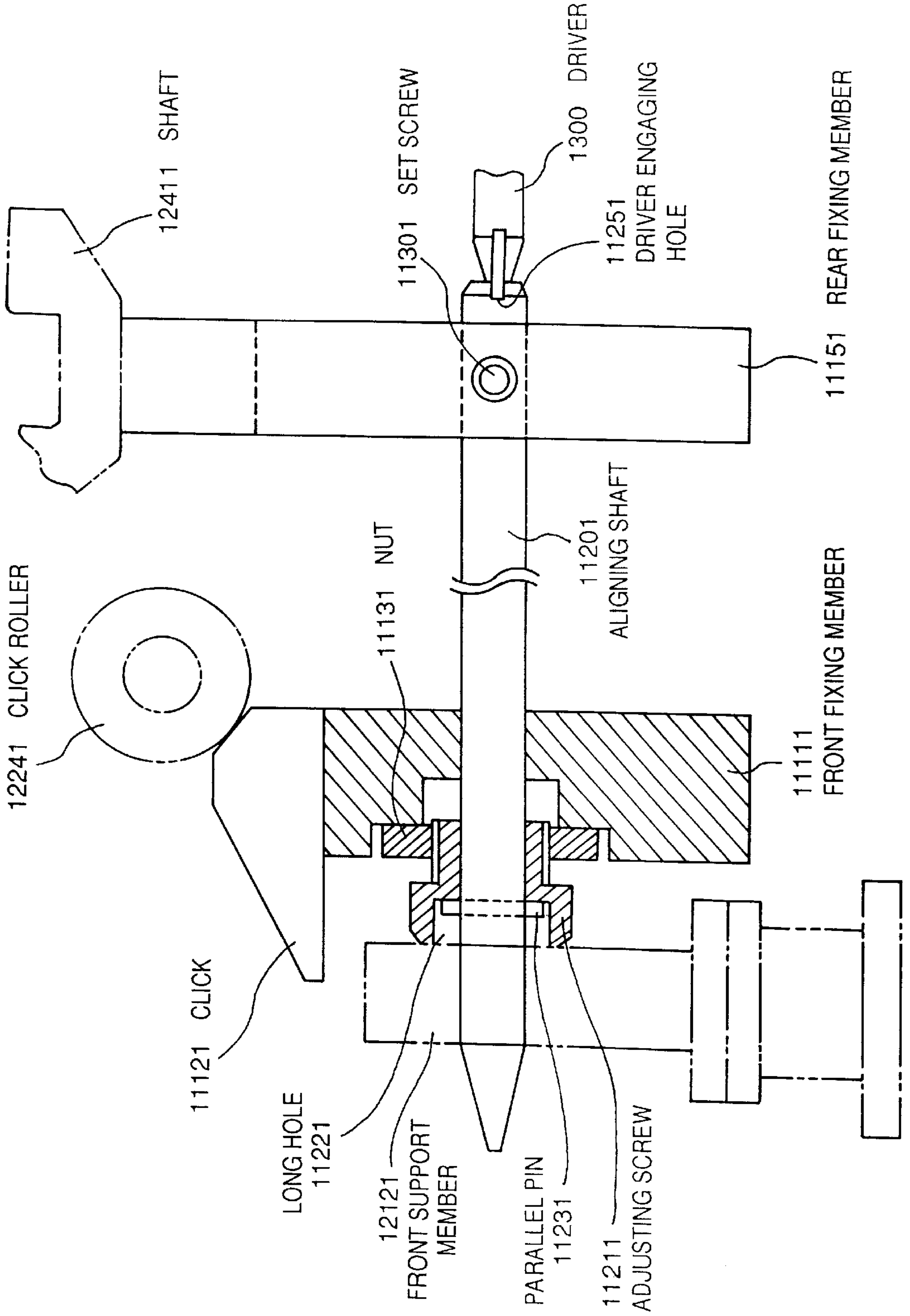
Figure 56:
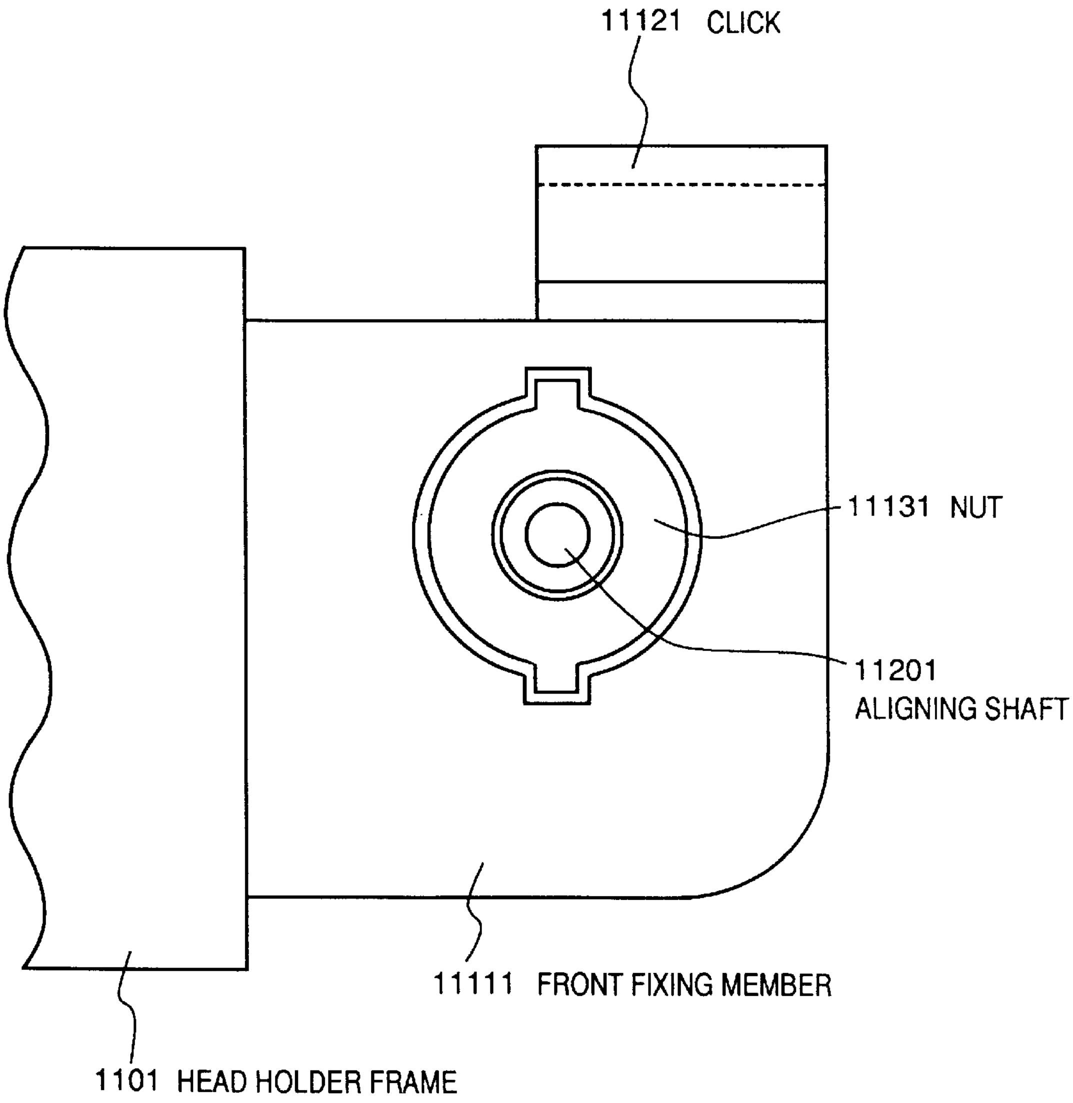

The rear fixing member 11151 is attached to the side surface of the head holder frame 1101 on the side opposite to the printing head side (right side in FIG. 53). As shown in FIG. 55, the rear fixing member 11151 has a through hole and a set screw 11301. The fixing member 11152 has the same construction.

The aligning shaft 11201 has a driver engaging hole 11251 on the end surface on the side opposite to the printing head. An adjusting screw 11211, having a long hole 11221 on the printing head side, is attached around the aligning shaft 11201. The adjusting screw 11211 screw-engages with the nut 11131. The aligning shaft 11201 has a parallel pin 11231 on the printing head side between the shaft end portion and the adjusting screw 11211. The end portion of the aligning shaft 11201 opposite to the printing head side is inserted through the through hole of the front fixing member 11111 and the through hole of the rear fixing member 11151, and the adjusting screw 11211 is rotated to screw-engage with the nut 11131, thus the aligning shaft 11201 is attached to the front fixing member 11111 and the rear fixing member 11151. The aligning shaft 1202 is attached to the fixing members in the same manner.

As shown in FIG. 53, the head carriage 1000 has two Z-stages 12111 and 12112 (only Z-stage 12111 is shown), two front support members 12121 and 12122 (only front support member 12121 is shown), two front pressing members 12201 and 12202 (only front pressing member 12201 is shown), two rear support members 12311 and 12312 (only rear support member 12311 is shown) and two rear pressing members 12401 and 12402 (only rear pressing member 12401 is shown).

The Z-stages 12111 and 12112 are provided in the head carriage 1000 on the printing surface side (left side in FIG. 53) parallel to the printing surface. The front supporting members 12121 and 12122, fixed with a fixing screw, respectively have a through hole.

The front pressing member 12201 is provided at upper portion of the front support member 12121. The front pressing member 12201 has a shaft 12211 supported by a support 12221 at around one end on the printing surface side, a click roller 12241 provided at the other end of the shaft 12211 via a roller shaft 12231 and a pressurizing spring 12251 biasing the other end side of the shaft 12211 downward. The front pressing member 12202 has the same construction.

The respective rear support members 12311 and 12312 (only rear support member 12311 is shown) are provided in the head carriage 1000 on the side opposite to the printing surface side (right side in FIG. 53) parallel to the printing surface. The rear support members 12311 and 12312 respectively have a concave portion.

The rear pressing member 12401 (FIG. 53) is provided at an upper portion of the rear support member 12311. The rear pressing member 12401 has a shaft 12411 supported by a support 12421 at a portion shifted from the shaft center to the printing surface, and a pressurizing spring 12431 biasing the other end side of the shaft 12411 downward. Note that the upward movement of the opposite end of the rear pressing member 12401 is limited. The rear pressing member 12402 has the same construction.

The head holder 1100 is mounted on the head carriage 1000 such that the end portions of the aligning shafts 11201 and 11202 on the printing surface side are inserted into the through holes of the front support members 12121 and 12122, and the other ends of the shafts 11201 and 11202 are placed in the concave portions of the rear support members 12311 and 12312. Note that in a state where the head holder 1100 is mounted on the head carriage 1000, as shown in FIG. 55, the click roller 12241 of the front pressing member 12202 presses the click 11121 left-downward, while the shaft 12411 of the rear pressing member 12401 presses the upper surface of the front fixing member 11151 downward. In this manner, the head holder 11000 is fixed to the head carriage 1000.

The alignment of the head holder 1100 in the horizontal direction (right-and-left direction in FIG. 53) is made such that the distal end of a driver 1300 is fitted into the driver engaging hole 11251 of the aligning shaft 11201, the aligning shaft 11201 is rotated by the driver 1300 to rotate the adjusting screw 11211. When the aligning shaft 11201 is rotated in a direction to separate the front fixing member 11111 and the front support member 112121 away from each other, the distal-end surface of the adjusting screw 11211 on the long hole side abuts against the front support member 12121, thereafter, the head holder 1100 moves with the front fixing member 11111, the rear fixing member 11151 and the aligning shaft 11201, in a direction (right direction in FIG. 55) to be away from the front support member 12121. On the other hand, when the aligning shaft 11201 is rotated in the opposite direction by the driver 1300, the head holder 1100 moves with the front fixing member 11111, the rear fixing member 11151 and the aligning shaft 1201, in a direction (left direction in FIG. 55) to be closer to the front support member 12121.

In this manner, the head holder 1100 is aligned in the horizontal direction (in FIG. 53), and the set screw 11301 is tightened to prevent rotation of the aligning shaft 12201.

Figure 57:
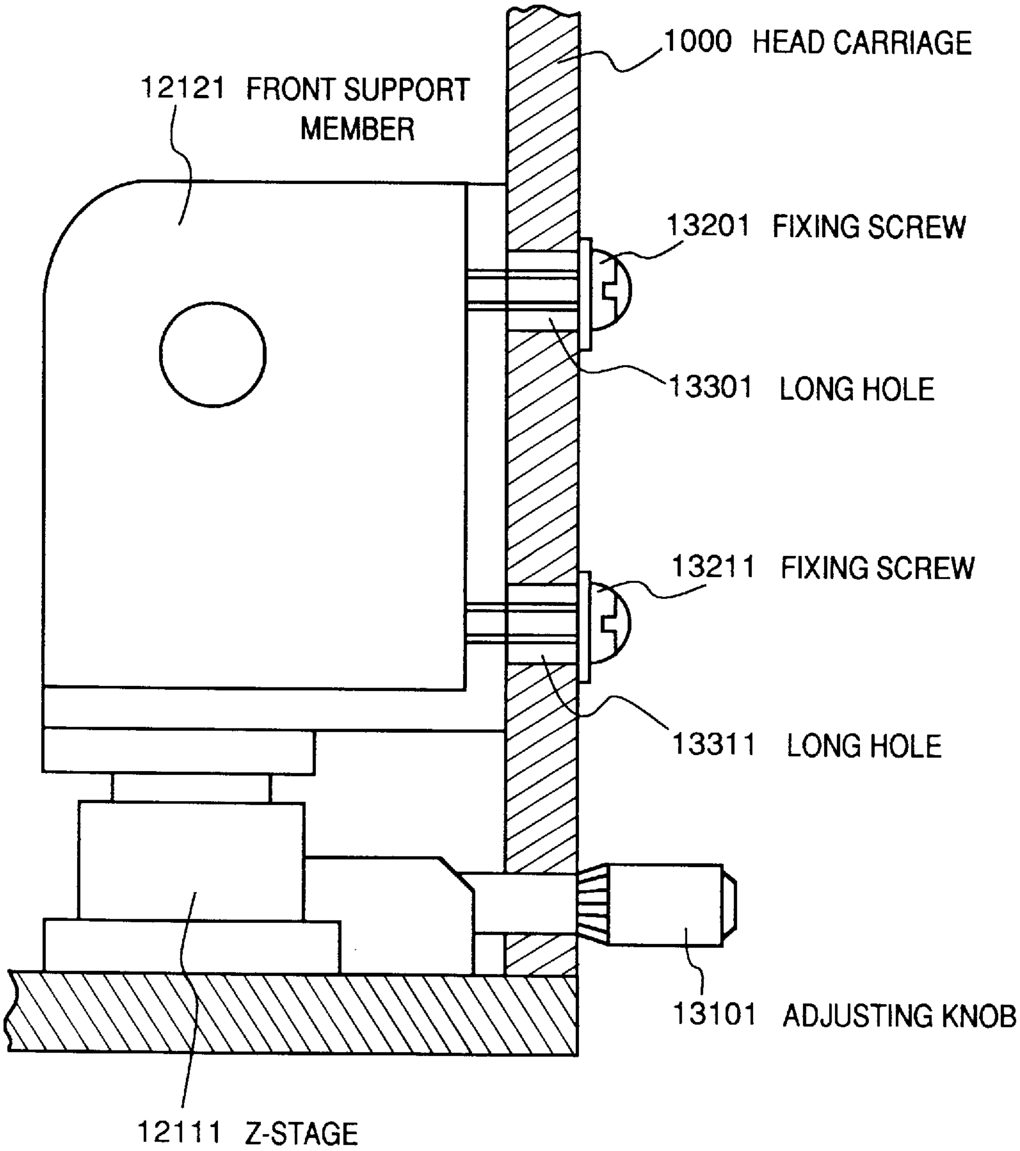

As shown in FIG. 57, the alignment of the head holder 1100 in the vertical direction (up-and-down direction in FIG. 53) is made such that the adjusting knob 13101 of the Z-stage 12111 is rotated to move the front support member 1221 in the vertical direction. Thereafter, fixing screws 13201 and 13211 are tightened to fix the front support member 12121 via the long holes 13301 and 13311.

In the above description, the number of the printing heads is two, however, the present invention is not limited to this number of printing heads.

E. Fifth Ink-Jet Printing Unit and Exchanging Head Holder of the Ink-Jet Printing Unit FIG. 58 shows an example of the construction of a fifth ink-jet printing unit according to the present embodiment.

An ink-jet printing unit 2010 moves the head carriage 334 and the ink tank carriage 330 arranged lengthways as shown in FIG. 47C in the main-scanning direction, and performs printing using a head holder mounted with printing heads set in a head carriage as shown in FIG. 53. In the printing unit 2010, setting of the head holder is from the ink tank carriage side, to improve operator convenience.

Figure 58:
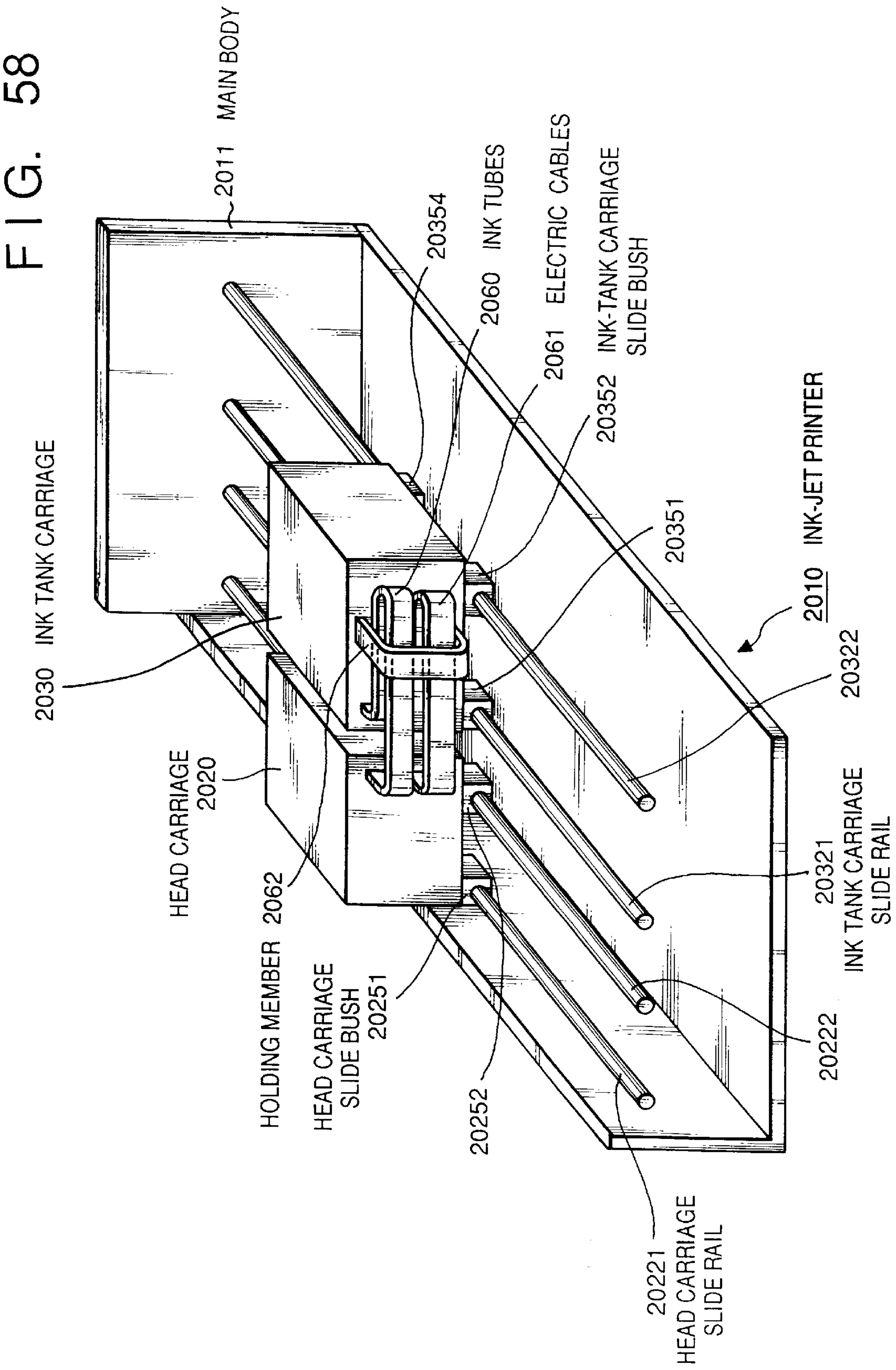
FIG. 58 is a schematic perspective view of a fifth ink-jet printing unit of the embodiment.
Figure 59:
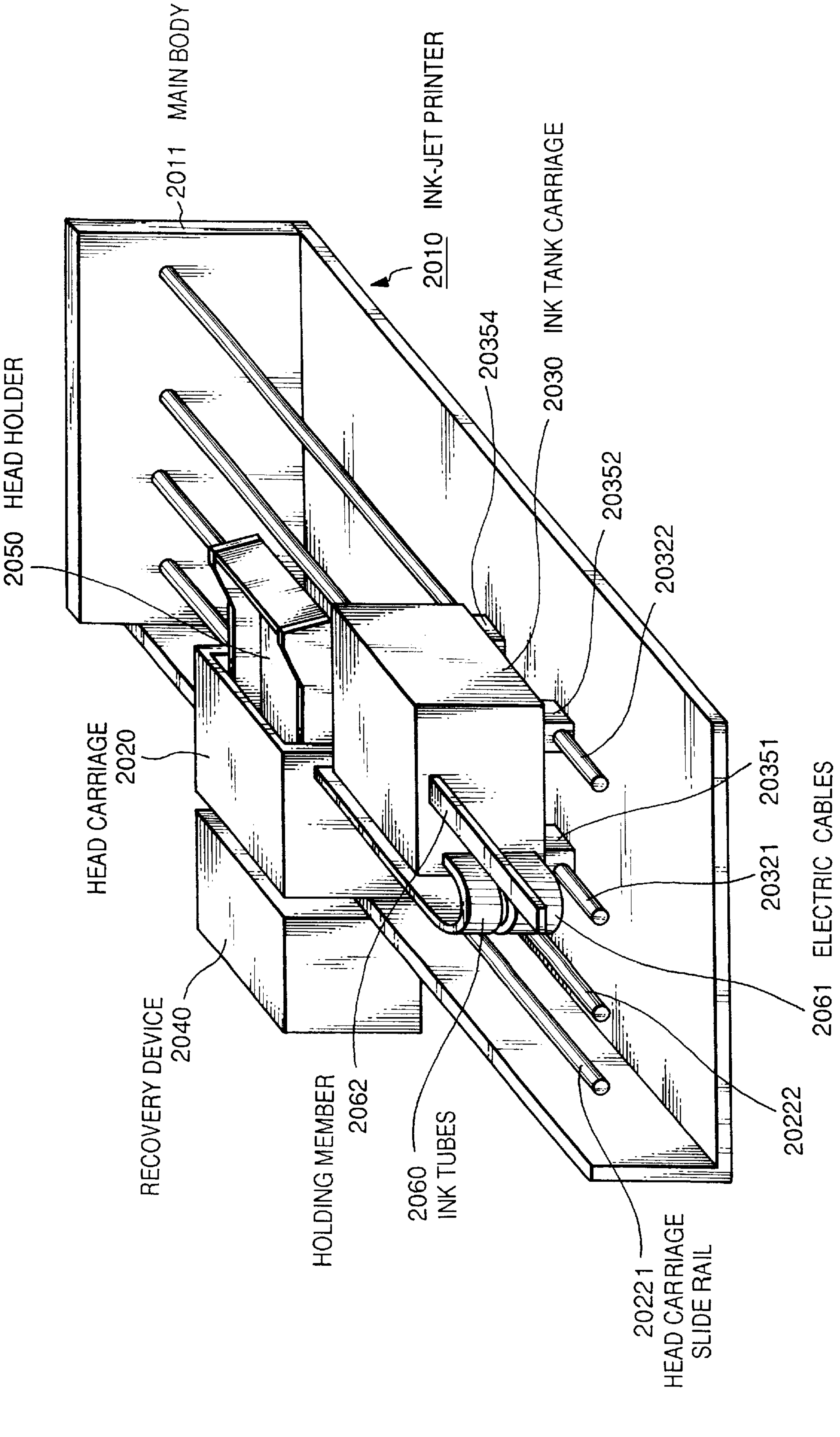
FIG. 59 is a schematic perspective view for explaining the motion of the ink-jet printing unit in FIG. 58 when the head holder is exchanged.

As shown in FIG. 58, the ink-jet printing unit 2010 comprises a main body 2011, a head carriage 2020 in which a head holder 2050 (FIG. 59) is set, two head carriage slide rails 20221 and 20222, a head carriage driver (not shown) and a recovery device (FIG. 59). The head carriage 2020 and the ink tank carriage 2030 move along the respective slide rails in the main-scanning direction. The head carriage 2020 is slidably supported by the head carriage slide rails 20221 and 20222 via four head carriage slide bushes 20251 to 20254 (only two head carriage slide bushes 20251 and 20252 are shown), and the ink tank carriage 2030 is slidably supported by the ink tank carriage slide rails 20321 and 20322 via four ink tank carriage slide bushes 20351 to 20354 (only three ink tank carriage slide bushes 20351, 20352 and 20353 are shown).

The ink-jet printing unit 2010 comprises ink tubes 2060 and electric cables 2061 between the head carriage 2020 and the ink tank carriage 2030 and a holding member 2062 for holding the ink tubes 2060 and the electric cables 2061. One end of the holding member 2062 can be opened. Note that the lengths of the ink tubes 2060 and the electric cables 2061 are longer than the width of the head carriage 2020 and that of the ink tank carriage 2030 in the main-scanning direction.

As shown in FIG. 58, printing is performed by the movement of the head carriage 2020 and the ink tank carriage 2030 in the main-scanning direction in a state where the ink tubes 2060 and the electric cables 2061 are held by the holding member 2062. This protects the movement of the head carriage 2020 and the ink tank carriage 2030 from disturbance by the ink tubes 3060 and the electric cables 2061.

Upon exchanging the head holder 2050, one end of the holding member 2062 is opened to release the ink tubes 2060 and the electric cables 2061, then only the ink tank carriage 2030 is moved in the main-scanning direction, and the head carriage 2020 and the ink tank carriage 2030 are separated as shown in FIG. 59. Thereafter, the head holder 2050 is taken out from the ink tank carriage side of the head carriage 2020, and a new head holder 2050 is set from the ink tank carriage 2030 side of the head carriage 2020. Note that the constructions of the head carriage 2020 and the head holder 2050 are identical to those shown in FIG. 53.

In this manner, the ink-jet printing unit 2010 enables setting of the head holder 2050 from the ink tank carriage side, especially improves operator convenience upon setting a large number of head holders 2050 in the head carriage 2020, as shown in FIG. 53.

Figure 60A:
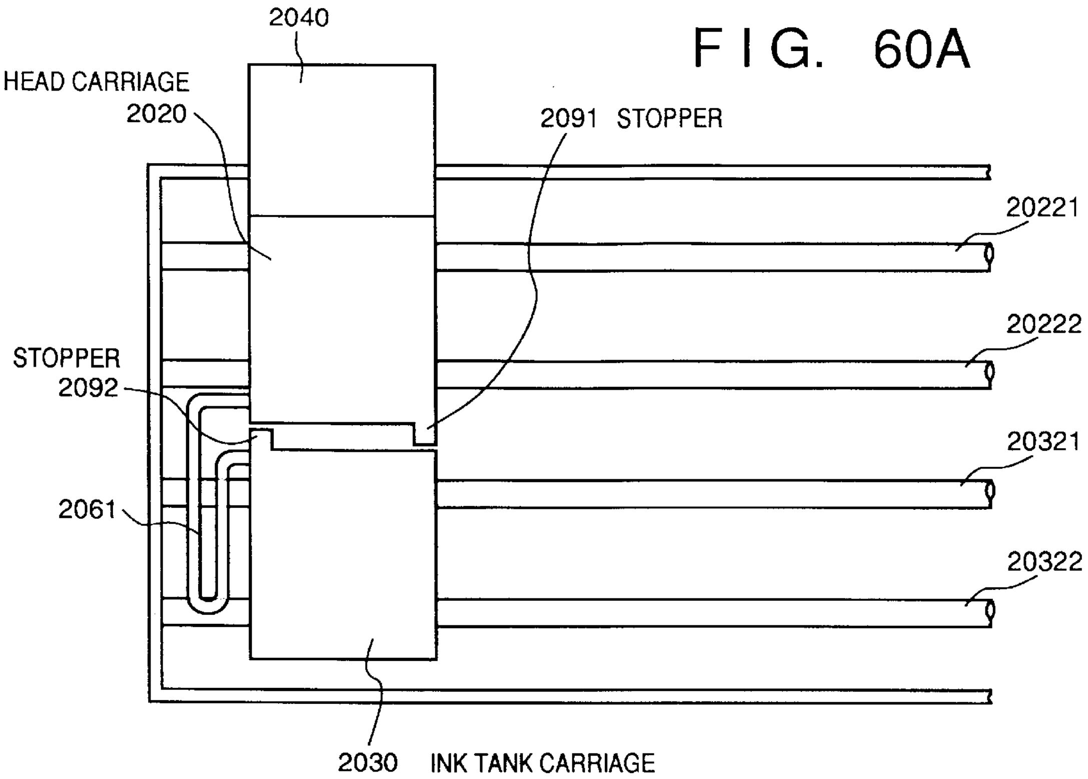
FIGS. 60A and 60B illustrate one means for limiting the amount of an ink tank carriage movement of the ink-jet printing unit shown in FIG. 58 upon exchanging an ink holder.
Figure 60B:
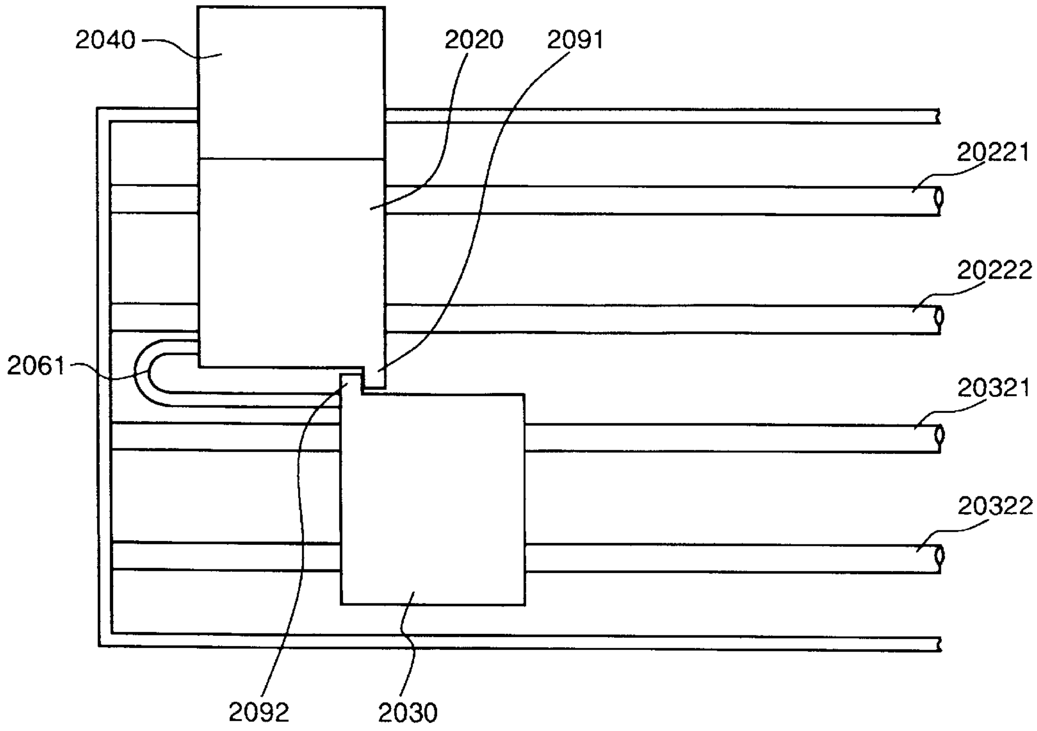

It should be noted that if the moving amount of the ink tank carriage 2030 in the main-scanning direction for the exchange of the head holder 2050 is too large, the ink tubes 2060 and the electric cables 2061 might be affected by the movement. However, as shown in FIG. 60A, providing a stopper 2091 and 2092 to the head carriage 2020 and the ink tank carriage 2030 limits the moving amount of the ink tank kcarriage 2030, as shown in FIG. 60B, within the width of the head carriage 2020 and the ink tank carriage 2030 in the main-scanning direction, thus avoiding excessive load upon the ink tubes 2060 and the electric cables 2061.

It should be noted that the movement of the ink tank carriage 2030 for exchanging the head holder 2050 may be performed by using the ink tank carriage driver, or by manual operation. Further, the ink tank carriage driver may be omitted.

As described above, first to fifth ink-jet printers according to the present embodiment and the manufacturing of first to fifth ink-jet-printed matter have been explained respectively, however, any arbitrary combination of these examples may be employed.

[Operation of Printing System (FIG. 61 to FIG. 68)]

Next, the operation of the printing system of the present embodiment will be described in detail below.

Figure 61:
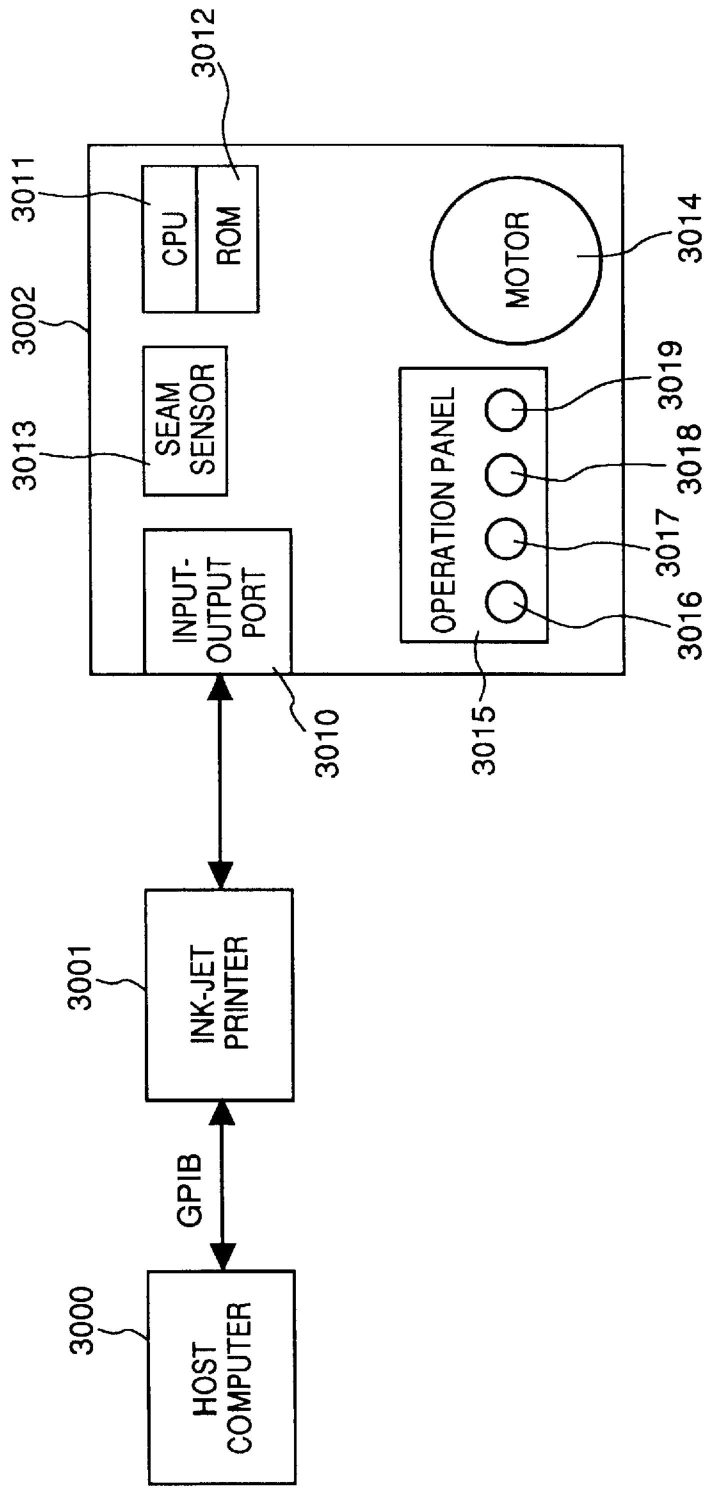
FIG. 61 is a block diagram showing the construction of the printing system of the embodiment.

FIG. 61 shows the construction of the printing system according to the present embodiment. In comparison with FIG. 1, a host computer 3000 includes the reader 1001, the image processor 1002, the binarization processor 1003 and the controller 1009. An ink-jet printer 3001 corresponds to the ink-jet printing units 1005 and 1005'. A cloth conveyer 3002 includes the cloth feeder 1006, the carriage conveyer 1007, the pre-processor 1010 and the post-processor 1008. In this example, the host computer 3000 and the ink-jet printer 3001 are connected via a GPIB, and the cloth conveyer 3002 and the ink-jet printer 3001 are connected by a dedicated interface.

The cloth conveyer 3002, for conveying printed matter such as the cloth treated by the cloth conveyer 144 in FIG. 17, comprises an input-output port 3010, an operation panel 3015 having various switches and a display for manual operation, a motor 3014 as a driving source and a seam sensor 3013 for detecting whether or not a seam exists within a printing area of the ink-jet head. Numeral 3011 denotes a CPU for controlling the overall cloth conveyer 3002, and 3012, a ROM for storing control programs for the CPU 3011 and various data. The operation panel 3015 has a start key 3016 for issuing a printing start instruction, a stop key 3017 for issuing a printing stop instruction, a temporary stop key 3018 for issuing a temporary stop instruction and an emergency stop key 3019 for issuing an emergency stop instruction.

Figure 62:
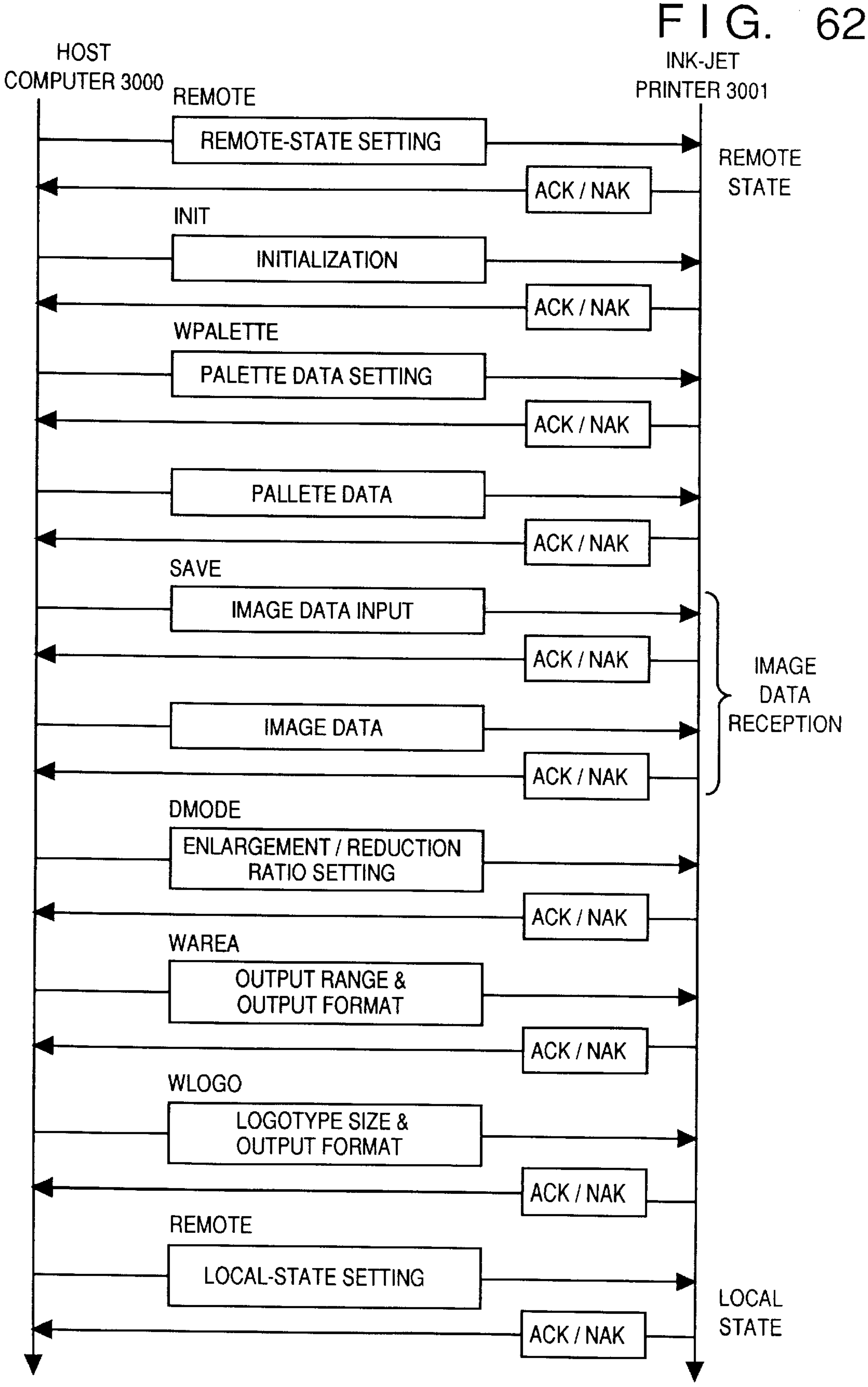
FIG. 62 illustrates signal transmission between a host computer and an ink-jet printing apparatus.

FIG. 62 illustrates the signal communication between the host computer 3000 and the ink-jet printer 3001.

The host computer 3000, such as a personal computer, first transmits a remote command (REMOTE) to the ink-jet printer 3001 to set the ink-jet printer 3001 to a remote state. Next, the computer 3000 outputs a initialing command (INIT) to initialize the printer 3001, and outputs a color setting command (WPALETTE) to set respective printing colors in accordance with the arrangement of the ink-jet heads, at the same time, transmits palette data to be set within the printer 3001. Then, the computer 3000 transmits image data to be printed to the printer 3001, where the data is registered (by a command SAVE) as a basic image.

Next, the computer 3000 outputs an enlargement/reduction ratio upon printing (DMODE) to the printer 3001, further, designates a printing width, a printing length, a repetition mode (FIGS. 26A to 26E), whether printing once or printing twice, and so forth by a input-output state setting command (WAREA). If a logotype is required to be printed, the computer 3000 outputs a logotype-output setting command (WLOGO), to designate a logotype, its color, the size of the logotype, a printing position of the logotype and so forth. As the settings are completed, the computer 3000 outputs a command (REMOTE) to set the printer 3001 to a local state, thus the host computer 3000 and the ink-jet printer 3001 are disconnected. Thereafter, the start key 3016 of the cloth conveyer 3002 is pressed, and actual printing starts.

Figure 63:
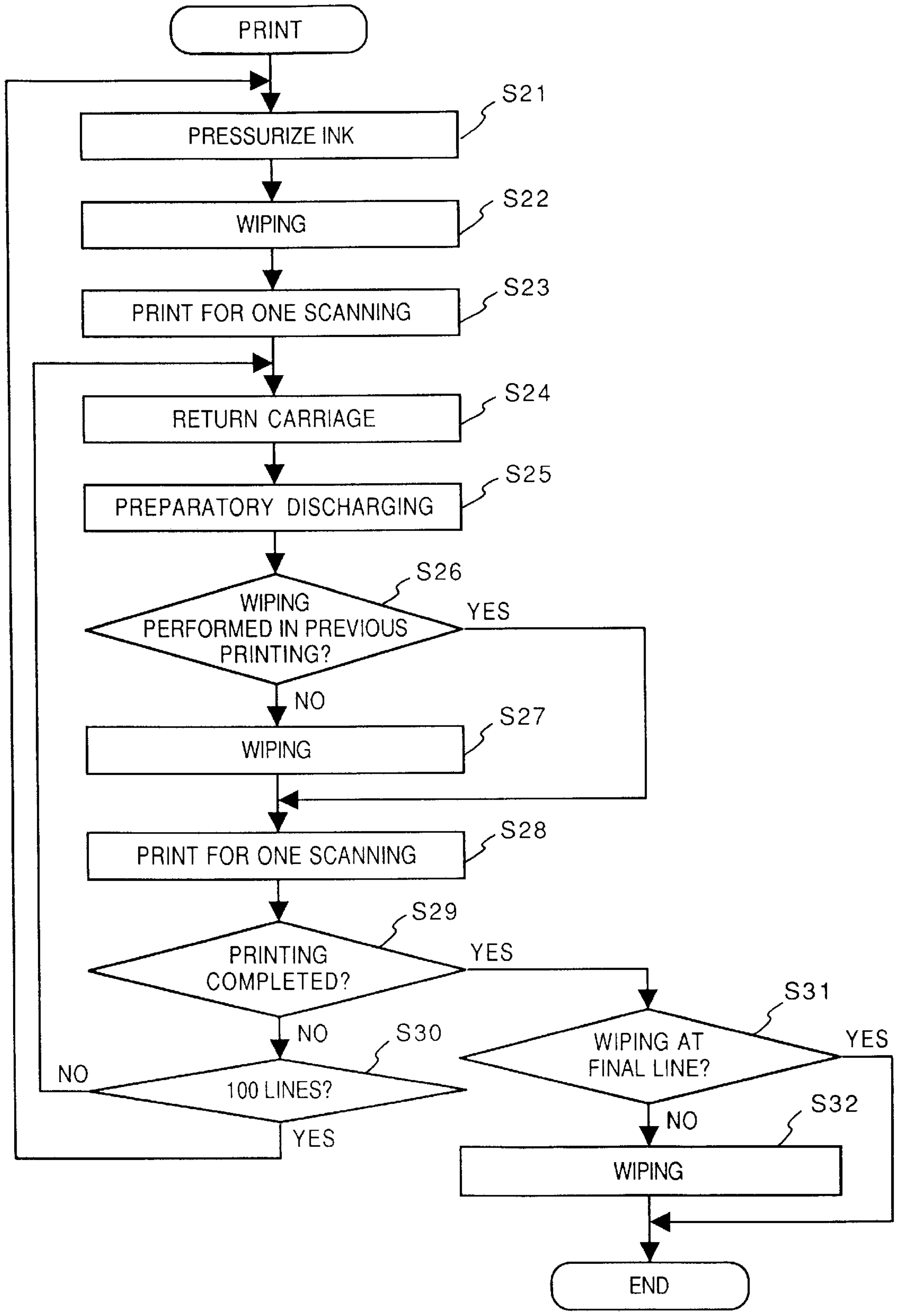
FIG. 63 is a flowchart showing printing processing in an ink-jet printing apparatus of the embodiment.

FIG. 63 shows the printing processing by the ink-jet printer 3001, in accordance with the control program stored in, e.g., the ROM 142B of the control board 142 in FIG. 17, under the control of the CPU 142A.

As the printing start is instructed, the air-pump driver 62 (FIG. 13) drives the recovery unit to perform capping on the ink-jet heads 2 and 2', and pressurizes and circulates the ink for recovery in step S21. In step S22, the carriages 124 and 124' move in the main-scanning direction for wiping (cleaning) by the wiping member 57 (FIG. 38). In step S23, the movement of the carriages 124 and 124' starts to perform printing for one-scanning, and when the one-scanning printing is completed, the process proceeds to step S24, in which the carriages 124 and 124' return to the home position. Next, in step S25, the ink-jet heads 2 and 2' perform preparatory discharging.

Next, in step S26, whether or not wiping has been performed in a previous printing is determined. If NO, wiping is performed in step S27, while if YES, process proceeds to step S28. Thus, the wiping member 57 executes wiping at every other line. In step S28, the next one-scanning printing is performed, and in step S29, whether or not the whole printing has been completed is determined. If NO, the process proceeds to step S30, in which whether or not printing for 100 lines has been completed is determined. If NO, the process returns to step S24 to repeat the above operation, while if YES, returns to step S21, in which, again the ink-jet heads 2 and 2' are capped and the pressurization of ink is performed.

In this manner, the ink-jet printer 3001 performs preparatory discharging at each scanning and wiping at every other line, further, it performs ink pressurization as recovery circulation (head recovery processing) at, e.g., every 100th scanning.

If YES in step S29, i.e., the whole printing is completed, whether or not wiping has been performed at the final line in step S31. If NO, wiping is performed in step S32. In this manner, wiping is always performed at the final line or after the printing has been completed.

Figures 64A, 64B:
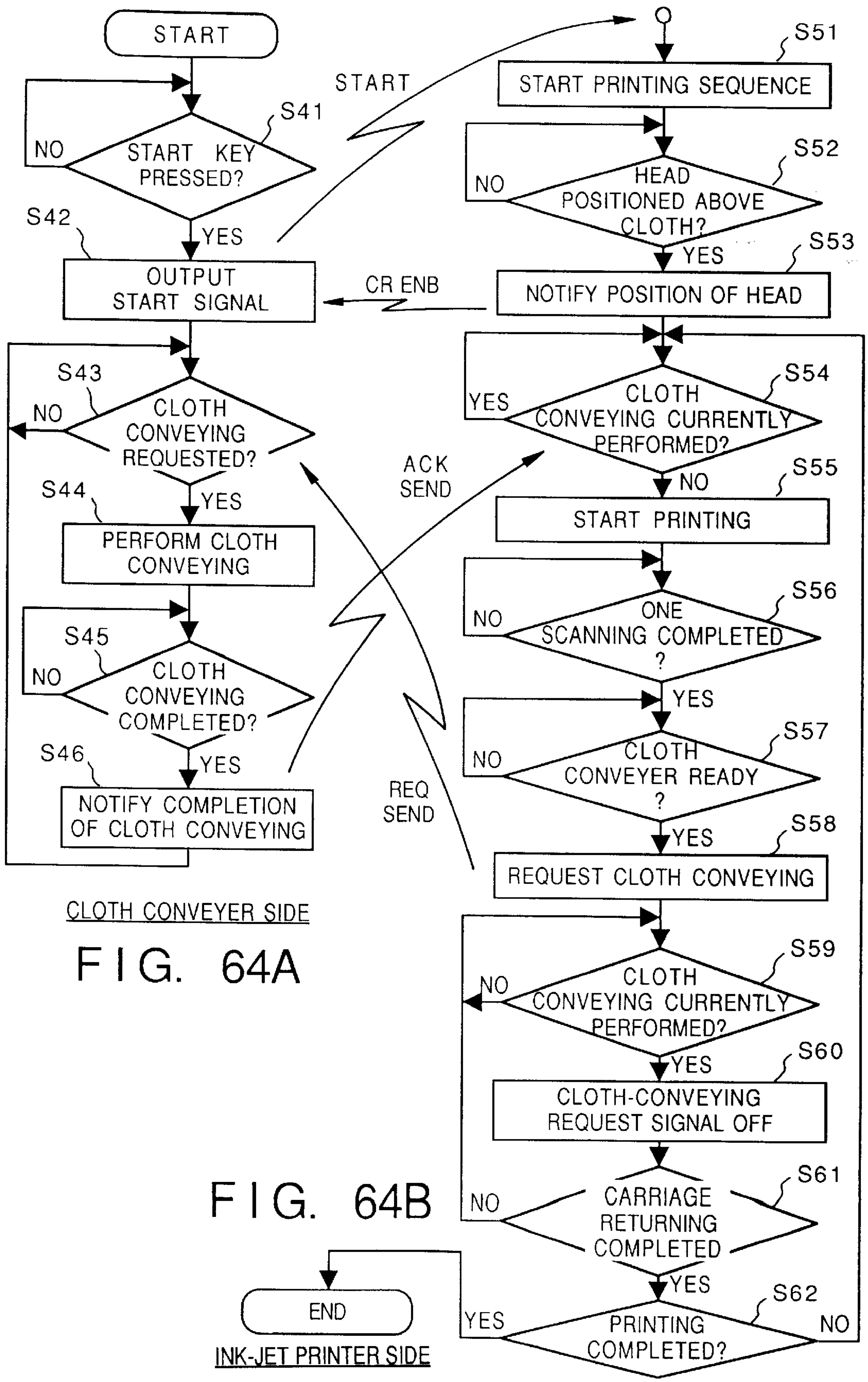
FIGS. 64A and 64B are flowcharts showing connected operations of a cloth feeder and the ink-jet printing apparatus in the printing system of the embodiment.

Next, the operations of the cloth conveyer 3002 and the ink-jet printer 3001 upon actual printing will be described with reference to the flowcharts in FIG. 64A and 64B. The process on the cloth conveyer 3002 side (FIG. 64A) is performed by the CPU 3011 in accordance with the control program stored in the ROM 3012, while the printing sequence (FIG. 64B) is performed by the CPU 142A (FIG. 17) of the ink-jet printer 3001.

In step S41, when the start key 3016 of the cloth conveyer 3002 is pressed, the cloth conveyer 3002 outputs a signal (START) to the ink-jet printer 3001 to instruct to start printing in step S42. In step S43, the cloth conveyer 3002 waits for a cloth-conveying request (REQ SEND) from the printer 3001.

On the other hand, the ink-jet printer 3001 starts the printing sequence by the signal (START) in step S51. In step S52, whether or not the ink-jet head 2 (2") is positioned above the cloth 103 is determined. If NO, the printer 3001 moves the head to the position above the cloth 103, and in step S53, notifies the cloth conveyer 3002 of the ink-jet head position (sets a signal CR ENB to a high level). In step S54, whether or not the cloth conveyer 3002 is conveying the cloth is determined. If NO (a signal ACK SEND is at a low level), the printer 3001 starts printing in step S55. This printing operation is shown in FIG. 63. In step S56, as printing for one scanning is completed, whether or not the cloth conveyer 3002 is ready or not is examined in step S57. If YES, the printer 3001 transmits the cloth-conveying request (REQ SEND) with cloth-conveying amount information to the cloth conveyer 3002 in step S58. The cloth-conveying amount can be selected from the amount designated from the operation panel 3015, a half of the designated amount, a quarter of the designated amount, and a doubled amount of the designated amount.

Note that the signals START, CR ENB, ACK SEND and REQ SEND are interface signals between the ink-jet printer 3001 and the cloth conveyer 3002.

In response to the cloth-conveying request (REQ SEND), the process of the cloth conveyer 3002 advances from the loop of step S43 to step S44, to perform cloth conveying in accordance with the conveying amount designated from the printer 3001. As the cloth conveying is completed in step S45, process proceeds to step S46, in which the cloth conveyer 3002 notifies the printer 3001 of the completion of the cloth conveying (sets ACK SEND low), and returns to step S43.

The ink-jet printer 3001 examines whether or not the cloth conveying has been started based on the signal ACK SEND in step S59. If YES, turns the cloth-conveying request off (set REQ SEND high) in step S60. As the output of the cloth-conveying request and returning of ink-jet head carriage are performed simultaneously, in step S61, whether or not the returning of carriage has been completed is determined. If YES, whether or not the whole printing has been completed is determined in step S62. If NO, the process returns to step S54 for the next printing operation. In this manner, transmission of the various signals between the printer 3001 and the cloth conveyer 3002 realizes cloth conveying and printing control independent of each other.

Figures 65A, 65B:
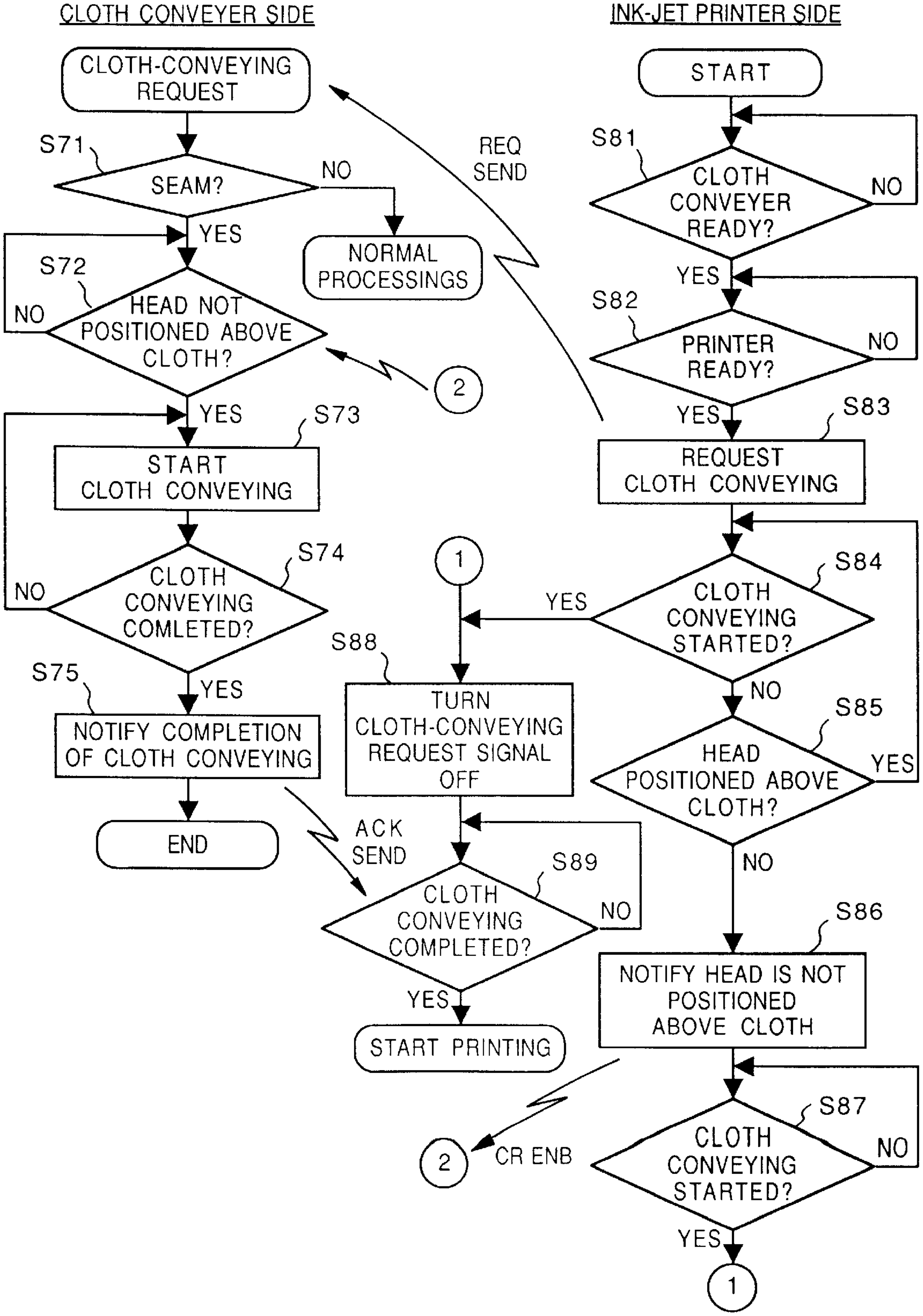
FIGS. 65A and 65B are flowcharts showing seam processing in the printing system of the embodiment.

Next, the printing processing at a seam of the cloth which is necessary for cloth printing will be described with reference to the flowchart in FIGS. 65A and 65B. FIG. 65A shows the processing on the cloth conveyer 3002 side, and FIG. 65B shows the processing on the ink-jet printer 3001 side.

The ink-jet printer 3001 issues a cloth-conveying request (set REQ SEND low) to the cloth conveyer 3002 (step S83), the process on the cloth conveyer 3002 side proceeds to step S71 to receive the cloth-conveying request. In step S71, whether or not a seam is positioned at the position of the seam sensor 3013 is determined. If NO, normal processing is performed, while if YES, whether or not the ink-jet head is positioned above the cloth is determined in step S72.

This determination is made by the printer 3001. that is, after the printer 3001 has outputted the cloth-conveying request (REQ SEND) in step S83, it determines whether or not the cloth conveying has been actually started based on whether or not the signal ACK SEND becomes high in step S84. For example, if the seam sensor has detected a seam of the cloth, the cloth conveyer 3002 does not start the cloth conveying. At this time, the processing on the printer 3001 side proceeds to step S85 to determine whether or not the ink-jet head is positioned above the cloth. If NO, the process returns to step S84, while if YES, proceeds to step S86, in which the printer 3001 returns the carriage to the home position, and at a point where the position of head is not above the cloth, it outputs a signal indicating that the head is no longer above the cloth (set CR ENB low).

The cloth conveyer 3002 detects that the ink-jet head is not positioned above the cloth in step S72, and in step S73, it rotates the motor 3014 to start conveying the cloth 103. This is because that if the cloth conveying is started while the ink-jet head is above the cloth, the nozzle ends contact the cloth and stains the cloth.

In this manner, the cloth conveyer 3002 starts cloth conveying, then the process on the printer 3001 side proceeds to step S88, to turn the cloth-conveying request off (set REQ SEND high), and waits for the completion of the cloth-conveying in step S89.

On the other hand, the cloth conveyer 3002 performs cloth-conveying for an amount to pass the seam portion through the printing position in step S74, then in step S75, notifies the printer 3001 of the completion of cloth conveying (set ACK SEND low). The printer 3001 detects the completion of cloth conveying by the notification in step S89, and starts processing for the next printing in step S90.

Thus, the cooperation between the cloth conveyer 3002 and the ink-jet printer allows the ink-jet conveyer 3002 to merely wait while the seam of the cloth is conveyed and perform printing without consideration of seams of the cloth 103.

Figures 66A, 66B:
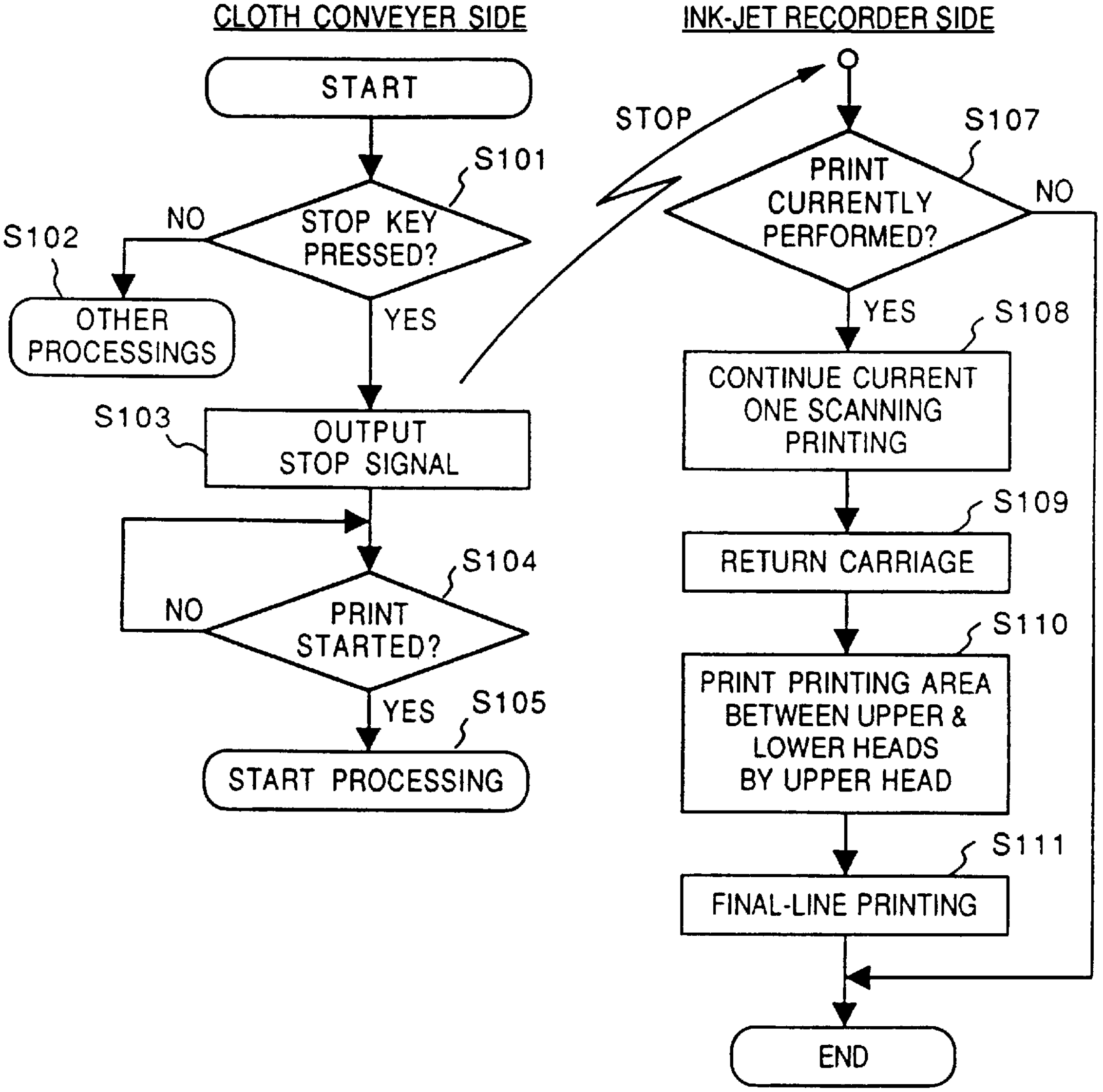
FIGS. 66A and 66B are flowcharts showing stopping processing in the printing system of the embodiment.

FIGS. 66A and 66B are flowcharts showing the processing in a case where the stop key 3017 of the cloth conveyer 3002 is pressed. FIG. 66A shows the processing on the cloth conveyer 3002 side, and FIG. 66B, on the ink-jet printer 3001 side.

In step S101, if it is determined that the stop key 3017 has not been pressed, other processings are performed in step S102, while if the stop key 3017 has been pressed, the cloth conveyer 3002 outputs a stop signal (STOP) to the printer 3001 in step S103. The printer 3001 performs the processings in step S107 and the subsequent steps. In step S107, if printing is currently performed, one-scanning printing is continued in step S108, and as the printing is completed, the carriage is returned in step S109.

As shown in FIG. 15, the ink-jet printer 3001 performs printing by the upper head 2' and the lower head 2, and the cloth 103 is conveyed in the upward direction (lower head-to-upper-head direction). In this printing, as the lower head performs sampled printing and the upper head performs interpolation printing, after the stop key has been pressed, the portion printed by the lower head must be completed by the upper head.

The printing by the upper head will be described in detail with reference to FIGS. 67A and 67B.

Figure 67A:
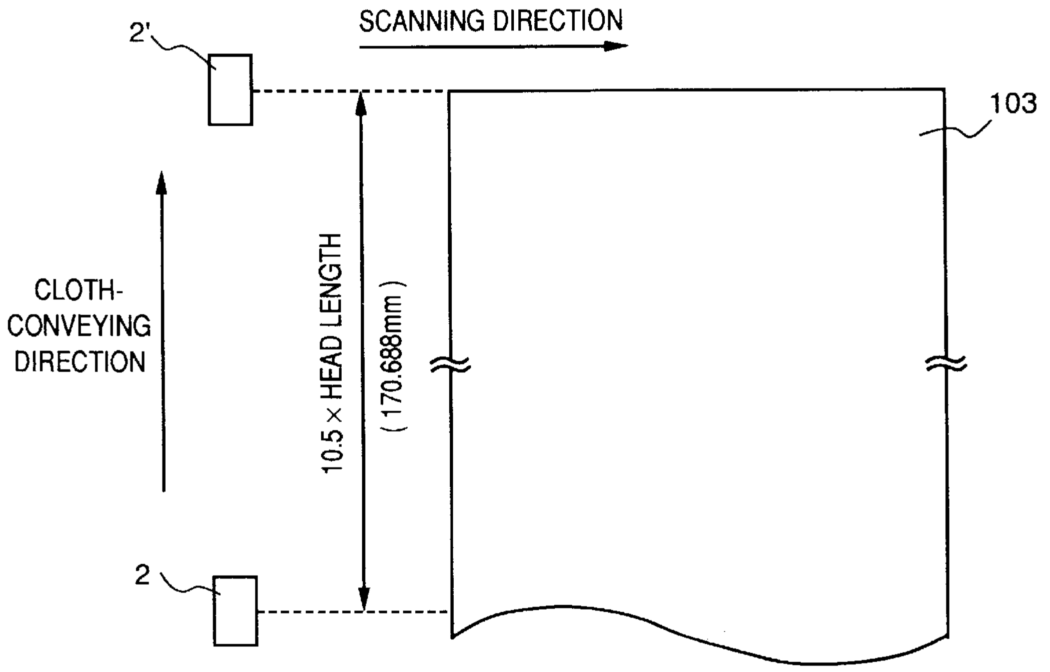
FIGS. 67A and 67B illustrate a rear-end processing in the printing system of the embodiment.
Figure 67B:
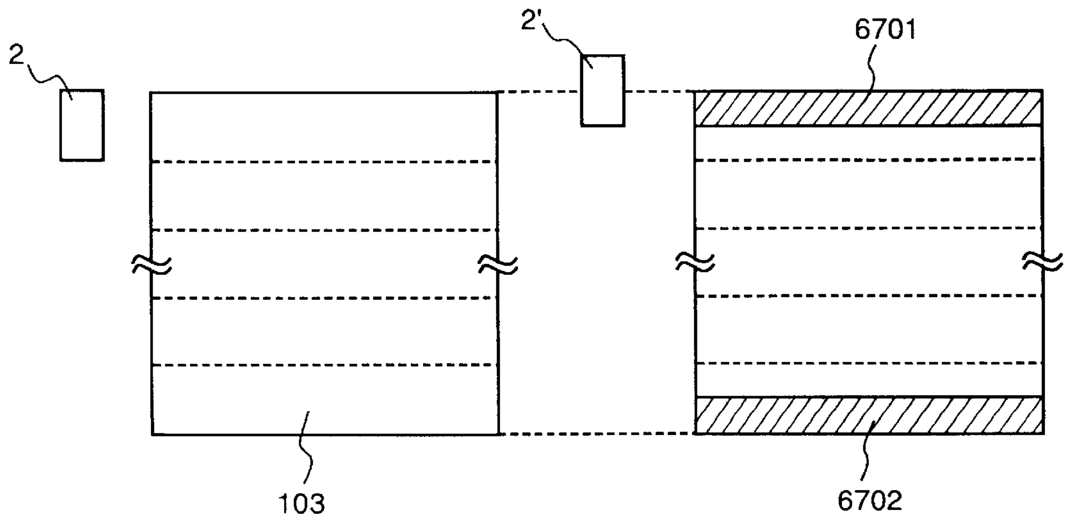

FIG. 67A shows the positional relation between the upper ink-jet head 2' and the lower ink-jet head 2. The interval between the heads is set to 10.5 (170.688 mm) times larger than the head length. As shown in FIG. 67B, the portion to be printed by the upper head with respect to the portion printed by the lower head 2 is shifted by the half of the printing width (band width). Accordingly, a hatched portion 6071 (portion printed by the first half of the nozzles of the lower head 2) is printed by the second half of the nozzles of the upper head 2', and a hatched portion 6072 (portion printed by the second half of the nozzles of the lower head 2) is printed by the first half of the nozzles of the upper head 2'. In this manner, the upper head 2' is used to interpolate the printed image on the cloth 103 by the rear end portion of the image. Even if the stop key 3017 of the operation panel 3015 is pressed and the printing is stopped at an arbitrary portion, the rear-end portion of the printed image currently being printed is completed, and correctly-printed image can be obtained.

This rear-end processing is performed in steps S110 to S111 in FIG. 66B. That is, the printed area between the upper and lower heads 2 and 2' is sequentially printed by the upper head 2', and at the final scanning line, the first or second half of the nozzles of the upper head 2' are used.

Figure 68:
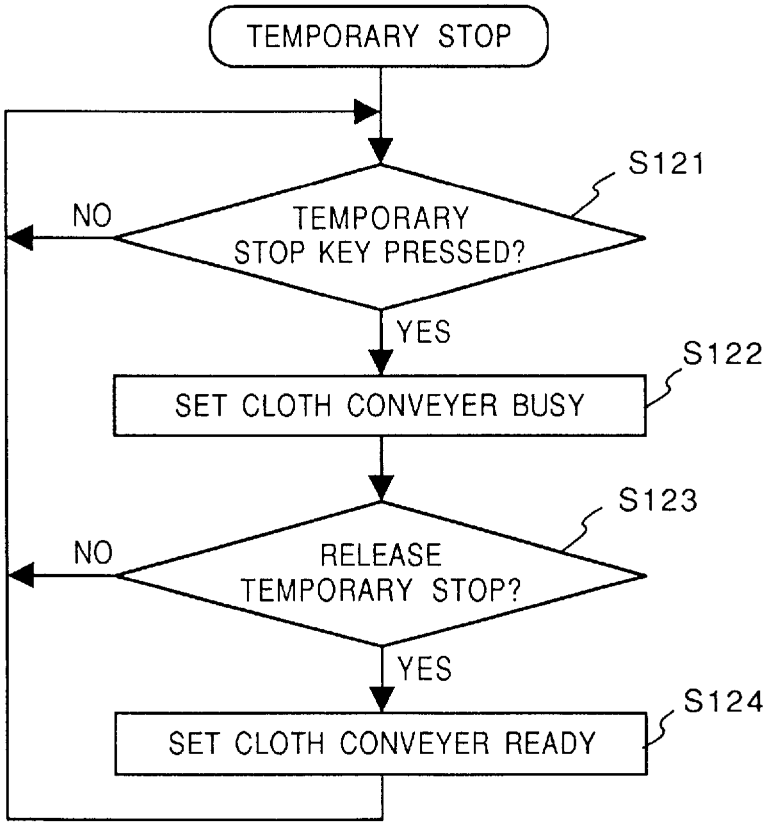
FIG. 68 is a flowchart showing a temporary stopping processing in the printing system of the embodiment.

Next, the processing in a case where the temporary stop key 2018 of the operation panel 3015 is pressed will be described with reference to the flowchart in FIG. 68.

In step S121, if it is determined that the temporary stop key 3018 has been pressed, the cloth conveyer 3002 is set to a busy status (set NUNO RDY high) in step S122. On the ink-jet printer 3001 side, as the cloth conveyer 3002 is in busy status in step S57 in FIG. 64B, the printer 3001 cannot perform the next printing operation and comes into a waiting status. Then, the process returns to step S123 in FIG. 68 again, and when the temporary stop key 3018 is turned off and the temporary stop state is released, the process proceeds to step S124, where the busy status is cleared (set NUNO RDY low) the cloth conveyer 3002 becomes ready. The process in FIG. 64B proceeds from step S57 to S58, and cloth conveying for the next printing is performed. In this manner, printing operation can be started and temporarily stopped by instructions from the cloth conveyer 3002.

Though not shown, when the emergency stop key 3019 of the operation panel 3015 is pressed, the cloth conveyer 3002 transmits an emergency stop signal (EM STOP) to the printer 3001 to stop printing by the printer 3001 immediately. In this case, the aforementioned rear-end processing is not performed.

Figure 69:
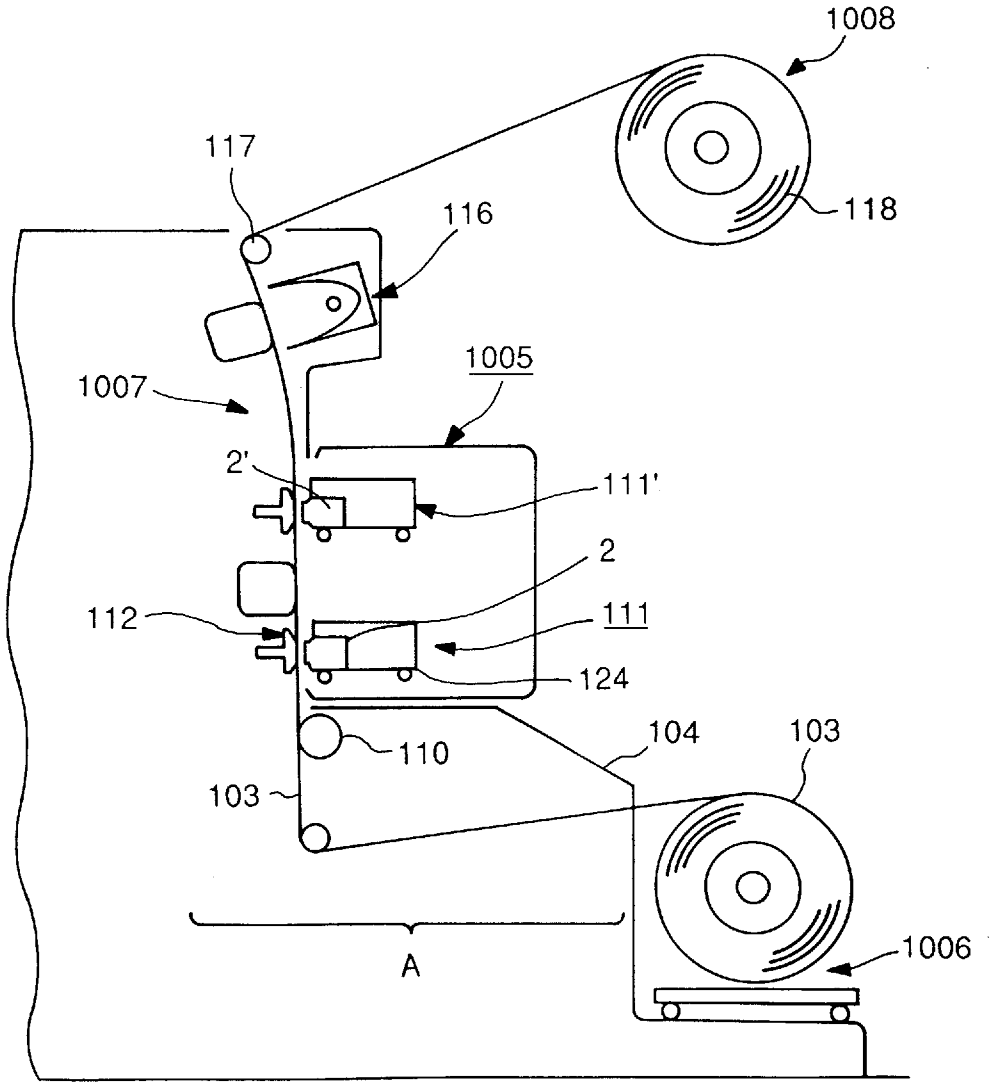
FIG. 69 is a schematic cross-sectional view showing the mechanical construction of an ink-jet printer and a cloth feeder of another embodiment.

It should be noted that in this embodiment, the heating plate 114 and the hot-air duct 115 are provided between the first printer 111 and the second printer 111' so that the cloth 103 printed by the lower ink-jet head 2 is dried before printed by the upper ink-jet head 2', however, these drying units may be omitted as shown in FIG. 69.

The cloth for use in the ink jet printing operation must meet the following requirements:

(1) The cloth enables a satisfactory thick color to be attained from the ink.
(2) The cloth enables ink to display a high dyeing capability.
(3) The cloth enables ink to be quickly dried thereon.
(4) Irregular bleeding of ink can be prevented satisfactorily.
(5) The cloth can be easily conveyed in the apparatus.

In order to meet the aforesaid requirements, the cloth must be subjected to a pre-treatment if necessary. For example, U.S. Pat. No. 4,725,849 has disclosed cloths of a type having an ink receiving layer. Japanese Patent Publication No. 3-46589 has disclosed cloths of a type containing a reduction inhibitor or an alkali substance. The pre-treatment is exemplified by a process in which the cloth contains a substance selected from a group consisting of an alkali substance, a water soluble polymer, a synthetic polymer, water soluble metal salt, and urea and thiourea.

The alkali substance is exemplified by alkali hydroxide metal such as sodium hydroxide and potassium hydroxide; amines such as mono, di- and triethanol amine; carbonic or bicarbonic alkali metal such as sodium carbonate, potassium carbonate, and sodium bicarbonate; ammonia; and ammonia compound. Furthermore, trichloroacetic sodium may be employed with steaming and under dry condition. As the alkali substance, it is preferable to employ sodium carbonate or sodium bicarbonate for use to a reactive dye drying method.

The water soluble polymer is exemplified by starch such as corn and wheat flour; cellulose such as carboxymethyl cellulose, methylcellulose, and hydroxyethyl cellulose; polysaccharide such as sodium alginate, gum Arabic, sweet bean gum, tragacanth gum, gua-gum, and tamarind seed; protein such as gelatin and casein; and natural water-soluble polymer such as tannin, and lignin.

The synthetic polymer is exemplified by polyvinyl alcohol compound, polyethylene oxide compound, acrylic acid type water soluble polymer, and maleic anhydride type water soluble polymer. It is preferable that a polysaccharide polymer or cellulose type polymer is employed.

The water-soluble metal salt is exemplified by a compound such as a halide of alkali metal and alkali earth metal which forms a typical ion crystal and having a pH value of 4 to 10. The alkali metal is exemplified by NaCl, $Na_2SO_4$, KCl and $CH_3COONa$, and the alkali earth metal is exemplified by $CaCl_2$ and $MgCl_2$. It is preferable to employ a salt of Na, K or Ca.

There is no particular limit in a method of causing the aforesaid substance to be contained by the cloth, the method being exemplified by a dipping method, a vat method, a coating method and a spraying method.

Since ink to be printed on the ink jet printing cloth simply adheres to the cloth when it is supplied to the same, it is preferable to be subjected to an ensuing reaction fixing process (a dyeing method) in which the dye is fixed to the fiber. The reaction fixing process may be a known method exemplified by a steaming method, a HT steaming method, and a thermofixing method. If a cloth which is not previously subjected to the alkali process is used, an alkali pad steam method, an alkali blotch steam method, an alkali shock method or an alkali cold fixing method is employed. The fixing process may include or may not include the reaction process depending upon dyes. In the latter method, the fiber is immersed in the ink not to physically separate them. The inks may be any arbitrary inks so far as they have a desired color, further pigments may be employed as well as dyes.

The elimination of unreacted dyes and substances used in the pre-treatment may be performed as washing in conformance with the conventional washing method after the reaction fixing process. It is preferable to perform the conventional fixing process together with the washing.

The printed matter from the above-mentioned post-treatment may be cut into pieces of desired sizes, and processes such as sewing, adhering and fusion for obtaining final products e.g., clothes such as one-pieces, dresses, neckties and swim suits, fabrics for bedclothes and sofas, handkerchiefs and curtains. The methods for processing cloth materials by sewing and the like into clothes and/or daily goods are introduced by many well-known publications, e.g., “Latest knitting & sewing manual” (published by Sen-i Journal) and a monthly magazine “So-en” (published by Bunka-Shuppankyoku).

It should be noted that the printing medium may be a cloth, a wall cloth, embroidery threads, wall paper, paper, OHP films and so on. Cloth materials may include all carpets, woven fabrics, and other cloths regardless of materials, way of weaving or knitting.

The present invention is especially advantageous to be applied to an ink-jet printing head, that performs printing by utilizing thermal energy to form flying fluid droplets, to obtain excellent printed matter.

As for the typical structure and the principle, it is preferable that the basic structure disclosed in, for example, U.S. Pat. No. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which nucleate boiling takes place are applied to the electricity-to-heat converter so as to generate heat energy in the electricity-to-heat converter and to cause the heat effecting surface of the printing head to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. No. 4,463,359 or 4,345,262 is employed. If conditions disclosed in U.S. Pat. No. 4,313,124 which is an invention relating to the temperature rising ratio at the heat effecting surface are employed, a satisfactory printing result can be obtained.

As an alternative to the structure (linear fluid passage or perpendicular fluid passage) of the printing head disclosed in each of the aforesaid inventions and having an arrangement that discharge ports, fluid passages and electricity-to-heat converters are combined, a structure having an arrangement that the heat effecting surface is disposed in a bent region and disclosed in U.S. Pat. No. 4,558,333 or 4,459,600 may be employed.

In addition, the following structures may be employed: a structure having an arrangement that a common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

It is preferred to additionally employ the printing head restoring means and the auxiliary means provided as the component of the present invention because the effect of the present invention can be further stabilized. Specifically, it is preferable to employ a printing head capping means, a cleaning means, a pressurizing or suction means, an electricity-to-heat converter, an another heating element or a sub-heating means constituted by combining them and a sub-emitting mode in which an emitting is performed independently from the printing emitting in order to stably perform the printing operation.

The printing apparatus may be arranged to be capable of printing a color-combined image composed of different colors or a full color image obtained by mixing colors with each other by integrally forming the printing head or by combining a plurality of printing heads as well as printing only a main color such as black.

Although a fluid ink is employed in each of the aforesaid embodiments of the present invention, ink which is solidified at the room temperature or lower and as well as softened at the room temperature, or ink in the form of a fluid at the room temperature or ink in the form of a fluid at the room temperature, a fluid when the recording signal is supplied may be employed because the aforesaid ink jet printing method is ordinarily arranged in such a manner that the temperature of ink is controlled in a range from 30° C. or higher and 70° C. or lower so as to make the viscosity of the ink to be included in a stable discharge range.

Furthermore, ink of the following types can be adapted to the present invention: ink which is liquified when heat energy is supplied in response to the printing signal so as to be discharged in the form of fluid ink, the aforesaid ink being exemplified by ink, the temperature rise of which due to supply of the heat energy is positively prevented by utilizing the temperature rise as energy of state change from the solid state to the liquid state; and ink which is solidified when it is allowed to stand for the purpose of preventing the ink evaporation. Furthermore, ink which is first liquified when supplied with heat energy may be adapted to the present invention. In the aforesaid case, the ink may be of a type which is held as fluid or solid material in a recess of a porous sheet or a through hole at a position to face the electricity-to-heat converter as disclosed in Japanese Pat. Laid-Open No. 54-56847 or Japanese Pat. Laid-Open No. 60-71260. It is the most preferred way for the ink to be adapted to the aforesaid film boiling method.

The present invention can be applied to a system constituted by a plurality of devices, or to an apparatus comprising a single device. Furthermore, the invention is applicable also to a case where the object of the invention is attained by supplying a program to a system or apparatus.

As described above, according to the present embodiment, printing on a joint of a printing medium can be prevented.

Further, even if printing is stopped, the printed portion at the time can be completed as a printed image.

Furthermore, the synchronization between the cloth conveying mechanism and the ink-jet printing mechanism can attain efficient printing process.

The present invention is not limited to the above embodiments and various changes and modifications can be made within the spirit and scope of the present invention. Therefore, to apprise the public of the scope of the present invention, the following claims are made.

What is claimed is:

1. An ink-jet printing apparatus for performing printing by scanning a printing head in a predetermined direction over a printing medium, comprising:

a conveying unit having a printing-medium conveying function for conveying the printing medium; and a recording unit, provided separately from said conveying unit, for performing recording by an ink-jet method on the printing medium conveyed by said conveying unit, wherein said recording unit and said conveying unit respectively comprise communication means for performing communication in accordance with a predetermined communication protocol, and wherein said recording unit outputs an instruction to said conveying unit using said communication means for conveying the printing medium, waits for completion of conveying of the printing medium by said conveying unit, and starts a recording operation.

2. The apparatus according to claim 1, wherein said conveying unit comprises instruction means for instructing an emergency stop of the recording operation, and said conveying unit disables the communication to said recording unit by the emergency stop by said instruction means.

3. The apparatus according to claim 1, wherein the printing head of said recording unit comprises heat-generating elements which generate thermal energy, as energy utilized for discharging ink, to cause film-boiling in the ink.

4. The apparatus according to claim 1, wherein a cloth is used as the printing medium.

5. An ink-jet printing method for performing printing by scanning a printing head in a predetermined direction over a printing medium, said method comprising the steps of:

providing a conveying unit, having a printing-medium conveying function for conveving the printing medium, a recording unit, provided separately from said conveying unit, for performing recording by an ink-jet method on the printing medium conveyed by said conveying unit;

providing communication means respectively between said recording unit and said conveying unit for performing communication in accordance with a predetermined communication protocols; and outputting an instruction from said recording unit to said conveying unit using said communication means for conveying the printing medium, wherein said recording unit waits for completion of conveying of the printing medium by said conveying unit, and starts a recording operation.

6. A printed matter printed by the method in claim 5.

7. A processed article obtained from processing the printed matter in claim 6.

8. An ink-jet printing apparatus for performing printing by scanning printing heads in a predetermined direction over a printing medium, comprising:

printing means for performing printing by scanning a first printing head provided at an upstream position with respect to a printing-medium conveying direction and a second printing head provided at a downstream position with respect to the printing-medium conveying direction in a direction substantially orthogonal to the printing-medium conveying direction;

instruction means for instructing a stop of the printing by said printing means;

stop means for stopping the printing by said first printing head in accordance with an instruction by the instruction means; and control means for continuing the printing by said second printing head and conveying of the printing medium until a position of an image printed by said first printing head is printed by said second printing head.

9. The apparatus according to claim 8, wherein the image printed by said first printing head is complemented by said second printing head.

10. The apparatus according to claim 8, wherein if said first printing head is being scanned for printing, completion of the printing is awaited and the printing by said first printing head is stopped.

11. The apparatus according to claim 8, further comprising drying means for drying the printing medium between a printing position of said first printing head and a printing position of said second printing head.

12. The apparatus according to claim 8, wherein said first and second printing heads comprise heat-generating elements which generate thermal energy, as energy utilized for discharging ink, to cause film-boiling in the ink.

13. The apparatus according to claim 8, wherein a cloth is used as the printing medium.

14. An ink-jet printing method for performing printing by scanning printing heads in a predetermined direction over a printing medium, comprising the steps of:

performing printing with printing means by scanning a first printing head provided at an upstream position with respect to a printing-medium conveying direction and a second printing head provided at a downstream position with respect to the printing-medium conveying direction in a direction substantially orthogonal to the printing-medium conveying direction;

instructing a stop of the printing by said printing means;

stopping the printing by said first printing head in accordance with an instruction in said instructing step; and continuing the printing by said second printing head and conveying of the printing medium until a position of an image printed by said first printing head is printed by said second printing head.

15. A printed matter printed by the method in claim 14.

16. A processed article obtained from processing the printed matter in claim 15.

17. An ink-jet printing apparatus for printing an image on a printing medium by using a printing head having a nozzle, the printing medium formed by sewing together a plurality of textiles, said apparatus comprising:

conveyance means, having a carrier, for conveying the printing medium relative to the printing head by moving the carrier on which the printing medium is placed;

scan means for moving the printing head in a main scanning direction perpendicular to a direction of conveying the printing medium by said conveyance means, said scan means for moving the printing head over a predetermined scanning area including an area of the printing medium placed on said carrier;

detection means for detecting a seam connecting the textiles of the printing medium placed on the carrier; and control means for controlling said scan means to move the printing head to an area outside of the area of the printing medium, in a case where said detection means detects the seam of the printing medium, and for subsequently controlling said conveyance means to convey the printing medium in the conveying direction until the seam has been conveyed outside of the predetermined scanning area.

18. An apparatus according to claim 17, wherein a cloth is used as the printing medium.

19. An apparatus according to claim 17, wherein said printing head comprises an electricity-heat conversion device for applying heat to ink, and discharges ink from the nozzle by applying the heat generated by said electricity-heat conversion device to the ink.

20. An ink-jet printing method for performing printing by an ink-jet printing apparatus, the apparatus comprising a printing head having a nozzle for discharging ink, conveyance means for conveying a printing medium formed by sewing together a plurality of textiles, relative to the printing head, and scan means for scanning the printing head in a main scanning direction perpendicular to a direction of conveying the printing medium, said method comprising the steps of:

determining whether or not a seam connecting the textiles of the printing medium exists in a scanning area of the printing head, in which the printing head scans to perform printing;

removing the printing head out of the scanning area, if it is determined that the seam of the printing medium exists in the scanning area;

conveying the printing medium until the seam is moved to an area outside of the scanning area; and printing an image on the printing medium by scanning the printing head over the scanning area.

21. A method according to claim 20, wherein a cloth is used as the printing medium.

22. A method according to claim 20, wherein the printing head comprises an electricity-heat conversion device for applying heat to ink, and discharges ink from the nozzle by applying the heat generated by the electricity-heat conversion device, to the ink.

* * * * *

UNITED STATES PATENT AND TRADEMARK OFFICE

CERTIFICATE OF CORRECTION

PATENT NO. : 5,847,729 Page 1 of 10

DATED : December 8, 1998

INVENTOR(S) : TAKAHASHI ET AL.

It is certified that error appears in the above-identified patent and that said Letters Patent is hereby corrected as shown below:

ON THE TITLE PAGE:

[30] Foreign Application Priority Data:

"5-142000" should read --5-142400--.

After [73]:

The following should be inserted

--[*] Notice: This patent issued on a continued prosecution application filed under 37 CFR 1.53(d), and is subject to the twenty year patent term provisions of 35 USC 154(a)(2).---.

In the Drawings:

Sheet 21, Figure 21, "REAY" should read --RELAY--.

Sheet 36, Figure 36, Step SS7-3, "PRITNER" should read --PRINTER--.

COLUMN 1:

Line 9, "resent" should read --present--.

Line 11, "data and," should read --data, and--.

Line 22, "including," should read --including--.

CERTIFICATE OF CORRECTION

PATENT NO. : 5,847,729

DATED : December 8, 1998

INVENTOR(S) : TAKAHASHI ET AL.

It is certified that error appears in the above-identified patent and that said Letters Patent is hereby corrected as shown below:

COLUMN 3:

Line 48, "these" should read --those--.

Line 55, "heads;" should read --heads having density to be raised as well as basic color heads;--.

COLUMN 5:

Line 44, "(FIG. 3)" should read --(FIG. 3),--.

Line 63, "colors ,e.g.," should read --colors, e.g.,--.

COLUMN 6:

Line 13, "step" should read --Step--.

Line 23, "Desianation" should read --Designation--.

Line 26, "relating" should read --relating to--.

Line 64, "Contrary," should read --Contrarily,--.

COLUMN 7:

Line 36, "further," should read --and further--.

Line 37, "1013" should read --1013,--.

COLUMN 8:

Line 45, "1004, on" should read --1004. On--.

Line 52, "S4," should read --S4;--.

UNITED STATES PATENT AND TRADEMARK OFFICE

CERTIFICATE OF CORRECTION

PATENT NO. : 5,847,729 Page 3 of 10

DATED : December 8, 1998

INVENTOR(S) : TAKAHASHI ET AL.

It is certified that error appears in the above-identified patent and that said Letters Patent is hereby corrected as shown below:

COLUMN 9:

Line 18, "operator in step S11-1." should read --operator.--.

Line 41, "directional" should read --directional,-- and "is" should read --as--.

COLUMN 11:

Line 37, "to" (second occurrence) should be deleted.

COLUMN 12:

Line 24, "a" should read --an--.

COLUMN 13:

Line 43, "501," should read --501 and--.

Line 50, "transfer" should read --is transferred--.

Line 67, "black" should read --and black--.

COLUMN 14:

Line 7, "followings" should read --following--.

UNITED STATES PATENT AND TRADEMARK OFFICE

CERTIFICATE OF CORRECTION

PATENT NO. : 5,847,729

DATED : December 8, 1998

INVENTOR(S) : TAKAHASHI ET AL.

It is certified that error appears in the above-identified patent and that said Letters Patent is hereby corrected as shown below:

COLUMN 15:

Line 25, "on an" should read --on to an--.

COLUMN 16:

Line 28, "designate" should read --designates--.
Line 50, "520F," should read --520F--.

COLUMN 17:

Line 45, "Direction" should read --direction--.

COLUMN 18:

Line 26, "prints" should read --print--.

COLUMN 20:

Line 46, "are" should read --is--.

COLUMN 21:

Line 16, "switches" should read --switching--.
Line 31, "portion)is" should read --portion) is--.

COLUMN 22:

Line 38, "using e.g." should read --using, e.g.,--.

UNITED STATES PATENT AND TRADEMARK OFFICE

CERTIFICATE OF CORRECTION

PATENT NO. : 5,847,729

DATED : December 8, 1998

INVENTOR(S) : TAKAHASHI ET AL.

It is certified that error appears in the above-identified patent and that said Letters Patent is hereby corrected as shown below:

COLUMN 25:

Line 28, "means-the" should read --means the--.

Line 64, "calculates i.e." should read --calculates, i.e.,--.

COLUMN 26:

Line 32, "-color" should read --color--.

COLUMN 27:

Line 11, "FIGS.," should read --FIGS.--.

Line 65, "to the idle-discharging" should be deleted.

COLUMN 28:

Line 5, "but to" should read --but also to--.

COLUMN 29:

Line 51, "above are" should read --above, is--.

UNITED STATES PATENT AND TRADEMARK OFFICE
CERTIFICATE OF CORRECTION

PATENT NO. : 5,847,729 Page 6 of 10

DATED : December 8, 1998

INVENTOR(S) : TAKAHASHI ET AL.

It is certified that error appears in the above-identified patent and that said Letters Patent is hereby corrected as shown below:

COLUMN 30:

Line 47, "printing." should read --printing method.--.

Line 52, "further," should read --and further--.

Line 56, "space," should read --space;--.

Line 61, "apparatus" should read --apparatus,--.

COLUMN 31:

Line 4, "on-." should read --on.--.

Line 37, "next one" should read --one next--.

COLUMN 33:

Line 5, "are" should be deleted.

Line 7, "regulator" (second occurrence) should read --regulator,--.

Line 12, "as" should read --such as--.

Line 27, "unstable." should read --unstable--.

UNITED STATES PATENT AND TRADEMARK OFFICE

CERTIFICATE OF CORRECTION

PATENT NO. : 5,847,729

DATED : December 8, 1998

INVENTOR(S) : TAKAHASHI ET AL.

It is certified that error appears in the above-identified patent and that said Letters Patent is hereby corrected as shown below:

COLUMN 34:

Line 5, "is." should read --is,--.

Line 9, "gumr" should read --gum,-- and "gua-gum" should read --guar gum--.

Line 20, "having" should read --has--.

COLUMN 35:

Line 11, "FP-100" should read --FP-100.--.

Line 23, "The" should begin a new paragraph.

COLUMN 36:

Line 20, "a" should read --an--. (2nd occurrence)

COLUMN 38:

Line 23, "Difference is" should read --Differences are--.

COLUMN 39:

Line 5, "and 1321" (second occurrence) should be deleted.

Line 55, "As the," should read --As the--.

UNITED STATES PATENT AND TRADEMARK OFFICE
CERTIFICATE OF CORRECTION

PATENT NO. : 5,847,729 Page 8 of 10

DATED : December 8, 1998

INVENTOR(S) : TAKAHASHI ET AL.

It is certified that error appears in the above-identified patent and that said Letters Patent is hereby corrected as shown below:

COLUMN 41:
Line 59, "1202" should read --11202--.

COLUMN 42:
Line 52, "112121" should read --12121--.

COLUMN 43:
Line 5, "1221" should read --12121--.
Line 64, "side," should read --side, and--.

COLUMN 44:
Line 8, "kcarriage" should read --carriage--.

COLUMN 45:
Line 2, "a" should read --an--.
Line 49, "S31." should read --S31 is determined.--.

COLUMN 46:
Line 33, "turns" should be deleted, and "off" should read --is turned off--.
Line 58, "that" should read --That--.

UNITED STATES PATENT AND TRADEMARK OFFICE

CERTIFICATE OF CORRECTION

PATENT NO. : 5,847,729 Page 9 of 10

DATED : December 8, 1998

INVENTOR(S) : TAKAHASHI ET AL.

It is certified that error appears in the above-identified patent and that said Letters Patent is hereby corrected as shown below:

COLUMN 47:

Line 9, "that" should be deleted.

COLUMN 48:

Line 23, "low)" should read --low), and--.
Line 38, "printed" should read --being printed--.

COLUMN 49:

Line 36, "ink not" should read --ink, so as not--.

COLUMN 50:

Line 9, "place" should read --place,--.
Line 12, "take place" should read --induce--.
Line 49, ", an" should read --and--.
Line 64, "or ink in the form of a fluid at the room" should be deleted.
Line 65, "temperature," should be read --or ink which is formed into--.

UNITED STATES PATENT AND TRADEMARK OFFICE

CERTIFICATE OF CORRECTION

PATENT NO. : 5,847,729 Page 10 of 10
DATED : December 8, 1998
INVENTOR(S) : TAKAHASHI ET AL.

It is certified that error appears in the above-identified patent and that said Letters Patent is hereby corrected as shown below:

COLUMN 54:

Line 35, "device," should read --device--.

Signed and Sealed this

Twenty-sixth Day of December, 2000

Attest:

Q. TODD DICKINSON

*Attesting Officer* *Director of Patents and Trademarks*